United States Patent
Sivasubramanian et al.

(10) Patent No.: US 11,609,697 B2
(45) Date of Patent: *Mar. 21, 2023

(54) SYSTEM AND METHOD FOR PROVIDING A COMMITTED THROUGHPUT LEVEL IN A DATA STORE

(71) Applicant: Amazon Technologies, Inc., Seattle, WA (US)

(72) Inventors: Swaminathan Sivasubramanian, Seattle, WA (US); Stefano Stefani, Issaquah, WA (US); Wei Xiao, Kirkland, WA (US); Timothy Andrew Rath, Seattle, WA (US); Rande A. Blackman, Seattle, WA (US); Grant Alexander MacDonald McAlister, Seattle, WA (US); Raymond S. Bradford, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/133,009

(22) Filed: Dec. 23, 2020

(65) Prior Publication Data

US 2021/0200446 A1 Jul. 1, 2021

Related U.S. Application Data

(63) Continuation of application No. 13/174,189, filed on Jun. 30, 2011, now Pat. No. 10,877,669.

(51) Int. Cl.
*G06F 12/00* (2006.01)
*G06F 13/00* (2006.01)
(Continued)

(52) U.S. Cl.
CPC .......... *G06F 3/0613* (2013.01); *G06F 3/0631* (2013.01); *G06F 3/0683* (2013.01); *G06F 3/0608* (2013.01); *H04L 67/1097* (2013.01)

(58) Field of Classification Search
CPC .... G06F 3/0613; G06F 3/0631; G06F 3/0683; G06F 3/0608; H04L 67/1097
(Continued)

(56) References Cited

U.S. PATENT DOCUMENTS 7,035,971 B1 * 4/2006 Merchant ............ G06F 11/3433
711/112
7,089,381 B2 * 8/2006 Horn ...................... G06F 9/4881
710/240

(Continued)

OTHER PUBLICATIONS

"Windows Azure Table", Jai Haridas, et al., May 2009, pp. 1-42.
(Continued)

*Primary Examiner* — Sheng Jen Tsai
(74) *Attorney, Agent, or Firm* — Robert C. Koweït; Kowert, Hood, Munyon, Rankin & Goetzel, P.C.

(57) ABSTRACT

A system that implements a scaleable data storage service may maintain tables in a data store on behalf of storage service clients. The service may maintain data in partitions stored on respective computing nodes in the system. The service may support multiple throughput models, including a committed throughput model and a best effort throughput model. A service request to create a table may specify that requests directed to the table should be serviced under a committed throughput model and may specify the committed throughput level in terms of logical service request units. The service may reserve low-latency storage and other resources sufficient to meet the specified committed throughput level. A client/user may request a modification to the committed throughput level in anticipation of workload changes, such as an increase or decrease in traffic or data (Continued)

volume. In response, the system may increase or decrease the resources reserved for the table.

20 Claims, 25 Drawing Sheets

(51) Int. Cl.
*G06F 3/06* (2006.01)
*H04L 67/1097* (2022.01)

(58) Field of Classification Search
USPC .......................................................... 711/173
See application file for complete search history.

(56) References Cited

U.S. PATENT DOCUMENTS

| | | | |
|---|---|---|---|
| 7,114,013 B2 | 9/2006 | Bakke et al. | |
| 7,203,163 B1* | 4/2007 | Hundscheidt | H04L 12/6418 370/230 |
| 7,386,662 B1* | 6/2008 | Kekre | G06F 3/0605 711/113 |
| 7,636,801 B1* | 12/2009 | Kekre | H04L 67/1097 709/218 |
| 7,698,398 B1* | 4/2010 | Lai | G06Q 10/10 709/223 |
| 7,716,180 B2 | 5/2010 | Vermeulen et al. | |
| 7,801,912 B2 | 9/2010 | Ransil et al. | |
| 8,234,650 B1 | 7/2012 | Eppstein et al. | |
| 10,877,669 B1 | 12/2020 | Sivasubramanian et al. | |
| 2002/0032816 A1* | 3/2002 | Bakke | G06F 3/0685 710/74 |
| 2002/0039352 A1* | 4/2002 | El-Fekih | H04L 47/822 370/252 |
| 2002/0059427 A1* | 5/2002 | Tamaki | H04L 47/70 709/226 |
| 2002/0107743 A1* | 8/2002 | Sagawa | G06Q 20/204 705/17 |
| 2002/0194251 A1* | 12/2002 | Richter | G06F 9/5011 718/105 |
| 2003/0046396 A1* | 3/2003 | Richter | G06F 9/505 709/226 |
| 2003/0093501 A1* | 5/2003 | Carlson | H04L 41/0233 709/220 |
| 2003/0097443 A1* | 5/2003 | Gillett | H04L 67/2819 709/225 |
| 2003/0172145 A1* | 9/2003 | Nguyen | H04L 12/1403 709/223 |
| 2004/0003087 A1 | 1/2004 | Chambliss et al. | |
| 2004/0098538 A1* | 5/2004 | Horn | G06F 3/0689 711/113 |
| 2004/0193397 A1* | 9/2004 | Lumb | G06F 13/105 703/24 |
| 2004/0194095 A1* | 9/2004 | Lumb | G06F 9/4887 718/100 |
| 2004/0243692 A1 | 12/2004 | Arnold et al. | |
| 2005/0044197 A1* | 2/2005 | Lai | H04L 67/16 709/223 |
| 2005/0076154 A1* | 4/2005 | Chambliss | H04L 69/329 710/1 |
| 2005/0289312 A1* | 12/2005 | Ghosal | G06F 3/0632 711/167 |
| 2006/0034438 A1* | 2/2006 | O'Neill | H04L 12/145 379/114.07 |
| 2006/0036518 A1* | 2/2006 | O'Neill | H04L 12/1403 705/30 |
| 2006/0036520 A1* | 2/2006 | O'Neill | H04M 15/00 705/34 |
| 2006/0190605 A1* | 8/2006 | Franz | G06Q 10/06313 709/226 |
| 2007/0168336 A1 | 7/2007 | Ransil et al. | |
| 2008/0050025 A1* | 2/2008 | Bashyam | H04N 19/129 382/238 |
| 2008/0050026 A1* | 2/2008 | Bashyam | H04N 19/124 382/238 |
| 2008/0050027 A1* | 2/2008 | Bashyam | H04N 19/60 382/238 |
| 2008/0050029 A1* | 2/2008 | Bashyam | G06T 9/001 382/243 |
| 2008/0050047 A1* | 2/2008 | Bashyam | H03M 7/40 382/305 |
| 2008/0123654 A1* | 5/2008 | Tse-Au | H04L 45/60 370/392 |
| 2008/0152235 A1* | 6/2008 | Bashyam | H03M 7/3071 382/224 |
| 2008/0154928 A1* | 6/2008 | Bashyam | H03M 7/30 |
| 2008/0270523 A1* | 10/2008 | Parmar | H04L 67/14 709/203 |
| 2009/0080336 A1* | 3/2009 | Zhang | H04L 43/00 370/248 |
| 2009/0112668 A1* | 4/2009 | Abu El Ata | G06Q 10/06 705/7.27 |
| 2009/0172782 A1 | 7/2009 | Taglienti et al. | |
| 2010/0095013 A1* | 4/2010 | Zuckerman | H04L 67/1002 709/231 |
| 2010/0142447 A1* | 6/2010 | Schlicht | H04W 4/20 370/328 |
| 2011/0270968 A1* | 11/2011 | Salsburg | G06F 9/5072 709/224 |

OTHER PUBLICATIONS

"Windows Azure Storage—Essential Cloud Storage Services", Professional Developers Conference, 2008, Brad Calder, pp. 1-64.
Dynamo: Amazon's Highly Available Key-value Store, G. DeCandia, D. Hastorun, M. Jampani, G. Kakulapati, A. Lakshman, S. Sivasubramanian, P. Vosshall, and W. Vogels, in SOSP '07, pp. 205-220.
U.S. Appl. No. 12/059,723, filed Mar. 31, 2008, McAlister, et al.
Platform Computing Corporation, LSF Batch User's Guide, 6th Edition, Aug. 1998, pp. 1-12.

* cited by examiner

SYSTEM AND METHOD FOR PROVIDING A COMMITTED THROUGHPUT LEVEL IN A DATA STORE

BACKGROUND

This application is a continuation of U.S. patent application Ser. No. 13/174,189, filed Jun. 30, 2011, which is hereby incorporated by reference herein in its entirety.

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Database systems managing large amounts of data on behalf of users may distribute and/or replicate that data across two or more machines, often in different locations, for any of a number of reasons, including security issues, disaster prevention and recovery issues, data locality and availability issues, etc. These machines may be configured in any number of ways, including as a shared resource pool.

Interaction between client applications and database servers typically includes read operations (read-only queries), write operations (to store data), and update operations that can be conceptualized using a read-modify-write workflow.

Figure 1:
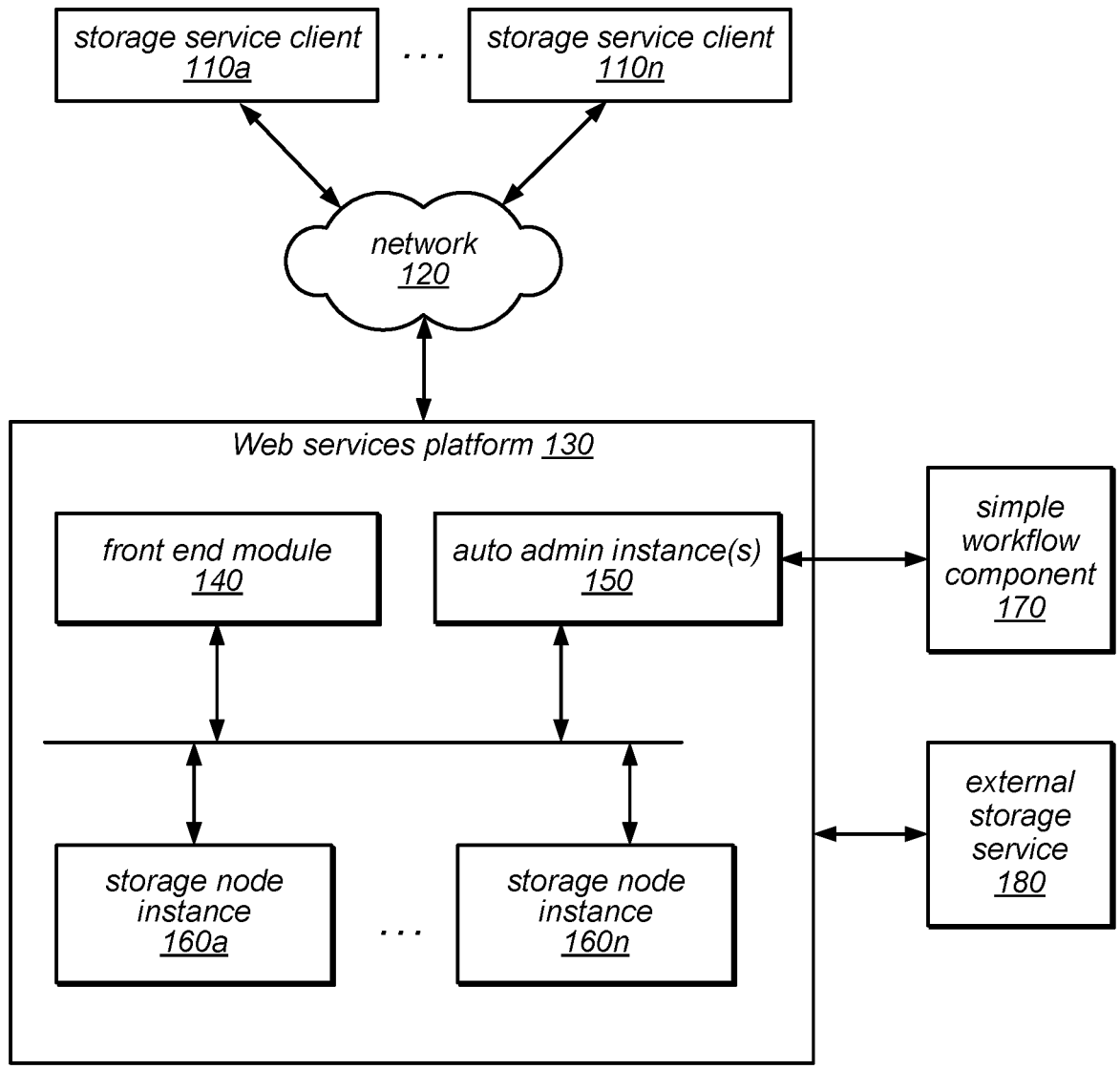
FIG. 1 is a block diagram illustrating one embodiment of a system architecture that is configured to implement a web services-based data storage service.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

The systems and methods described herein may be employed in various combinations and in various embodiments to implement a Web-based service that provides data storage services to storage service clients (e.g., user, subscribers, or client applications that access the data storage service on behalf of users or subscribers). As described in detail herein, the service may in some embodiments support the seamless scaling of tables that are maintained on behalf of clients in a non-relational data store, e.g., a non-relational database. The service may provide a high level of durability and availability through replication, in some embodiments. In some embodiments, the service itself may not impose a maximum table size or maximum throughput limits, and may not require client-side partitioning, even for tables having a massive scale. The service may support automatic live repartitioning of data in response to the detection of various anomalies (e.g., failure or fault conditions, hot spots, or increases in table size and/or service request throughput), and/or explicit (e.g., pro-active and/or subscriber-initiated) live repartitioning of data to support planned or anticipated table size and/or throughput increases. In other words, the service may in some embodiments initiate the re-sizing (scaling) and/or repartitioning of a table in response to receiving one or more requests to store, retrieve, modify, or delete items in the scalable table.

The service described herein may in various embodiments support a flexible schema, a plurality of available consistency models, a variety of service level and/or business model options, multiple indexing options, and/or multiple query types. In some embodiments, storage service clients (e.g., users, subscribers or client applications) may interact with the service through a Web service interface using a relatively small (and relatively simple) set of APIs, such that clients of the service are largely relieved from the burden of database administration. The service may exhibit low latency in servicing requests. Unlike in some prior data storage services, the service may predictable performance at a low cost, while supporting multi-tenancy and automatic heat management.

In various embodiments, the data storage service described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. In some embodiments, the service (and/or the underlying system that implements the service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In some embodiments, the service (and/or the underlying system) may impose an upper bound on the size of an individual item, e.g., to allow the service to store the entire contents of an item in a single partition in the underlying data storage system. This may, in turn, facilitate performing atomic updates to an item without dramatically reducing throughput, and may make it easier to maintain item contents in a stable working set. In other words, limiting the size of an individual item may facilitate both strong consistency and high performance in the system, in some embodiments.

Figure 22:
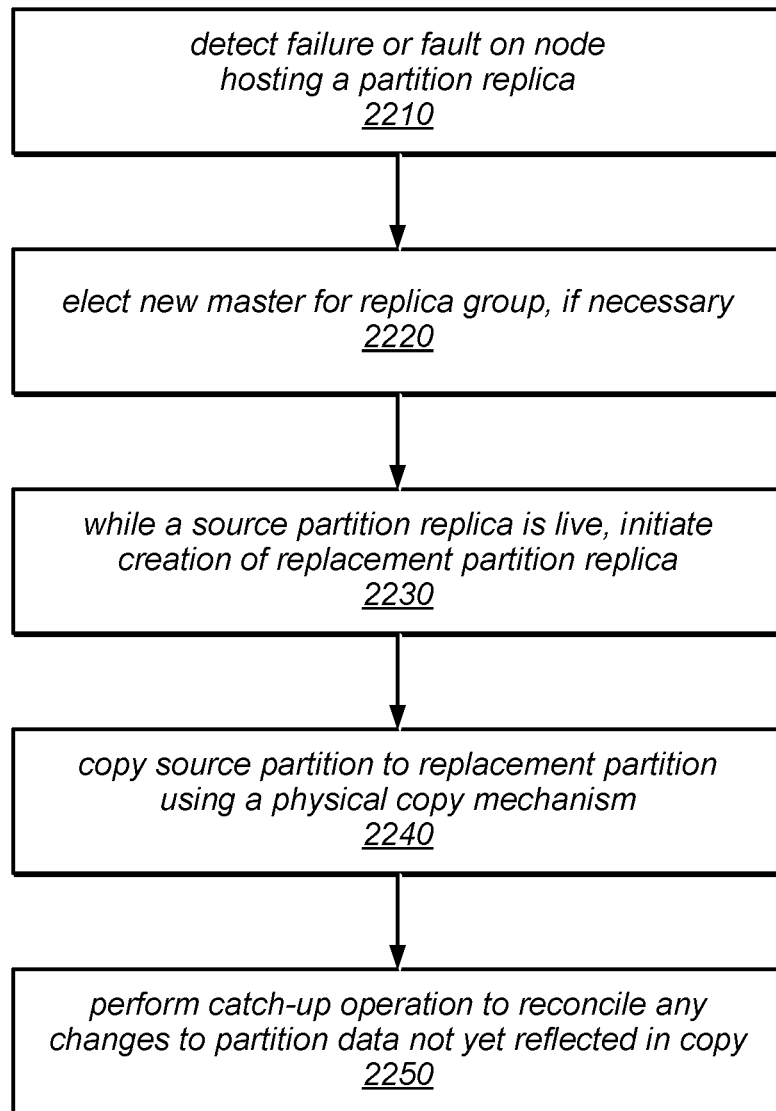
FIG. 22 is a flow diagram illustrating one embodiment of a method for moving a partition of a table being maintained by a data storage service in response to detecting an anomaly.

One embodiment of a system architecture that is configured to implement a Web services-based data storage service such as that described herein is illustrated in FIG. 1. It is noted that where one or more instances of a given component may exist, reference to that component hereinbelow may be made in either the singular or the plural. However, usage of either form is not intended to preclude the other. In various embodiments, the components illustrated in FIG. 1 may be implemented directly within computer hardware, as instructions directly or indirectly executable by computer hardware (e.g., a microprocessor or computer system), or using a combination of these techniques. For example, the components of FIG. 1 may be implemented by a distributed system including a number of computing nodes (or simply, nodes), such as the computer node embodiment illustrated in FIG. 22 and discussed below. In various embodiments, the functionality of a given storage service system component may be implemented by a particular computing node or may be distributed across several computing nodes. In some embodiments, a given computing node may implement the functionality of more than one storage service system component.

Generally speaking, storage service clients 110*a*-110*n* may encompass any type of client configurable to submit web services requests to Web services platform 130 via network 120. For example, a given storage service client 110 may include a suitable version of a web browser, or a plugin module or other type of code module configured to execute as an extension to or within an execution environment provided by a web browser to provide storage service clients (e.g., client applications, users, and/or subscribers) access to the data storage services provided by Web services platform 130. Alternatively, a storage service client 110 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 110 may be an application configured to interact directly with Web services platform 130. In various embodiments, storage service client 110 may be configured to generate web services requests according to a Representational State Transfer (REST)-style web services architecture, a document- or message-based web services architecture, or another suitable web services architecture.

In some embodiments, storage service client 110 may be configured to provide access to web services-based storage to other applications in a manner that is transparent to those applications. For example, storage service client 110 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to Web services platform 130 may be coordinated by storage service client 110 and the operating system or file system on behalf of applications executing within the operating system environment.

Storage service clients 110 may convey web services requests to and receive responses from Web services platform 130 via network 120. In various embodiments, network 120 may encompass any suitable combination of networking hardware and protocols necessary to establish web-based communications between clients 110 and platform 130. For example, network 120 may generally encompass the various telecommunications networks and service providers that collectively implement the Internet. Network 120 may also include private networks such as local area networks (LANs) or wide area networks (WANs) as well as public or private wireless networks. For example, both a given client 110 and Web services platform 130 may be respectively provisioned within enterprises having their own internal networks. In such an embodiment, network 120 may include the hardware (e.g., modems, routers, switches, load balancers, proxy servers, etc.) and software (e.g., protocol stacks, accounting software, firewall/security software, etc.) necessary to establish a networking link between given client 110 and the Internet as well as between the Internet and Web services platform 130. It is noted that in some embodiments, storage service clients 110 may communicate with Web services platform 130 using a private network rather than the public Internet. For example, clients 110 may be provisioned within the same enterprise as the data storage service (and/or the underlying system) described herein. In such a case, clients 110 may communicate with platform 130 entirely through a private network 120 (e.g., a LAN or WAN that may use Internet-based communication protocols but which is not publicly accessible).

Generally speaking, Web services platform 130 may be configured to implement one or more service endpoints configured to receive and process web services requests, such as requests to access tables maintained on behalf of clients/users by a data storage service, and/or the items and attributes stored in those tables. For example, Web services platform 130 may include hardware and/or software configured to implement various service endpoints and to properly receive and process HTTP-based web services requests directed to those endpoints. In one embodiment, Web services platform 130 may be implemented as a server system configured to receive web services requests from clients 110 and to forward them to various components that collectively implement a data storage system for processing. In other embodiments, Web services platform 130 may be configured as a number of distinct systems (e.g., in a cluster topology) implementing load balancing and other request management features configured to dynamically manage large-scale web services request processing loads.

As illustrated in FIG. 1, Web services platform 130 may include a front end module 140 (which may be configured to receive, authenticate, parse, throttle and/or dispatch service requests, among other things), one or more administrative components, or auto admin instances, 150 (which may be configured to provide a variety of visibility and/or control functions, as described in more detail below), and a plurality of storage node instances (shown as 160a-160n), each of which may maintain and manage one or more tables on behalf of clients/users or on behalf of the data storage service (and its underlying system) itself. Some of the functionality provided by each of these types of components is described in more detail below, according to various embodiments.

In various embodiments, Web services platform 130 may be configured to support different types of web services requests. For example, in some embodiments, platform 130 may be configured to implement a particular web services application programming interface (API) that supports a variety of operations on tables that are maintained and managed on behalf of clients/users by the data storage service system (and/or data stored in those tables). Examples of the operations supported by such an API are described in more detail below.

In addition to functioning as an addressable endpoint for clients' web services requests, in some embodiments Web services platform 130 may implement various client management features. For example, platform 130 may coordinate the metering and accounting of client usage of web services, including storage resources, such as by tracking the identities of requesting clients 110, the number and/or frequency of client requests, the size of tables and/or items stored or retrieved on behalf of clients 110, overall storage bandwidth used by clients 110, class of storage requested by clients 110, and/or any other measurable client usage parameter. Platform 130 may also implement financial accounting and billing systems, or may maintain a database of usage data that may be queried and processed by external systems for reporting and billing of client usage activity. In some embodiments, platform 130 may include a lock manager and/or a bootstrap configuration (not shown).

In various embodiments, a data storage service may be implemented on one or more computing nodes that are configured to perform the functionality described herein. In some embodiments, the service may be implemented by a Web services platform (such as Web services platform 130 in FIG. 1) that is made up of multiple computing nodes, each of which may perform one or more of the functions described herein. Various collections of the computing nodes may be configured to provide the functionality of an auto-admin cluster, a cluster of resources dedicated to the data storage service, and a collection of external resources (which may be shared with other Web services or applications, in some embodiments).

In some embodiments, the external resources with which the system interacts to provide the functionality described herein may include a simple workflow component, illustrated in FIG. 1 as simple workflow component 170. Simple workflow component 170 may provide a framework through which other components interact with the simple workflow system. In some embodiments, Web services platform 130 may include an access API built on top of that framework (not shown). This interface may allow the system to implement APIs suitable for the usage patterns expected to be experienced by the data storage service. In some embodiments, components or modules of the system that use simple workflow component 170 may include these interfaces rather than interfacing directly to the interfaces provided by simple workflow component 170. In some embodiments, the Web services platform 130 may rely on one or more external resources, such as an external storage service 180, and/or other external (and in some cases shared) external resources, in addition to a simple workflow component 170. In some embodiments, simple workflow component 170 may be used to perform distributed operations, such as those that extend beyond a particular partition replication group.

Figure 2A:
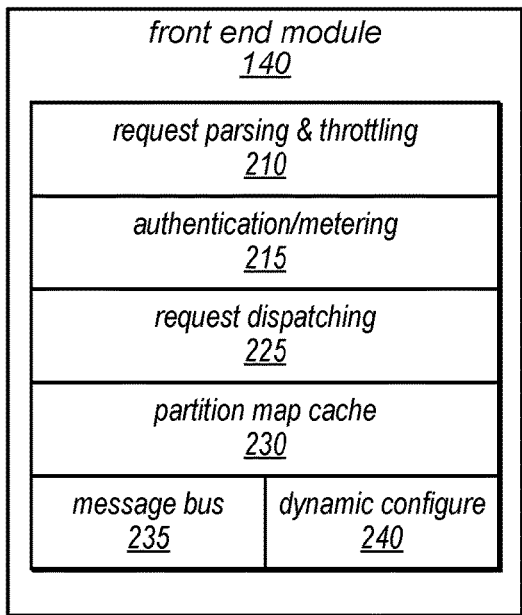
FIGS. 2A-2C are block diagrams illustrating various components of a Web services platform, according to one embodiment.
Figure 2B:
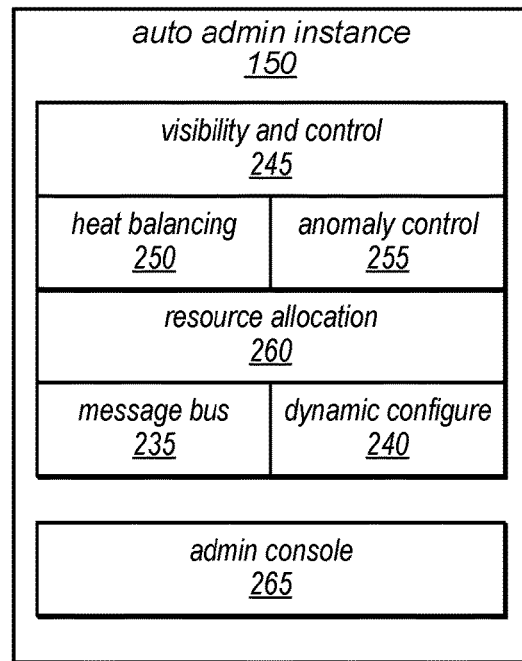
Figure 2C:
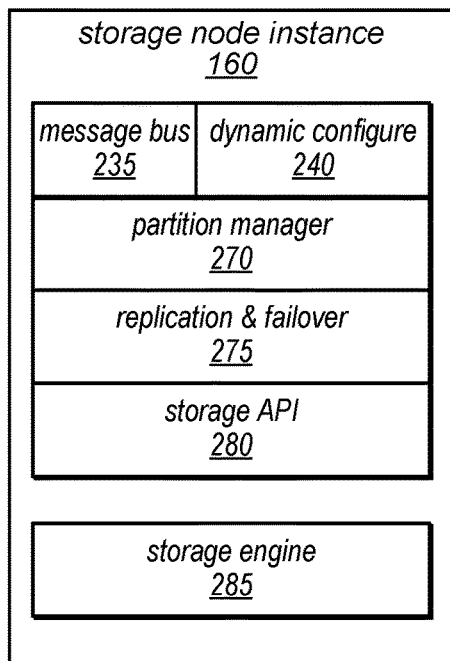

FIGS. 2A-2C illustrate various elements or modules that may be included in each of the types of components of Web services platform 130, according to one embodiment. As illustrated in FIG. 2A, front end module 140 may include one or more modules configured to perform parsing and/or throttling of service requests (shown as 210), authentication and/or metering of service requests (shown as 215), dispatching service requests (shown as 225), and/or maintaining a partition map cache (shown as 230). In addition to these component-specific modules, front end module 140 may include components that are common to multiple types of computing nodes that collectively implement Web services platform 130, such as a message bus (shown as 235) and/or a dynamic configuration module (shown as 240). In other embodiments, more, fewer, or different elements may be included in front end module 140, or any of the elements illustrated as being included in front end module 140 may be included in another component of Web services platform 130 or in a component configured to interact with Web services platform 130 to provide the data storage services described herein.

As illustrated in FIG. 2B, auto admin instance 150 may include one or more modules configured to provide visibility and control to system administrators (shown as 245), or to perform heat balancing (shown as 250), and/or anomaly control (shown as 255), resource allocation (shown as 260). Auto admin instance 150 may also include an admin console 265, through which system administrators may interact with the data storage service (and/or the underlying system). In some embodiments, admin console 265 may be the primary point of visibility and control for the data storage service (e.g., for configuration or reconfiguration by system administrators). For example, admin console 265 may be implemented as a relatively thin client that provides display and control functionally to system administrators and/or other privileged users, and through which system status indicators, metadata, and/or operating parameters may be observed and/or updated. In addition to these component-specific modules, auto admin instance 150 may also include components that are common to the different types of computing nodes that collectively implement Web services platform 130, such as a message bus (shown as 235) and/or a dynamic configuration module (shown as 240). In other embodiments, more, fewer, or different elements may be included in auto admin instance 150, or any of the elements illustrated as being included in auto admin instance 150 may be included in another component of Web services platform 130 or in a component configured to interact with Web services platform 130 to provide the data storage services described herein.

As illustrated in FIG. 2C, storage node instance 160 may include one or more modules configured to provide partition management (shown as 270), to implement replication and failover processes (shown as 275), and/or to provide an application programming interface (API) to underlying storage (shown as 280). As illustrated in this example, each storage node instance 160 may include a storage engine 285, which may be configured to maintain (i.e. to store and manage) one or more tables (and associated table data) in storage 280 (which in some embodiments may be a non-relational database) on behalf of one or more clients/users. In addition to these component-specific modules, storage node instance 160 may include components that are common to the different types of computing nodes that collectively implement Web services platform 130, such as a message bus (shown as 235) and/or a dynamic configuration module (shown as 240). In other embodiments, more, fewer, or different elements may be included in storage node instance 160, or any of the elements illustrated as being included in storage node instance 160 may be included in another component of Web services platform 130 or in a component configured to interact with Web services platform 130 to provide the data storage services described herein.

The systems underlying the data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique.

Various types may be employed in the data storage system to support the ordering of data in sorted indexes. In some embodiments, the data storage service may support only a small number of types (e.g., strings and decimal numbers), and all attribute values must have either a scalar or set (multiple value) type. For example, in some embodiments, the service (and/or the underlying system implementing the service) may only support two scalar data types: strings, and numbers (e.g., decimal numbers). In such embodiments, a date may be encoded as an integer (e.g., as a Unix epoch timestamp) rather than using a "date" data type. In other embodiments, more, fewer, or different data types may be supported. As noted above, in some embodiments, attribute names may always be of data type "string". In some embodiments, the service (and/or the underlying system) may support multi-valued types that are derived from the supported scalar types, as in the following example:

$$\text{ScalarType}:=\{N|S\} \text{MultiValuedType}:=\{NS|SS\}$$

In this example, N represents a number, S represents a string, NS represents a set of numbers, and SS represents a set of strings. In various embodiments, attributes of type "string" may be part of a key or part of an index, and the maximum size of a string may be limited by the size of an index key (e.g., 1024 bytes cumulative for a range key or 2048 bytes for each hash key) or the item size (e.g., 64 K). In various embodiments, attributes of type "number" may be used to store exact-value decimal and integers, and may have variable width encoding. In some embodiments, the amount of space that can be occupied by an attribute of this type may be limited to a pre-determined amount. Note also that in various embodiments, a number can have a precision P (indicating the maximum number of significant digits that can be stored), and/or a scale S (indicating the number of digits from the decimal point to the least significant digit). The precision and scale of a number may in some cases be automatically inferred by the service, and an appropriate storage size may be used for the number. Negative numbers may be specified using a minus sign at the beginning of the number, but a plus sign specified before a number may not be stored, in some embodiments. Leading and/or trailing zeros may or may not be stored, in different embodiments. The following is an example of a number format that may be employed by the service (and underlying system) described herein:

Number_format=[+|−][{integer}][{.Integer}]

As noted above, an item may include one or more attributes. Each attribute may have two portions: an attribute name (e.g., an UTF8 string) and an attribute value (which may be expressed as a combination of a type and a value object, where the type describes the type of the value). In some embodiments, a single-valued attribute may have a name and a scalar value, and the type of the attribute may be encoded in the attribute value, as in the following examples:

{"my-string-attr":{"S":"my-string-value"}}#String
      type{"my-number-attr":{"N":123456.7}}#Number type In some embodiments, a multi-valued attribute may have a name, and one or more values of a specified type. In such embodiments, the values may be unique, as in the following examples:

{"Size":{"SS":["XL","L","M","S"]}}#String set
      {"SingleDigitPrimes":{"NS":[2,3,5,7]}}#Number set In some embodiments, the systems described herein may employ a somewhat limited indexing and/or query model in order to provide massive (i.e. virtually unlimited) scaling, predictability, and simplicity for users/subscribers or client applications. For example, in some embodiments, data may be indexed and partitioned (e.g., partitioned in the underlying database) by a primary key only. In such embodiments, the primary key to be used for indexing data in a user table may be specified by the user at the time that the table is created on the user's behalf Thereafter, the partitioning of the user's data may be handled by the system, and abstracted from the user. In some embodiments, the primary key used for indexing data may consist of a single attribute hash key. In other embodiments, the primary key used for indexing and/or partitioning data may be a composite key comprising a hash key component and another component, sometimes referred to herein as a range key component. As described in more detail herein, in various embodiments, queries may be supported against indexed attributes, and a full table scan function may be provided (e.g., to support troubleshooting). In some embodiments, users may define secondary indexes for a table based on one or more attributes other than those of the primary key, and then may query for items using the indexes they have defined. For example, in some embodiments the system may support the creation of creating secondary indexes on-the-fly (e.g., using a createIndex API), and these secondary indexes may scale automatically based on storage requirements (e.g., increasing or decreasing data volume) and/or read/write traffic. In some embodiments, such secondary indexes may be asynchronously updated as items in the table are updated.

As previously noted, in some embodiments there may be no pre-defined limit on the number of items in each table maintained by the data storage service. Conceptually, each item may be thought of as a mapping of attribute names to corresponding attribute values. Using this analogy, each entry in the map is an attribute. In various embodiments each item may include a key attribute, plus zero or more non-key attributes. In some embodiments, the key attributes must be single-valued attributes, while non-key attributes may be single-valued attributes or multi-valued attibutes. The following is an example of an item that has five attributes: a PictureId (of type string), a CustomerId (of type number), a Title (of type string), and Tags (a multi-valued string attribute).

{
      "PictureId" : {"S" : "picture123"},
      "CustomerId" : {"N" : 1234567},
      "Title" : {"S" : "sun flower"},
      "Tags" : {"SS" : ["flower", "seattle"]}
   }

In various embodiments, the service (and/or the underlying system) may enforce pre-determined size limits on table names, items, attribute values, primary key values, and/or attribute names. For example, in some embodiments, the total size of all the attribute names and values in an item (i.e. the row size) may be limited.

Figure 3A:
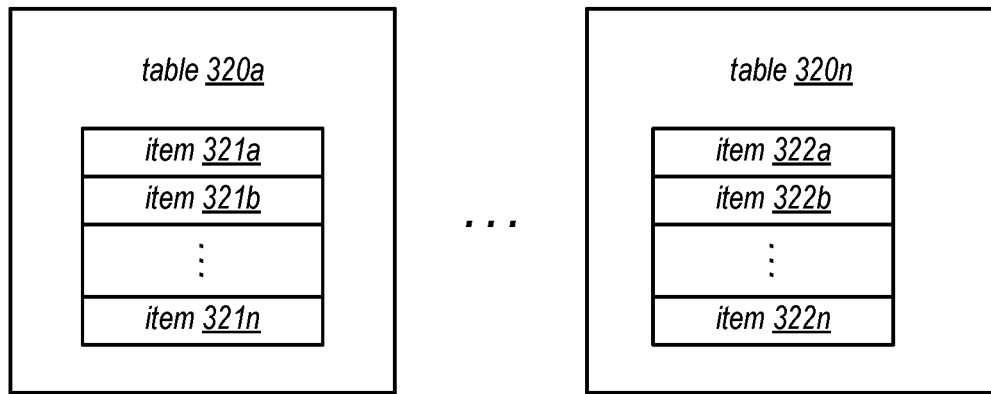
FIGS. 3A and 3B are block diagrams illustrating the storing of data as items in a plurality of tables, according to one embodiment.
Figure 3B:
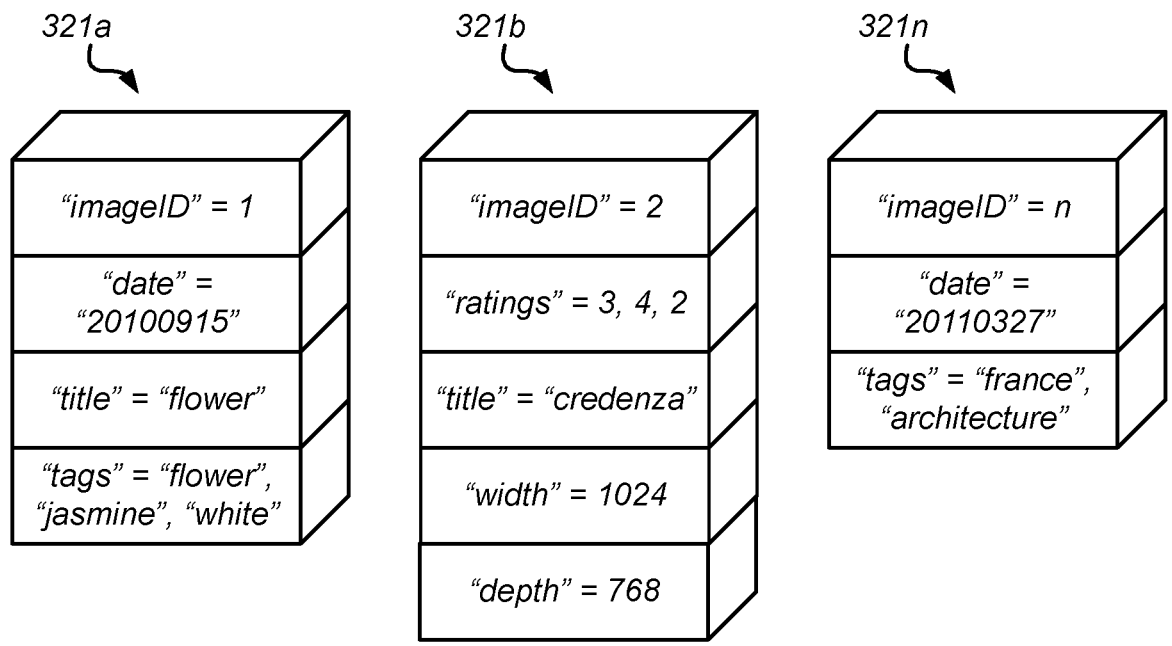

FIGS. 3A and 3B illustrate the storing of data in a plurality of tables, according to one embodiment. As illustrated in FIG. 3A and described above, each of a plurality of tables (shown as tables 320a-320n) may store a plurality of items. In the illustrated example, table 320a stores items 321a-321n, and table 320n stores items 322a-322n. As illustrated in FIG. 3B, each of the items stored in a table may include a plurality of attributes, and each of the attributes may include an attribute name and a scalar or set type value. In this example, item 321a (stored in table 320a) includes a numeric "imageID" attribute whose value is 1, a numeric "date" attribute whose value is 20100915, a sting attribute named "title" whose value is "flower", and a string attribute named "tags" whose value is the set containing the strings "flower", "jasmine", and "white". In this example, item 321b (which is also stored in table 320a) includes a numeric "imageID" attribute whose value is 2, a numeric attribute named "ratings" whose value is the set containing the numeric values 3, 4, and 2, a sting attribute named "title" whose value is "credenza", a numeric "width" attribute whose value is 1024, and a numeric "depth" attribute whose value is 768. In this example, item 321n (which is also stored in table 320a) includes a numeric "imageID" attribute whose value is n, a numeric "date" attribute whose value is 20110327, and a string attribute named "tags" whose value is the set containing the strings "france" and "architecture". Note that even though items 321a, 321b, and 321n are all stored in the same table (table 320a), they do not all include the same set of attributes. Instead, each item includes a sparse set of attributes from among all the attributes that have been specified for the collection of items stored in table 320a. In some embodiments, tables such as those described herein may be used to store and manage system metadata in addition to user data.

The sparsely populated items described above may be further illustrated by the grid representation in Table 1 below. Note that the grid format of Table 1 below is merely a convenient mechanism for illustrating the fact that various items in a single table may include different subsets of the item attributes included in the collection of items in the table. It is not meant to imply any particular structure for a table that is maintained in the non-relational database systems described herein, or for the items themselves. Therefore, the choice and arrangement of the rows and columns of Table 1 below may be considered to be arbitrary and for illustration purposes only. As described herein, the tables maintained by the systems described herein may not have fixed schemas. As such, items may not include placeholders (i.e. empty elements) for attributes that are not included therein, and attributes (and their values) may be added to one or more items without having to add them to all other items.

TABLE 1

Example of sparsely populated item attributes

| imageID | date | title | ratings | tags | width | depth |
|---|---|---|---|---|---|---|
| 1 | 2010 Sep. 15 | flower | | flower, jasmine, white | | |
| 2 | | credenza | 3, 4, 2 | | 1024 | 768 |
| ... | | | | | | |
| n | 2011 Mar. 27 | | | France, architecture | | |

In some embodiments, a table maintained by the data storage service on behalf of a client/user may have a primary key that identifies its items. The primary key may be defined over one attribute (and may be single valued, as described above) or over several attributes (i.e. it may be a composite primary key, as described above), in various embodiments. The key attributes may be immutable, may have a fixed type, and may be mandatory for every item, as they uniquely identify an item within a table. In some embodiments, the primary key is the only part of the table that is indexed, and the index type may be specified when a table is created. For example, when a table of items is created, an attribute may be designated as the primary key attributes for the table (or two attributes may be designated for a composite primary key). All items in the table must include the attribute(s) designated for the primary key and the data storage service (and/or underlying system) may ensure that the value (or combination of values) for those attribute names is unique for each item in the table. For example, if an attempt is made to add a new item that has the same primary key value as an existing item, the new item may replace the existing item in the table.

Figure 4:
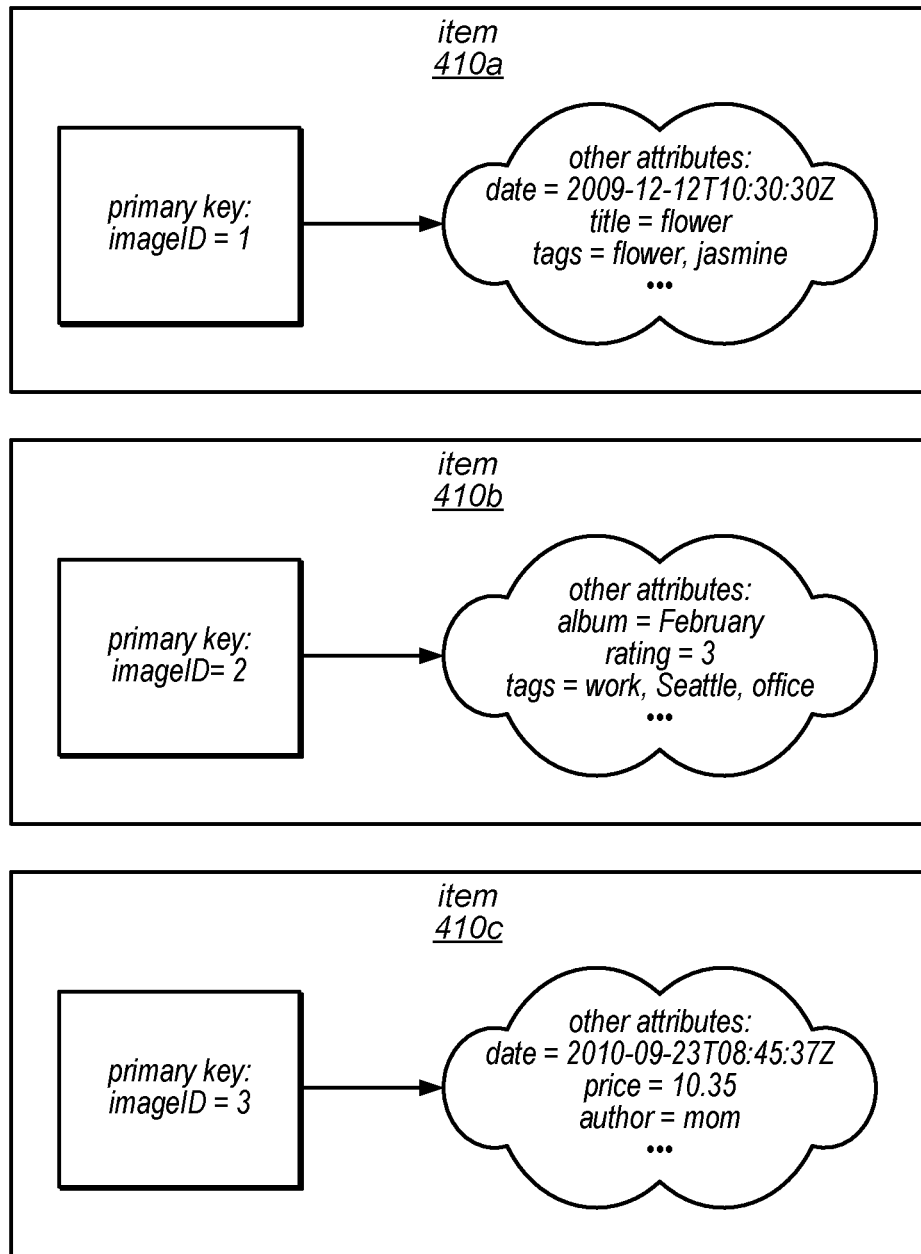
FIG. 4 is a block diagram illustrating three items that contain a numeric attribute that has been designated as the primary key for the table in which they are stored, according to one embodiment.

FIG. 4 illustrates three items that may be stored in a table for which a numeric attribute named "imageID" has been designated as the primary key, according to one embodiment. In this example, item 410a includes the imageID attribute (which has a value of 1), and values for at least three other attributes (e.g., a date attribute, a title attribute, and a tags attribute). Similarly, item 410b includes the imageID attribute (which has a value of 2), and values for at least three other attributes (e.g., an album attribute, a rating attribute, and a tags attribute). In this example, item 410c includes the imageID attribute (which has a value of 3), and values for at least three other attributes (e.g., a date attribute, a price attribute, and an author attribute). In this example, the items stored in the table may be indexed according to their primary key values. In other words, each of these items may be uniquely identified by its primary key value alone, and an operation to retrieve an item that has been identified by its primary key value may include retrieving the values of some or all of its other attributes.

As noted above, the data storage service (and/or the underlying system) may create an index based on the primary key. The type of index may be dependent on the whether the table uses a simple primary key or a composite primary key. For example, the data storage service may index the primary key either as a hash index or a hash-and-range index, as follows:

Hash—A may be can be a string or a number. Simple primary keys may have one index value: a hash index, which may be a string or a number.

Range— A range may be a string or a number. A range may allow table items to be sorted so that data queries can refine results based on the range. Composite primary keys may contain two values for the index: a hash index (sometimes referred to herein as the hash key value) and a range index (sometimes referred to herein as the range key value).

A simple primary key may be sufficient for data collection and infrequent scanning of table data (e.g., using the scan API described below). A composite primary key may allow table data to be organized more precisely, and may allow the use of the Query API described below for more efficient data retrieval. The following address table (Table 2) illustrates the use of a single attribute as the primary key to uniquely identify each item in the table.

TABLE 2 uses a simple primary key (string)

| Primary Key | Other Attributes |
|---|---|
| UserID = Jennifer | street =100 Pine, city = Seattle, state = WA |
| UserID = Bob | street = 24 Freemont Ave, zip = 95112 |
| UserID = Harold | street = 20104 N. 4$^{th}$ St., suite = 35, city = Columbus, state = OH |

In this example, the primary key, an attribute called UserID, is required in every item and its type ("string") is fixed for every item. However, each item may also include any combination of additional attributes. The data storage system may in some embodiments be configured to ensure that the value of UserID is unique for each item in the table. As noted above, in some embodiments, attribute values cannot be null or empty. In such embodiments, an attribute does not exist in the table until/unless it has a value associated with it. The following table (Table 3) designates a numeric attribute (in this case, the ImageID) as the primary key by which items in the table may be uniquely identified:

TABLE 3 uses a simple primary key (number)

| Primary Key | Other Attributes |
|---|---|
| ImageID = 1 | ImageLocation = myBucket/img_1.jpg, Date = 2009 Dec. 12T10:30:30Z, Title = flower, Tags = Flower, Jasmine, Width = 1024, Depth = 768 |
| ImageID = 2 | ImageLocation = myBucket/img_2.jpg, Date = 2010 Sep. 20T18:40:50Z, Ratings = 3, 4, 2, Tags = Work, Seattle, Office, Width = 1024, Depth = 768 |
| ImageID = 3 | ImageLocation = myBucket/img_3.jpg, Date = 2010 Sep. 23T10:30:30Z, Price = 10.25, Tags = Seattle, Grocery, Store, Author = Bob |

TABLE 3-continued uses a simple primary key (number)

| Primary Key | Other Attributes |
|---|---|
| ImageID = 4 | Camera = phone<br>ImageLocation = myBucket/img_4.jpg,<br>Date = 2010 Aug. 23T10:40:50Z<br>Title = Hawaii<br>Author = Joe<br>Colors = orange, blue, yellow<br>Tags = beach, blanket, ball |

In this example, the primary key, ImageID, is required in every item and its type ("number") is fixed for every item, but each item may include any combination of other attributes. As in the previous example, the data storage system may in some embodiments be configured to ensure that the value of ImageID is unique for each item in the table. As noted above, in some embodiments, attribute values cannot be null or empty. In such embodiments, an attribute does not exist in the table until/unless it has a value associated with it.

Figure 5:
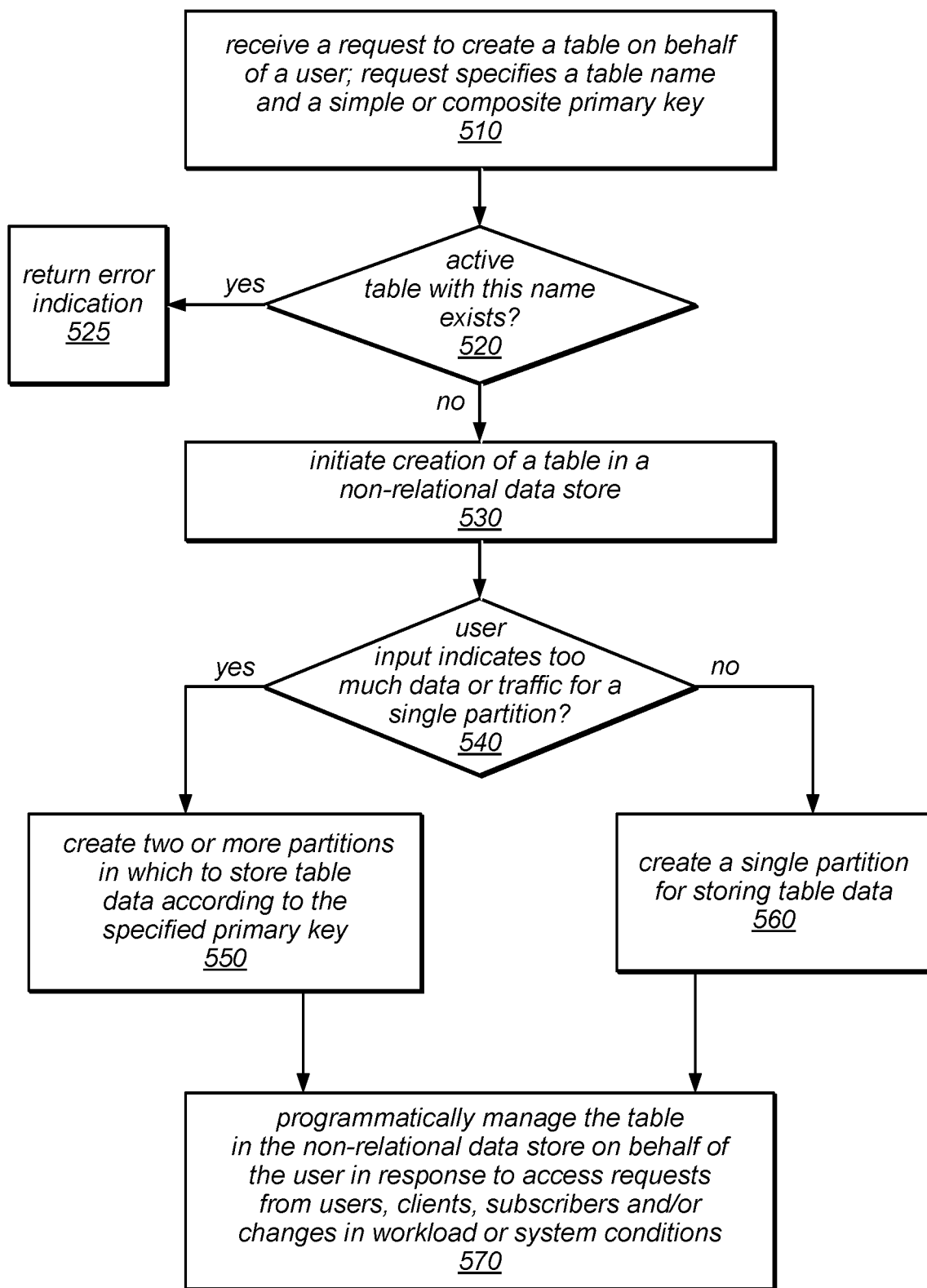
FIG. 5 is a flow diagram illustrating one embodiment of a method for creating a table to be maintained by a data storage service on behalf of a storage service client.

One embodiment of a method for creating a table to be maintained by a data storage service on behalf of a storage service client is illustrated by the flow diagram in FIG. 5. As illustrated at 510, in this example, the method may include a component of the system that implements the data storage service (e.g., a front end module or another component of the underlying system) receiving a service request to create a table on behalf of a user. The request may specify a name for the table and a simple or composite primary key for the table. In some embodiments, the request may also include an estimate of the eventual table size and/or an estimate of the workload (i.e. traffic) to be directed to the table, and/or a requested capacity or throughput traffic. In some embodiments, such information (if included in a request) may be used to determine an initial size for the table and/or an initial number of partitions for the table. In other embodiments, client or subscriber account information (e.g., preferences) or historical data for a particular storage service client (e.g., for a particular user, subscriber or client application) may be used to determine an initial size and/or number of partitions for a table being created.

As illustrated in this example, the method may include determining whether an active table that has the table name specified in the request already exists in the system, as in 520. If so, shown as the positive exit from 520, the method may include returning an error indication, as in 525. If no active table exists with the specified table name, shown as the negative exit from 520, the method may include the system initiating creation of a new table (having the specified table name) in a non-relational data store (e.g., a non-relational database or other storage structure), as in 530. In some embodiments, the request may be parsed to determine various service options. For example, the request may include an indication of one or more user preferences, such as a preferred service request throughput level, or a service request throughput level for which a guarantee is requested. In some embodiments, data to be stored in a newly created table may be included in a request to create the table, while in other embodiments, data to be stored in the table may be included in one or more service requests received by the data storage system subsequent to receiving the request to create the table. In various embodiments, there may be no pre-determined size limit or schema for the tables that are to be maintained by the data storage service.

In some embodiments, in response to receiving data to be stored in the table (through any number of service requests that include data to be stored in the table), the system may be configured to determine whether the amount of data to be stored in the table is too much to be stored in a single partition in the system. For example, in some embodiments, while the system may not impose a limit on the number (and/or size) of items that can be stored in a table, it may impose a pre-determined limit on the number (and/or size) of the items that can be stored in each partition in the non-relational data store. In some embodiments, user input may indicate whether there is expected to be too much data or too much traffic directed to the table to provide reasonable performance of the system if the table is implemented as a single partition. If so, shown as the positive exit from 540, the method may include the system creating two or more partitions in which to store the table data, according to the specified primary key, as in 550. For example, in embodiments in which the primary key is a simple key, a hash of the primary key value of each of the items may be used to partition the data. In embodiments in which the primary key is a composite key, the data may be partitioned first by a hash of the hash key component, and then by the range key component. For example, if the range key component represents a numeric identifier by which items having the same hash key component value are ordered, the first n items in order of their range key component values may be placed in one partition (wherein n is a number less than the number of items that can be stored in a single partition), and the next n items may be placed in another partition, and so on.

If the amount of data to be stored in the table or the traffic to be directed to the table is not too much for the table to be stored as a single partition in the system, shown as the negative exit from 540, the method may include the system creating a single partition in which to store the table data, as in 560. Thereafter, the system may be configured to programmatically (i.e. automatically) manage the table in the non-relational data store on behalf of the client/user in response to changes in workload or system conditions, and/or in response to receiving various service requests from users/subscribers or client applications, as in 570. For example, in some embodiments, the system may be configured to monitor the state of the system hardware, any changes in service request throughput, any table size increases (or decreases), and/or any changes in the frequency or targets of incoming service requests, and to automatically (e.g., programmatically) scale, re-configure and/or repartition the table as needed or in response to an explicit service request received from a storage service client.

The data storage service described herein (and/or the underlying system) may provide an application programming interface (API) for requesting various operations targeting tables, items, and/or attributes maintained on behalf of storage service clients. In some embodiments, the service (and/or the underlying system) may provide both control plane APIs and data plane APIs. For example, the data storage service may provide a collection of APIs that perform any or all of the following operations:

Create or delete a table.
    Request the current state of a table or tables, including primary key and creation information.
    Put (store) an item in a table.
    Get (retrieve) one or more items (and/or their attributes) via the primary key.
    Delete an item from a table.
    Update the attributes in a single item.

Query for items using a range index and comparison operators.

Scan over an entire table, optionally filtering the items returned using comparison operators.

The control plane APIs provided by the data storage service (and/or the underlying system) may be used to manipulate table-level entities, such as tables and indexes. These APIs may be called relatively infrequently (when compared to data plane APIs). In some embodiments, the control plane APIs provided by the service may be used to create tables, delete tables, and/or describe tables. In some embodiments, control plane APIs that perform updates to table-level entries may invoke asynchronous workflows to perform a requested operation. Methods that request "description" information (e.g., via a describeTables API) may simply return the current known state of the tables maintained by the service on behalf of a client/user.

The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API). In some embodiments, a common use model may be for a client to request an action (e.g., using a CreateTable API), and then to poll on its completion via the corresponding description API (e.g., DescribeTables).

Figure 6:
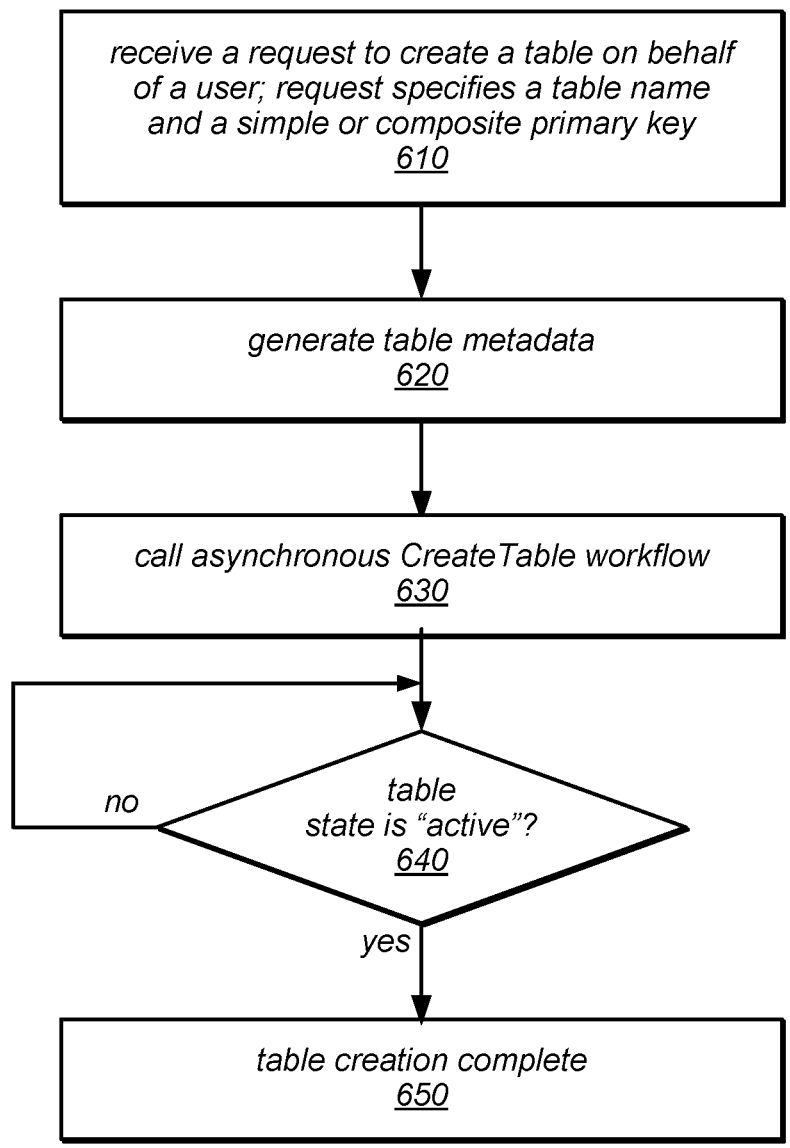
FIG. 6 is a flow diagram illustrating one embodiment of a method for creating a table in response to a request received through a web services API.
Figure 7:
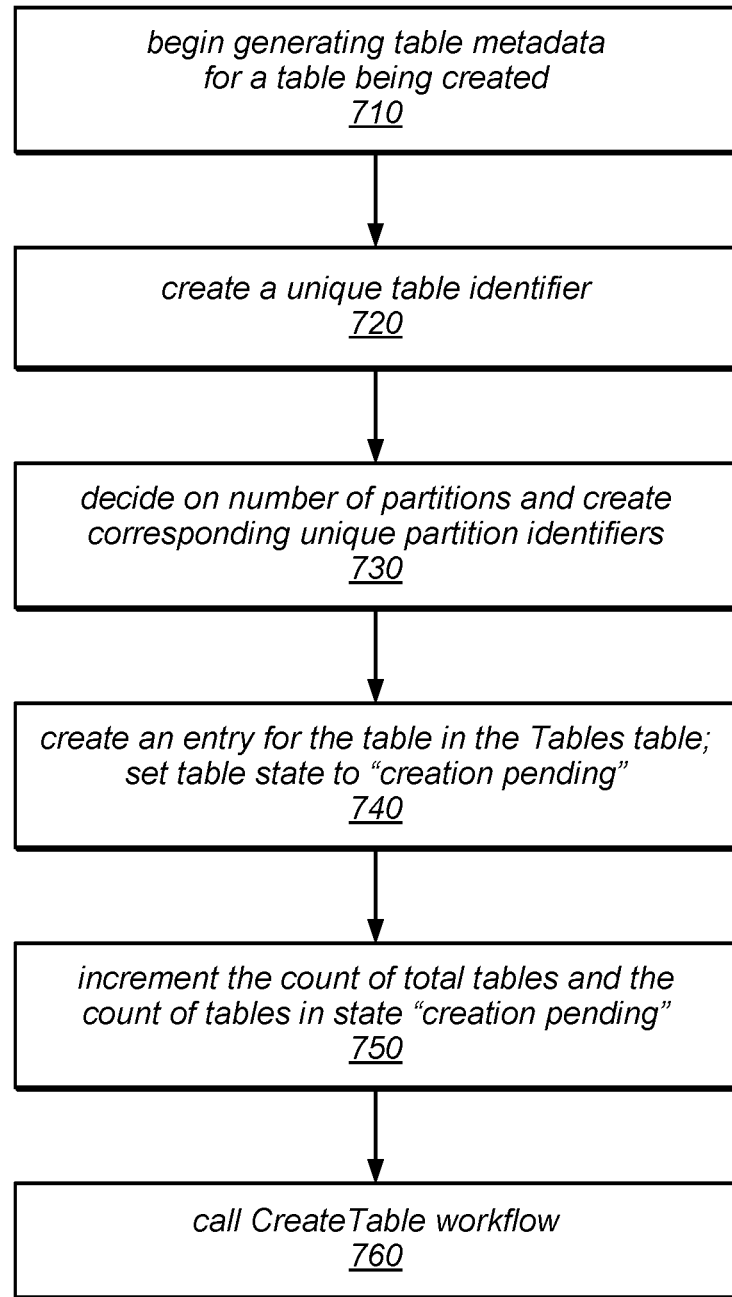
FIG. 7 is a flow diagram illustrating one embodiment of a method for generating table metadata.
Figure 8:
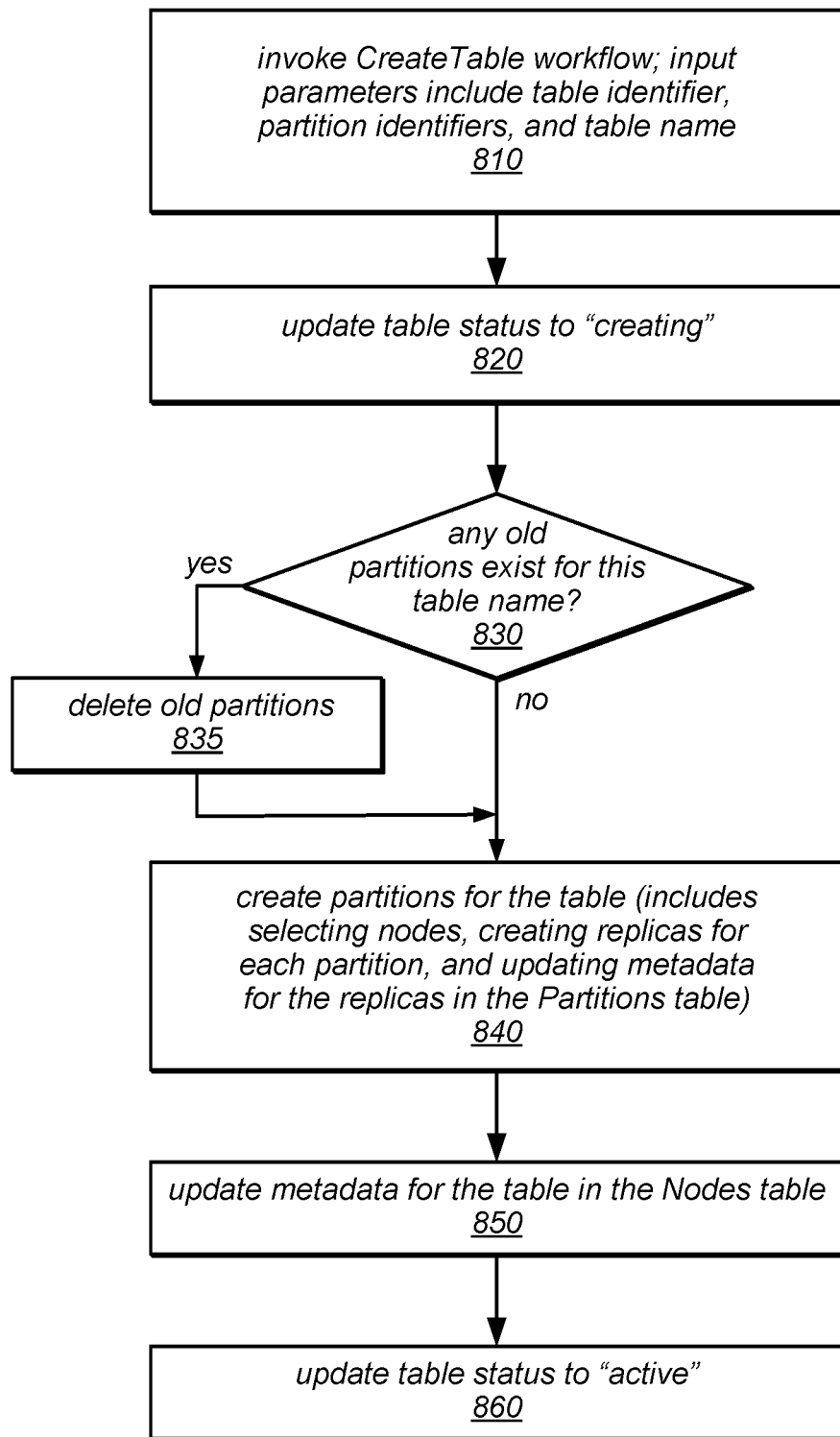
FIG. 8 is a flow diagram illustrating one embodiment of a CreateTable workflow.

In various embodiments, a CreateTable API may be used to create a table having a specified primary index (i.e. a primary key). In some embodiments, in response to receiving a request to create a table on behalf of a storage service client via this API, the service may trigger (and/or the underlying system implementing the service may invoke) an asynchronous CreateTable workflow that returns immediately (i.e. without waiting for the workflow to be completed). In such embodiments, the success of the workflow may be subsequently determined by checking the status of the table via a DescribeTables API. For example, each table being managed by the service on behalf of a client/user may be in one of the following table states, and an indication of the state of each table may be returned in a response to a DescribeTables request:

Creating—in which the table is being created
Active—in which the table exists
Deleting—in which the table is being deleted One embodiment of a method for creating a table in response to a request received through a web services API is illustrated by the flow diagram in FIG. 6. As illustrated in this example, the method may include a system that implements a data storage service receiving a service request to create a table on behalf of a user, as in 610. The request may include the name of the table to be created and may specify a simple or composite primary key for the table. In response to receiving the request, and if an active table having the specified table name does not already exist, the system may generate metadata for the table, as in 620. The generation of table metadata is illustrated in FIG. 7 and described in detail below, according to one embodiment. After creating metadata for the table, the method may include the system invoking an asynchronous CreateTable workflow (e.g., a component of the system may issue a call to a CreateTable method), as in 630. One embodiment of such a workflow is illustrated in FIG. 8 and described below. In some embodiments, a response may be returned from the CreateTable workflow immediately (i.e. prior to the completion of the CreateTable workflow, or in some cases prior to the CreateTable workflow beginning the process of creating the table).

In some embodiments, after invoking the CreateTable workflow, the system may continue to do other work, rather than waiting for the completion of the CreateTable workflow. For example, the system (or a component thereof) or an application (on behalf of a user) may be configured to periodically or occasionally check the status of the new table to see if it is in the "Active" state, as in 640. In some embodiments, this may involve issuing a service request using the DescribeTables API described herein. The status of the table may be checked repeatedly until its state is "Active", shown as the feedback loop from the negative exit of 640 to the input of 640. Once the table state is "Active", the table creation process may be considered complete, as in 650.

In some embodiments, the input parameters for a CreateTable API may include a TableName (which may be a string comprising the name of the table to be created), and a KeySchema for this API (which may describe the primary key for the table to be created). In some embodiments, the KeySchema may include an array describing a simple or composite primary key. For example, a simple primary key may include a single hash key, while a composite key may include a hash and a range key. In one embodiment, the index type of the primary key may be HASH or RANGE, and each attribute of the primary key may include a name (which may be a string comprising the name of an attribute) a data type for the attribute value (e.g., N or S), and the attribute value. As previously noted, a CreateTable request may be presented in a JSON request format or another suitable format, in different embodiments. The following is an example of a request to create a table with a composite primary index having two attributes: FolderID (a hash index of type string) and DateCreated (a range of dates, each represented as a number).

Example Request Format:

```
{
    CreateTable {
        "TableName": "Pictures",
        "KeySchema":[
            {
                "Name":"FolderID",
                "IndexType":"HASH",
                "DataType":"S"
            },
            {
```

```
        "Name" : "DateCreated",
        "IndexType" : "RANGE"
        "DataType" : "N"
      }
    ]
  }
}
```

In some embodiments, the output parameters for a CreateTable API may include the TableName (e.g., a string comprising the name of the table being created), a TableStatus (e.g., a string having the value "Creating"), a KeySchema (e.g., an array describing the primary key, which may be a simple hash key or include a range), and a DateCreated (which may be a string or number indicating the date and/or time when the table was created). As previously noted, a response to a CreateTable request may be presented in a JSON response format or another suitable format, in different embodiments. In some embodiments, if an attempt is made to create a table that already exists (e.g., one with the same name, primary key, and/or key schema), an indication of an error condition may be returned by the service (e.g., a ResourceInUse error condition). The following is an example of a response received from a data storage service corresponding to a CreateTable request.
Example Response Format:

```
{
  "TableName" : "Pictures",
  "TableStatus" : "Creating"
  "KeySchema" : [
    { "Name" = "ImageID",
      "IndexType" = HASH,
      "DataType" = "N"
    }
  ],
  "DateCreated" : "20100101T05:05:05Z"
}
```

As noted above, in response to receiving a request to create a table on behalf of a storage service client/user (e.g., using a CreateTable API), the data storage service (and/or the underlying system) may in some embodiments generate metadata to be associated with the table and invoke an asynchronous CreateTable workflow to create the table. In some embodiments, there may be multiple tables storing and/or maintaining metadata associated with table creation, and one or more of these tables may be updated with when a new table is created. For example, the system may maintain any or all of the following tables, in various embodiments:

Tables Table: This table may maintain a list of every table in the system, along with the current state of the table (e.g., Creating, Active, Deleting, etc). The primary key for this table may in some embodiments include a SubscriberId attribute (which may be used to identify the user on whose behalf the table will be maintained) and a TableName attribute (which may specify the name of the table that will be created). When an entry is created for the new table, the table status may be set to "Creation Pending", which may indicate that the table has been accepted for creation, but that a workflow has not yet been invoked to create the table.

Subscribers Table: This table may maintain a count of the total number of tables being maintained on behalf of a single client (i.e. user/subscriber or client application), and may also indicate how many of them are in each of the states Active, Creating, and/or Deleting. The primary key for this table may in some embodiments include a SubscriberId attribute, as described above. In some embodiments, this table may be treated as a secondary index to the Tables table. The count of the total number of tables and/or the count of the number of tables in the Creating state may be incremented in response to the invocation of a CreateTable workflow.

Partitions Table: This table may maintain a list of all partitions for a particular table, and may indicate their locations. The primary key for this table may in some embodiments include a TableId attribute and a PartitionId attribute.

Nodes Table: This table may maintain a list of nodes, and may indicate the partitions that are hosted on each of them. The primary key for this table may in some embodiments include a NodeId attribute. In some embodiments, this table may be treated as a secondary index to the Partitions table.

One embodiment of a method for generating table metadata for a table being created is illustrated by the flow diagram in FIG. 7. As described above, such a method may be invoked by a system that implements a data storage service in response to receiving a request to create a table on behalf of a user, where the request specifies a table name and a simple or composite primary key. The table name may be unique for a given user or across a given subscriber account. As illustrated in this example, once the method is invoked (as in 710), it may include creating a unique table identifier for the table, as in 720. For example, a component of the system may be configured to create a table identifier that is unique across the entire system. As illustrated in this example, the method may include deciding on the number of partitions that will be created and creating corresponding partition identifiers, as in 730. For example, a component of the system may be configured to apply historical usage data (e.g., for a user/subscriber or client application), an estimation of future usage provided by a user/subscriber, and/or other criteria to determine an appropriate number of partitions for the table and to create partition identifiers for each partition that are unique across the entire system.

In some embodiments, the method may include creating an entry for the new table in a Tables table (such as that described above), and setting the state of the new table to "Creation Pending", as in 740. The method may also include incrementing a count of the total number of tables being maintained in the system and/or a count of the number of tables in the system that in the Creation Pending state, as in 750. As illustrated in this example, once metadata for the table has been generated, and one or more metadata tables have been updated to reflect the pending creation of the new table, the method may include calling a CreateTable workflow, as in 760. As illustrated at 810 of FIG. 8, in some embodiments, the table name, table identifier, and/or partition identifiers may all be passed to the CreateTable workflow as inputs to that process. Note that this (and/or any other service requests described herein) may include an input parameter identifying a particular subscriber, such as an accountID parameter. In such embodiments, the value of this input parameter may be passed to any workflows invoked in response to receiving the service request (e.g., the CreateTable workflow).

Note that in other embodiments, metadata for a table maintained by a data storage service on behalf of one or ore storage system clients may be organized differently than in the example described above. For example, in other embodiments, the system may employ more, fewer, or different metadata tables, which may store more or less metadata than in this example, and/or different metadata of different types than that described in this example. Note also that in some embodiments, requests to create tables may be placed in a queue when they are received, and metadata for those tables may not be generated or stored until some time later (e.g., when a CreateTable workflow is invoked to perform the table creation).

As previously noted, a system that is configured to implement the data storage service described herein may rely on one or more workflows that are executed using a simple workflow service. In some embodiments, a CreateTable workflow may allocate one or more partitions for a new table, create two or more replicas each for the partitions, and update the appropriate metadata in response to creating the table. One embodiment of such a workflow is illustrated by the flow diagram in FIG. 8. The workflow may be intended to be self-healing, in some embodiments. In such embodiments, if the process fails before completion, the whole workflow may be rerun one or more times until it succeeds. For example, each of the operations illustrated in FIG. 8 may be retried again and again in response to a failure. Note that in this example, it is assumed that the workflow is invoked only after determining that no active table exists that has the specified table name.

As illustrated in this example, the workflow may include updating the status of the table to "Creating" to reflect the fact that a workflow is currently working to create the table, as in 820. In some embodiments, the table status may be atomically updated to "Creating". In such embodiments, if multiple workflows attempt to perform this same table creation operation, only one will succeed, thus allowing the system to avoid a race condition, in this case. The workflow may also include determining whether any old partitions exist that include the table name specified for the new table, as in 830. For example, if a creation operation specifying this table name has been attempted (and failed) in the past, there may be remnant partitions remaining in the system that should be deleted before proceeding with the rest of the CreateTable workflow. In some embodiments, the workflow may include querying metadata (e.g., the Tables table) for any partitions associated with this table name. For example, there may be remnants of a previous failed attempt to create a table with this table name in the system, including metadata for the table in one or more metadata tables. For each partition found, there may be multiple replicas, and each of these replicas may be physically deleted from the storage nodes on which they reside, as in 835.

In no partitions associated with the specified table name are found (e.g., if this table creation operation has not been previously attempted and failed), shown as the negative exit from 830, or once such remnants have been deleted, the workflow may create one or more partitions for the new table, as in 840. As previously described, in some embodiments, the number of partitions created may be based on user input, historical data, and/or system-wide, client-specific, or application-specific defaults. As illustrated in FIG. 8, creating partitions for the new table may include selecting nodes on which to store multiple replicas of each of the partitions, creating the multiple replicas, and updating the partition metadata (e.g., updating the Partitions table to include the newly created replicas and to indicate their locations). In some embodiments, selecting the nodes on which to store the replicas may include querying metadata to discover healthy nodes on which replicas can be stored, and allocating replicas to various ones of the healthy nodes using any of a variety of suitable allocation algorithms. In some embodiments, the system may support two or more flexible and/or pluggable allocation algorithms, including, but not limited to, selecting the nodes that have the most available storage space, selecting the nodes experiencing the lightest workload (e.g., the nodes receiving the fewest service requests), or selecting nodes at random (which may minimize a herding effect in which all new partitions go to the most lightly loaded nodes).

As illustrated in FIG. 8, the CreateTable workflow may include updating node related metadata for the newly created table (e.g., in the Nodes table), as in 850. For example, the workflow may include reading all of the node locations of the newly created replicas from the Partitions table (which was updated in 840), and adding each of the newly created replicas to the appropriate entries of the Nodes table. Once the table's partitions (and their replicas) have been created, and the appropriate metadata has been updated to reflect the creation of the new table, the workflow may include updating the status of the newly created table to "Active", as in 860. In some embodiments, updating the status of the newly created table to "Active" may include decrementing a count of the number of tables that are in the Creating state in the Subscribers table described above.

As noted above, in some embodiments, if any of the operations illustrated in FIG. 8 fail, they may be retried up to a pre-determined maximum number of attempts. For example, in one embodiment, any CreateTable workflow step that is unsuccessful may be retried up to ten times, and may employ an exponential back-off between attempts. In some embodiments, if the workflow step does is not successfully completed after the maximum number of attempts, the state of the table being created may be reset to Creation Pending to indicate that no workflow is currently working on creating the table. In such cases, the system may or may not perform cleanup of any residual replicas created during the unsuccessful attempts. For example, in some embodiments, this cleanup may be left for a subsequent CreateTable workflow. In some embodiments, a sweeper workflow may run periodically (e.g., once every 30 minutes), and may scan the Tables table to determine if there are any tables currently in state Creation Pending. If so, and if the state of this table has not been updated since the last time the Tables table was scanned by the sweeper workflow, the sweeper workflow may assume that the creation of this table failed, and may invoke a new CreateTable workflow in an attempt to create the table.

The use of the CreateTable API may be illustrated by way of the following examples (i.e. by the pseudo code below). In the first example, a request is made to create a table named "Merchandise" in which the primary key is a hash value "ID" and in which each ID value in the table must be a number:

```
CreateTable ('Merchandise', array (
    'HashKeyElement' => array (
        'AttributeName' => 'ID',
        'AttributeType' => NUMBER
    )));
```

In the second example, a request is made to create a table named "Merchandise" in which the primary key is a hash-with-range key (i.e. a composite key). In this example, the primary key includes a hash value "ID" (where each ID in the table must be a number), and also includes a range added to the primary key of "song" (where each song is a string).

In this example, after requesting that the table be created, using the CreateTable API, a DescribeTables API is repeatedly invoked to poll the server until the new table is created and active.

```
CreateTable ('Merchandise', array (
    'HashKeyElement' => array (
        'AttributeName' => 'ID',
        'AttributeType' => NUMBER
    ),
    'RangeKeyElement' => array (
        'AttributeName' => 'song',
        'AttributeType' => STRING
    )
));
// Poll and sleep until the table is ready.
    do {
        sleep(3);
        status = DescribeTables (array (
            'TableNames' => 'Merchandise'
        ));
        status = status->body->Tables->to_array( );
    }
    while (status[0]['TableStatus'] !== 'ACTIVE');
```

In some embodiments, a storage service client (e.g., a user, subscriber, or client application with access to the service) may be able to create multiple tables. In some such embodiments, the system may impose a pre-determined limit on the number of tables that a client can create. Such a limit may protect the system and/or the client/user from the possibility that a run-away process creates an unintentionally large number of tables. In some embodiments in which such a limit is employed, it may be overridden by a system administrator or other privileged user (e.g., via an admin console, as described above). In some embodiments, all tables may be owned by a root user (e.g., a table owner or other privileged user), and this root user may be able to assign API level permissions to various tables to enable and/or restrict operations on those table by other users (e.g., sub-users). For example, in some embodiments, an individual user may be defined by a combination of a root user identifier and a sub-user identifier, as follows: user={root sub-user}. In some embodiments, access control filters may be defined at the item level and/or at the attribute level in addition to, or instead of, at the table level.

In various embodiments, a DeleteTable API may be used to delete a table and all of its indexes. In some embodiments, if a table that is the target of a DeleteTable API is in a Creating state when the request to delete to that table is received on behalf of a storage service client, the service may return an indication of an error (e.g., a 400 "ResourceInUse" error indication). If the table is in an Active state when the request is received, the service may trigger (and/or the underlying system implementing the service may invoke) an asynchronous DeleteTable workflow that returns immediately (i.e. without waiting for the workflow to be completed). In such embodiments, the success of the workflow may be subsequently determined by checking the status of the table via a DescribeTables API. For example, if the indication of the state of the table that is returned in a response to a DescribeTables request is "Deleting" then the delete operation may be in progress. In some embodiments, no error indication would be returned in this case. Once the delete process is complete, the response to a DescribeTables request may no longer include an entry for the deleted table.

In some embodiments, the input parameters for a DeleteTable API may include a TableName (which may be a string comprising the name of the table to be deleted). In some embodiments, the output parameters for a DeleteTable API may include the TableName (e.g., a string comprising the name of the table being deleted), a TableStatus (e.g., a string having the value "Deleting"), a KeySchema (e.g., an array describing the primary key), and a DateCreated (which may be a string or number indicating the date and/or time when the table was created). As described above, in some embodiments, the KeySchema may include an array describing a simple or composite primary key. For example, a simple primary key may include a single hash key, while a composite key may include a hash and a range key. In one embodiment, the index type of the primary key may be HASH or RANGE, and each attribute of the primary key may include a name (which may be a string comprising the name of an attribute) a data type for the attribute value (e.g., N or S), and the attribute value. As previously noted, a DeleteTable request and/or response may be presented in a JSON request/response format or another suitable format, in different embodiments. Examples of a request to a data storage service and a response received from a data storage service corresponding to a DeleteTable API are found below, according to one embodiment.

Example Request Format:

```
{
    DeleteTable {
        "TableName":"Pictures"
    }
}
```

Example Response Format:

```
{
    "TableName" : "Pictures",
    "TableStatus" : "Deleting",
    "KeySchema" : [
        { "Name" = "ImageID",
          "IndexType" = HASH,
          "DataType" = "N"
        }
    ],
    "DateCreated" : "20100101T05:05:05Z"
}
```

In various embodiments, a DescribeTables API may be used to enumerate (e.g., list) information about tables belonging to a given storage service client. For example, in response to receiving a request on behalf of a user to describe tables belonging to that user, the data storage system may return primary key information and/or the status of any tables specified in the request or (if none are specified) all tables that belong to that user. In some embodiments, the input parameters for a DescribeTables API may include a TableNames parameter (which may be a list of strings comprising the names of the tables to be described), and/or a LastTableName parameter (which may be a string comprising the name of the table from which to continue listing table information if a pre-determined limit on the number of tables that can be included in a response has been exceeded). For example, in some embodiments, if the number of tables to be returned exceeds a pre-determined limit, the query may be terminated early (i.e. without describing all of the tables targeted by the request) and the name of the last table considered by the query may be returned. In such embodiments, this last table name may be subsequently used to continue the query from that point onward. In some embodiments, if the TableNames parameter is empty (or otherwise unspecified), all tables belonging to the user may be described in one or more responses to a DescribeTables request.

In some embodiments, the output parameters for a DescribeTables API may include a Tables parameter (which may include a list of tables owner by a given user, along with information about each of those tables) and/or a LastTableName parameter (which may indicate the name of the last table about which information was returned, if the number of tables exceeds the maximum number of tables about which information can be returned in a response to a single DescribeTables call). In some embodiments, for each table listed in the response, any or all of the following information may be included: the TableName (e.g., a string comprising the name of the table), a TableStatus (e.g., a string having a value of "Creating", "Active" or "Deleting"), a KeySchema (e.g., an array describing the primary key), and a DateCreated (which may be a string or number indicating the date and/or time when the table was created). As described above, in some embodiments, the KeySchema may include an array describing a simple or composite primary key. For example, a simple primary key may include a single hash key, while a composite key may include a hash and a range key. In one embodiment, the index type of the primary key may be HASH or RANGE, and each attribute of the primary key may include a name (which may be a string comprising the name of an attribute) a data type for the attribute value (e.g., N or S), and the attribute value. In some embodiments, if one or more of the tables specified in a DescribeTables request does not exist, an error indication (e.g., a 400 "ResourceNotFound" error indication) may be returned in response to the request. As with other APIs provided by the data storage service, a DescribeTables request and/or response may be presented in a JSON request/response format or another suitable format, in different embodiments. Examples of a request to a data storage service and a response received from a data storage service corresponding to a DescribeTables API are found below, according to one embodiment.

Example Request Format:

```
{
  DescribeTables {
    "TableNames": [ ]
  }
}
```

Example Response Format:

```
{ "Tables" : [{
    "TableName" : "Pictures",
    "TableStatus" : "Deleting",
    "KeySchema" : [
      { "Name" = "ImageID",
        "IndexType" = HASH,
        "DataType" = "N"
      }
    ],
    "DateCreated" : "20100101T05:05:05Z"}]
}
```

As noted above, the data storage service (and/or underlying system) described herein may provide various data plane APIs for performing item-level operations, such as a PutItem API, a GetItem API, a DeleteItem API, and/or an UpdateItem API, as well as one or more index-based seek/traversal operations across multiple items in a table, such as a Query API and/or a Scan API.

In some embodiments, a PutItem API may be used to insert a new (single) item in a table. In some embodiments, this API may be used to perform a conditional put operation. For example, it may be used to insert an item in a table if it does not already exist in that table (according to the specified value of the primary key), or to replace an existing single item in a table if it has certain attribute values (e.g., a specified primary key). More specifically, in some embodiments this API may be used to completely replace all of the attributes of an existing item (except the primary key) with new attributes to create a "new" item. In such embodiments, the data storage system may guarantee that this replacement operation is performed atomically. In other words, the system may perform the replacement operation in a way that guarantees that the item is observable only with all of its new attributes or with all of its previous attributes, and is not observable in an interim state (e.g., with a mix of previous and new attributes). In some embodiments, the PutItem API may be an idempotent API if a conditional put operation is not specified. In other words, a request made using a non-conditional form of the PutItem API may insert a specified new item in a table exactly once, even if it is called multiple times with the same input parameter values.

In some embodiments, the input parameters for a PutItem API may include a TableName (which may be a string comprising the name of the table in which to insert or replace an item), an Item parameter (which may map one or more attribute names to respective attribute values), an Expected parameter (which may specify a mapping of attribute names to respective attribute values for a conditional Put), and/or a ReturnValues parameter (which may be a string indicating which, if any, values should be returned as a result of the operation, e.g. "None", "All Old", or "All New"). In some embodiments, if a ReturnValues parameter value of "None" is specified, there may be no return value for this API. If a ReturnValues parameter value of "All_Old" is specified, this API may return the previous contents of an item that was overwritten by the PutItem operation. If a ReturnValues parameter value of "All New" is specified, this API may return the contents of the item following the PutItem operation. Note that in some embodiments, the mapping included in the Item parameter must contain the primary key attribute(s) as defined for the specified table. In some embodiments, each attribute included in the Expected parameter may include an ExpectedAttributeValue (which may be a string having the value "Exists" or "Value"), an AttributeValue (which may indicate the value of the attribute to be used in the evaluation of a condition, or may have an empty or null value), and/or an Exists parameter (which may indicate that the condition to be evaluated is whether an attribute included in the Expected parameter is currently specified for an existing item). In this example, if ExpectedAttributeValue is set to "Value", a value must supplied for AttributeValue, while if ExpectedAttributeValue is set to "Exists", the AttributeValue should be null or empty. If a condition specified in a request via the PutItem API is not met (e.g., if the expected value of one or more attributes does not match what is stored in the table), an error indication (e.g., ConditionalCheckFailed) may be returned by the data storage system.

A PutItem request may be presented in a JSON request format or another suitable format, in different embodiments. The following is an example of a PutItem request that stores an item in the table only under the condition that the item does not already contain a populated "Tags" field. In essence, this example illustrates a put operation with Put-If-Absent semantics.

Example Request Format:

```
{
   PutItem{
      "TableName" : "Pictures",
      "Item" : {
         "PictureId" : {"S" : "pic123"},
         "Title" : {"S" :"Sun Flower"),
         "Tags" : {"SS" : ["Flower", "Sun"]}
      }
      "Expected" : {
         "Tags" : { "Exists" : false}},
      }
      "ReturnValues" : "All_Old"
   }
}
```

In some embodiments, the output parameters for a PutItem API may include an Attributes parameter (which may map one or more attribute names to their respective values). In the example above, this mapping may only be returned when the input parameter ReturnValues is not "None". The following is an example of a response received from a data storage service corresponding to a PutItem request in which ReturnValues is specified as "All_Old".

Example Response Format:

```
{
   "Attributes" : {
      "PictureId" : {"S" : "pic123"},
      "Title" : {"S" :"Sun Flower"}
   }
}
```

The use of the PutItem API may be further illustrated by way of the following examples (i.e. by the pseudo code below). In the first example, a request is made to add a new item to a table named "my-table2", for which the primary key is a hash value "ID". In this example, the item includes an ID value (which is a number) and values for the additional attributes Category, Subcategory, Color, and Size (each of which specifies one or more strings).

```
PutItem ('my-table2', array (
   'ID' => array (NUMBER => 1), // Primary Key
   'Category' => array (STRING => 'Clothes'),
   'Subcategory' => array (STRING => 'Sweater'),
   'Color' => array (STRING => 'Blue'),
   'Size' => array (ARRAY_OF_STRINGS => array ('Medium', 'Large')),
   ));
```

In the second example, a request is made to replace an existing item using the PutItem API. In this example, a request is made to replace the existing item (an item having a primary key value ID=1) with an item that has new attributes. Note that by setting the ReturnValues parameter to "All_Old" this request specifies that the old attributes of the item should be returned.

```
PutItem ('my-table2', array (
   'ID' => array (NUMBER => 1), // Primary Key
   'Category' => array (STRING => 'Tools'),
   'Subcategory' => array (STRING => 'Shovel'),
```

```
   ), array (
   'ReturnValues' => All_Old));
```

In various embodiments, a DeleteItem API may be used to delete a single item in a table, where the item is identified by its primary key. In some embodiments, this API may be used to perform a conditional delete operation. For example, it may be used to delete an item if it exists, or if it has certain attribute values (e.g., particular attribute values other than the specified primary key). In some embodiments, the DeleteItem API may be an idempotent API if a conditional put operation is not specified. In other words, a request made using a non-conditional form of the DeleteItem API may cause the system to delete a specified new item in a table exactly once, even if it is called multiple times with the same input parameter values. In these and other embodiments, attempting to delete a non-existent item may not result in an error condition, and may not cause an error indication to be returned.

In some embodiments, the input parameters for a DeleteItem API may include a TableName (which may be a string comprising the name of the table from which to delete an item), a Key (which may specify the simple/single or composite primary key that identifies the item to be deleted), an Expected parameter (which may specify a mapping of attribute names to respective attribute values for a conditional delete), and/or ReturnValues (which may be a string indicating which, if any, values should be returned as a result of the operation, e.g. "None", "All_Old"). In some embodiments, if a ReturnValues parameter value of "None" is specified, there may be no return value for this API. If a ReturnValues parameter value of "All_Old" is specified, this API may return the contents of the item that was deleted by this operation. For example, when "All_Old" is specified, the output parameters for this API may include an Attributes parameter (which may comprise a mapping between the attribute names and their respective values for all of the attributes of the deleted item). In some embodiments, each attribute included in the Expected parameter may include an ExpectedAttributeValue (which may be a string having the value "Exists" or "Value"), an AttributeValue (which may indicate the value of the attribute or may have an empty or null value), and/or an Exists parameter (which may indicate that the condition to be evaluated is whether an attribute included in the Expected parameter is currently specified for an existing item). If a condition specified in a request via the DeleteItem API is not met (e.g., if the expected value of one or more attributes does not match what is stored in the table), an error indication (e.g., ConditionalCheckFailed) may be returned by the data storage system. In some embodiments, a DeleteItem request and/or response may be presented in a JSON request/response format or another suitable format, in different embodiments. Examples of a request to delete an item and a response received from a data storage service corresponding to a DeleteItem API are found below, according to one embodiment.

Example Request Format:

```
{
   DeleteItem:{
      "TableName" : "Pictures",
      "Key":[1, "picture-id"],
      "Expected" : {
         "Title" : {"AttributeValue" :{"S":"flower"}}
```

```
    }
   }
  }
```

Example Response Format:

```
{
  "Attributes" : {
    "CustomerId" : {"N" : 1},
    "PictureId" : {"S" : "picture-id"},
    "Title" : {"S":"flower"}
  }
}
```

Note that in the example illustrated above, the request did not specify a ReturnValues parameter value, but the old attribute values were returned. This illustrates an embodiment in which the default value for the ReturnValues parameter is "All_Old". In other embodiments, the default value of this parameter may be a different value (e.g., "All New", or "None"), or there may not be a default value for this parameter (i.e. it may be a mandatory input parameter).

In various embodiments, a GetItems API may be used to retrieve one or more items (i.e. to return one or more attributes of those item), given their primary keys. In some embodiments, the number of items that can be retrieved in response to a single GetItems request may be limited and/or the items retrieved must all be stored in the same table. For example, in one embodiment, attributes for a maximum of eight items may be returned in response to a single GetItems request. In some embodiments, multiple items may be retrieved from a table in parallel, which may minimize latency. The data storage service (and/or the underlying system) may support projection and/or consistent reads (without a latency penalty), in various embodiments. In some embodiments, the system may support an eventual consistency model by default, which may result in higher throughput for servicing requests. In some embodiments in which multiple items are requested in a single GetItems request, items that do not exist in the targeted table will not be returned. In this case, there may or may not be any error messages returned to indicate that one or more of the requested items were not returned.

In some embodiments, the input parameters for a GetItems API may include a TableName (which may be a string comprising the name of the table from which to delete an item), a Keys parameter (which may specify a list of the simple/single or composite primary keys that identify the items to be retrieved), an AttributesToGet parameter (which may be an array of attribute names as strings), and/or a ConsistentRead parameter (which may be a Boolean value indicating whether a consistent read will be issued). In some embodiments, if no attribute names are specified, then all attribute values that have been defined for the identified items may be returned. In some embodiments, if values for any of the specified attributes are not found, the corresponding attribute name will not appear in the result. In some embodiments, if the ConsistentRead parameter is set to true, a consistent read operation will be issued. Otherwise, an eventually consistent read operation will be performed. Note that in some embodiments, strictly consistent reads (e.g., those for which the value of a ConsistentRead parameter is true) may be directed to the master for a given replica group, while reads performed with eventual consistency may be directed to any of the replicas of a given replica group. As previously noted, the number of items that can be retrieved in response to a single GetItems request may be limited to a pre-determined number, in some embodiments. The output parameters for a GetItems API may include an Items parameter, which may be an array of items, each of which comprises a map of the requested attributes and their values (if any are specified, i.e. non-empty, for the item). Note that in some embodiments the items in the array may not be ordered in any particular way. In such embodiments, including the primary key in the list of requested attributes may provide a way to identify the attributes that correspond to each retrieved item and/or to determine which of the requested items were (and/or were not) found and retrieved. In some embodiments, there may be no error indications defined specifically for this API, although one or more of the error indicators listed in Table 9 and described herein may apply. Examples of a request to retrieve several items using a GetItems API and a response received from a data storage service corresponding that request are found below, according to one embodiment.

Example Request Format:

```
{
  GetItems {
    "TableName" : "Pictures",
    "Keys" : [["image123"], ["image456"], ["image789"]],
    "AttributesToGet" : ["ImageId", "Title", "Tags"],
    "ConsistentRead" : true
  }
}
```

Example Response Format:

```
{
  "Items" : [
    {"ImageId" : {"S": "image123"), "Title": {"S": "sun flower"},
"Tags": {"SS": ["flower"]}},
    {"ImageId" : {"S" :"image456"}, "Title" : {"S" : "jasmine flower"},
"Tags": {"SS": ["flower", "jasmine"]}}
  ]
}
```

In various embodiments, an UpdateItem API may be provided by the data storage service (and/or the underlying system). This API may be used to insert an item if it does not already exist, or to manipulate an existing item at the attribute level (e.g., to modify the values of one or more of its attributes). For example, updating an item may include inserting, replacing, and/or deleting various attributes of an existing item. In some embodiments, updating an item may include atomically incrementing or decrementing the value of an attribute having a number type. While the PutItem API described above may be used to replace all of the attribute values of an existing item, the UpdateItem API described herein may provide a more granular replacement operation. In other words, this API may be used to modify a subset of the attribute values of an existing item, and/or to modify the set of attributes that are defined for an existing item.

Figure 9:
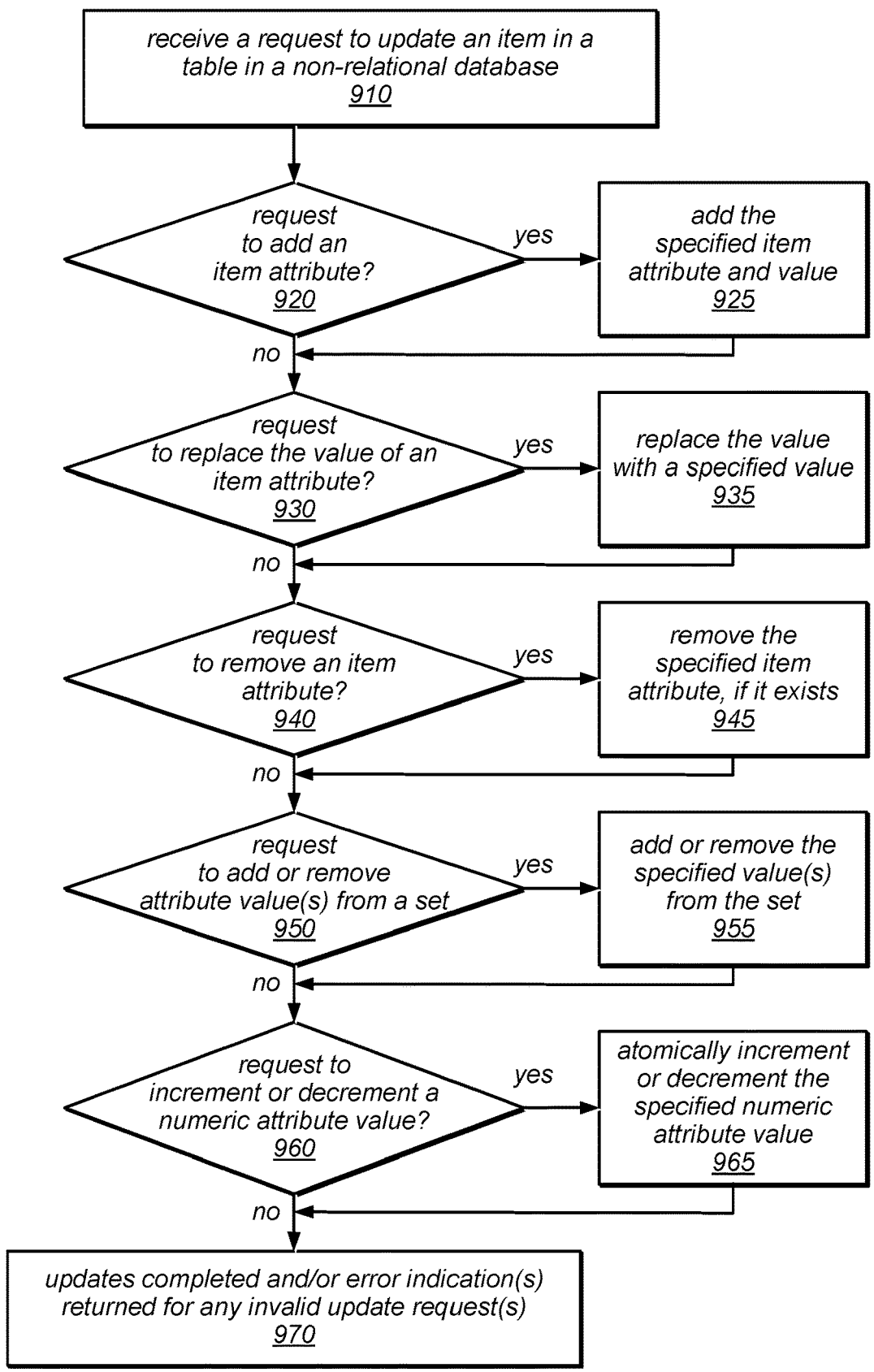
FIG. 9 is a flow diagram illustrating one embodiment of a method for updating an item in response to a request to do so.

One embodiment of a method for updating an item in response to a request to do so is illustrated by the flow diagram in FIG. 9. As illustrated at 910, in this example, the method may include receiving a service request to update an item in a table in a non-relational database (e.g., a table maintained on behalf of a data storage service client). As in previous examples, an UpdateItem request may include a table name and a primary key (which may collectively identify the item that is the target of the update request), and one or more other input parameter values indicating the update(s) being requested. If the request indicates that an item attribute should be added to an item, as in 920, the attribute included in the request may be added to the item and may be assigned a value that is also included in the request, as in 925. For example, in response to an UpdateItem request that includes a PUT action for a particular attribute name that does not already exist in the item, the attribute name-value pair corresponding to the PUT action may be added to the item. Similarly, in response to an UpdateItem request that includes an ADD action for a scalar numeric attribute or a set type attribute that does not already exist in the item, the attribute name-value pair corresponding to the ADD action may be added to the item.

As illustrated in this example, if the request indicates that the value of an item attribute should be replaced in an item, as in 930, the value of an attribute that is included in the request may be replaced by a value that is also included in the request, as in 935. For example, in response to an UpdateItem request that includes a PUT action for a particular attribute name that already exists in the item, the value of that attribute may be updated with a value that was specified in the attribute name-value pair associated with the PUT action in the request.

As illustrated in FIG. 9, if the request indicates that an item attribute should be removed from an item, as in 940, that attribute and its value(s) may be removed from the item, as in 945. For example, in response to an UpdateItem request that includes a DELETE action for a scalar type attribute that exists in the item, that attribute and its value may be removed from the item. Similarly, in response to an UpdateItem request that includes a DELETE action for a set type attribute that exists in the item, where the request does not specify any of the values in the attribute's set, the attribute and its entire set of values may be removed from the item.

As illustrated in this example, if the request indicates that one or more values should be added to or removed from a set of values for an item attribute, as in 950, the specified value(s) of the attribute that is included in the request may be added or removed from the set, as in 955. For example, in response to an UpdateItem request that includes an ADD action for a set type attribute name that already exists in the item, one or more values specified in the attribute name-value pair associated with the ADD action in the request may be added to the set of values for the attribute in the item. Conversely, in response to an UpdateItem request that includes a DELETE action for a set type attribute name that already exists in the item, one or more values specified in the attribute name-value pair associated with the DELETE action in the request may be removed from the set of values for the attribute in the item.

If the request indicates that the value of an attribute in an item should be incremented or decremented, as in 960, the value of the attribute that is included in the request may be atomically incremented or decremented by an amount that is also included in the request, as in 965. For example, in response to an UpdateItem request that includes an ADD action for a scalar, numeric attribute name that already exists in the item, the value of that attribute may be atomically incremented by an amount specified in the request (e.g., if the specified amount is a positive number) or atomically decremented by an amount specified in the request (e.g., if the specified amount is a negative number). In other embodiments, the value of a numeric attribute may always be incremented or decremented by a default amount, or may be incremented or decremented by a default amount if no amount by which to increment or decrement the value is specified in the request.

As illustrated at 970 in FIG. 9, once any valid updates specified in the UpdateItem request have been performed, the method may be complete. However, if any of the specified updates were invalid (e.g., if any input parameters were missing or their values were of the wrong type, etc.), the method may include returning one or more error indications. In some embodiments, any valid updates specified in the request may be performed, even if other updates specified in the request are invalid. In other embodiments, if any of the specified updates are invalid, none of the updates will be performed. As noted above, a single UpdateItem service request may specify multiple updates to be applied to various attributes of a single item, in some embodiments. Therefore, each of the update operations illustrated in FIG. 9 (e.g., 925, 935, 945, 955, 965) may be performed multiple times if two of more updates of the corresponding type are specified in a single service request. In addition, a single request may indicate that different types of updates should be performed on respective item attributes. Therefore, multiple ones of the update operations illustrated in FIG. 9 (e.g., 925, 935, 945, 955, 965) may be performed in response to a single UpdateItem request. This is illustrated in FIG. 9 by the feedback from 925 to 930, from 935 to 940, from 945 to 950, and from 955 to 960.

In various embodiments, UpdateItem API provided by the data storage service (and/or the underlying system) may perform a conditional update. In such embodiments, this API may be used to conditionally insert an item (e.g., to create an item if it does not already exist), or to conditionally replace (i.e. update) an item (e.g., only if its attributes match any specified expected values). Updating an item may include inserting, updating, and/or deleting various attributes of an existing item. In some embodiments, the data storage system may optionally return the old attribute values for an item that is replaced/updated using this API.

In some embodiments, the input parameters for an UpdateItem API may include a TableName (which may be a string comprising the name of the table in which the item to be updated is stored or in which an item is to be conditionally inserted), a Key parameter (which may specify a simple/single or composite primary key that identifies the item to be conditionally updated or inserted), an AttributeUpdates parameter (which may be an array mapping each of one or more specified attribute names to a respective AttributeUpdate structure), an Expected parameter (which may specify a mapping of attribute names to respective attribute values for a conditional put), and/or a ReturnValues parameter (which may be a string indicating which, if any, values should be returned as a result of the operation, e.g. "None", "All_Old", "Update_Old", "All New", or "Updated_New").

Each AttributeUpdate structure may include an AttributeValue parameter (which may specify the updated value for the corresponding attribute), and an Action parameter (which may be a string specifying the action to be taken, e.g., "PUT", "ADD", or "DELETE"). The ADD action, when supported, may allow numerical attribute values to be atomically incremented or decremented by a specified amount. Note that because a respective Action parameter value may be specified for each attribute to be modified, a single UpdateItem operation may be used to apply different actions to each of the attributes targeted by an UpdateItem request. For example, in response to a single UpdateItem request, the data storage system may delete one or more attribute values of a specified item, increment or decrement one or more other attribute values of the specified item, and/or replace one or more other attribute values with a specified new value. In some embodiments, the default value of the Action parameter (e.g., if none is specified) may be "PUT". Note that since every item must have an immutable primary key, the attributes that are part of the key cannot be modified or deleted using the UpdateItem API. In other words, the AttributeUpdates parameter cannot include a reference to any primary key attributes. Note also that the AttributeValue parameter may be optional when the specified Action parameter value is "DELETE".

In some embodiments, each attribute included in the Expected parameter may include an ExpectedAttributeValue (which may be a string having the value "Exists" or "Value"), an AttributeValue (which may indicate the value of the attribute or may have an empty or null value), and/or an Exists parameter (which may indicate that the condition to be evaluated is whether an attribute included in the Expected parameter is currently specified for an existing item). If a condition specified in a request via the UpdateItem API is not met (e.g., if the expected value of one or more attributes does not match what is stored in the table), an error indication (e.g., ConditionalCheckFailed) may be returned by the data storage. In some embodiments, if a ReturnValues parameter value of "None" is specified, there may be no return value for this API. If a ReturnValues parameter value of "All_Old" is specified, this API may return the contents (i.e. all attribute values) of the item that was targeted by the UpdateItem operation prior to the performance of the UpdateItem operation. If a ReturnValues parameter value of "Update_Old" is specified, only the previous value(s) of any updated attribute(s) may be returned (rather than all attribute values). If a ReturnValues parameter value of "All New" is specified, all the attributes of the new version of the targeted item may be returned (i.e. all of the attribute values for the item following the performance of the UpdateItem operation). If a ReturnValues parameter value of "Updated_New" is specified, only the new value(s) of any updated attribute(s) may be returned (rather than all attribute values).

Figure 10:
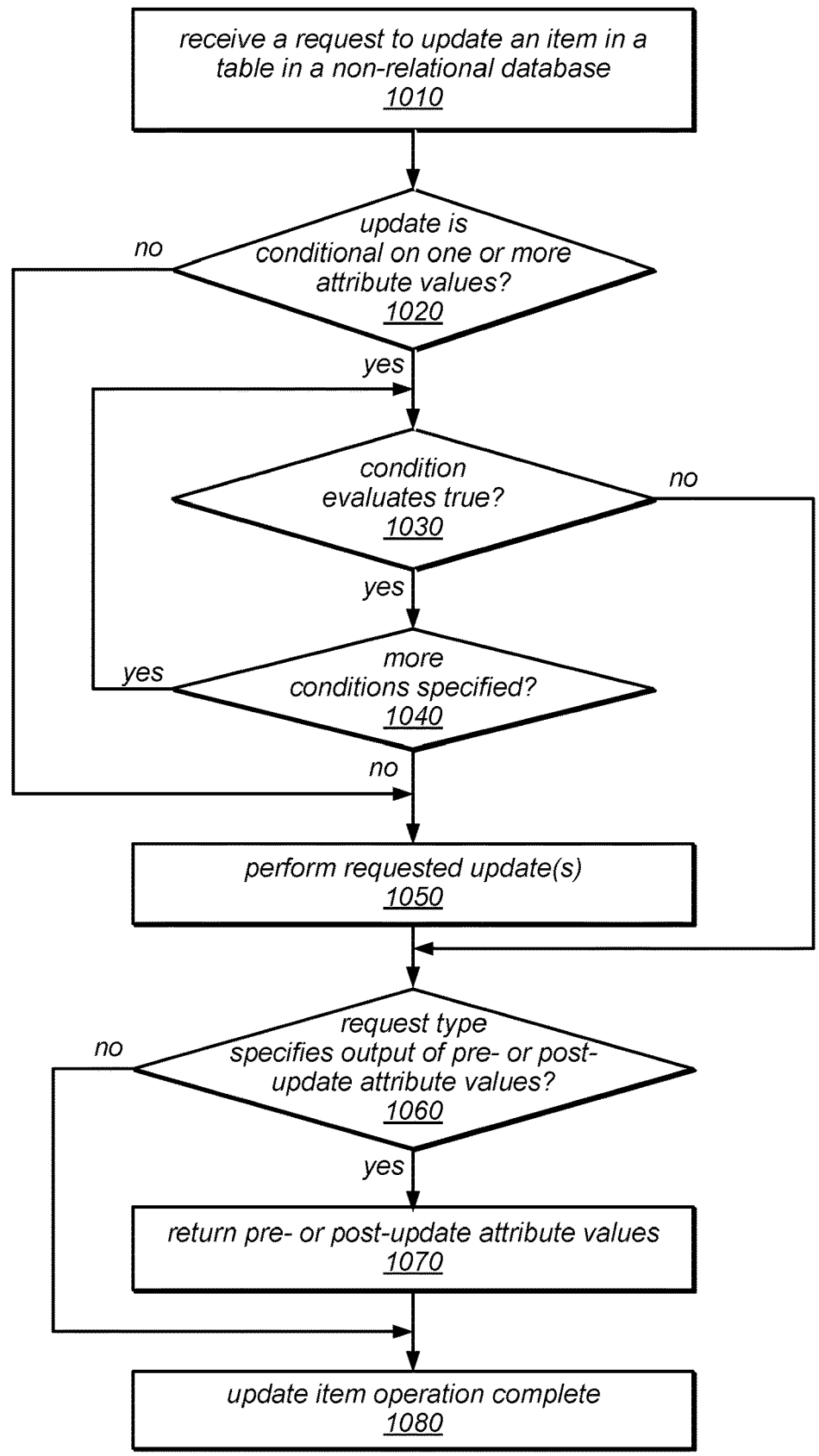
FIG. 10 is a flow diagram illustrating one embodiment of a method for updating an item using an API that supports conditional updates and/or multiple output options.

One embodiment of a method for updating an item using an API that supports conditional updates and/or multiple output options is illustrated by the flow diagram in FIG. 10. As illustrated in this example, the method may include receiving a service request to update an item in a table in a non-relational database (e.g., a table maintained on behalf of a data storage service client). As in previous examples, an UpdateItem request may include a table name and a primary key (which may collectively identify the item that is the target of the update request), and one or more other input parameter values indicating the update(s) being requested. If the update request is not conditional on any attributed values in the item, shown as the negative exit from 1020, the update(s) specified in the request may be performed, as in 1050. However, if the update request is conditional on one or more attribute values in the item matching corresponding values specified in the request (e.g., example, if the inputs to the UpdateItem request include an Expected structure specifying one or more conditions to be met), shown as the positive exit from 1020, the method may include determining whether each of the specified conditions is met.

As illustrated in this example, each of the specified conditions may be evaluated (as in 1030) prior to performing the updates specified in the request. If a given condition is met (shown as the positive exit from 1030), but there are additional conditions specified for the request (shown as the positive exit from 1040), the additional conditions may be evaluated (shown as the feedback from 1040 to 1030). If a given condition is met (shown as the positive exit from 1030), and there are no additional conditions specified for the request (shown as the negative exit from 1040), the requested update may be performed, as in 1050. If any of the specified conditions is not met, shown as the negative exit from 1030, the requested update(s) may not be performed.

As illustrated in this example, if the service request specifies that the pre-update and/or post-update values of the item's attributes should be output, shown as the positive exit from 1060, the method may include returning the pre-update and/or post-update attribute values of the item, as in 1070, and the update item operation may be complete, as in 1080. For example, if the ReturnValues parameter of an UpdateItem request is set to "All_Old", "Update_Old", "All New", or "Updated New", the corresponding old and/or new attribute values may be returned in response to completing the item updating process. If the ReturnValues parameter is set to "None", or is not specified for the request, no attributed values may be returned. Note that if any of the specified conditions were not met, the response may include one or more error indications, such as those described herein, whether or not any of the old and/or new attribute values are returned in the response. The responses to the specification of each of the possible Action parameter values on a corresponding attribute value are summarized in the tables below, according to one embodiment.

TABLE 4

Update actions targeting existing items

| Action | If specified attribute is Scalar | If specified attribute is a Set | If specified attribute does not exist |
|---|---|---|---|
| PUT | replace old attribute value with new value | replace old attribute values with new values | add the specified attribute and its specified value to the item |
| DELETE | delete attribute (and its old value) | If no value supplied, delete the attribute (and all old values in the set). If one or more values is supplied, these values are removed from the set. | no action taken |
| ADD | atomically add the specified positive or negative value to existing value | add a new element to the existing set | same as PUT action for scalar number types and for set types |

TABLE 5

Update actions targeting items that do not exist

| Action | Effect |
| --- | --- |
| PUT | create new item with specified primary key; add specified attribute(s) and their value(s) |
| DELETE | no action taken |
| ADD | create new item with specified primary key; same action as PUT for scalar number types and for set types |

Note that in some embodiments it may be an error to supply an attribute value for a delete type update of a scalar attribute. In some embodiments it may be an error to supply an empty set for a delete type update of a set type attribute. In some embodiments the type of the supplied value(s) for a delete type update of a set type attribute and/or an add type update of a set type attribute must match the existing value type. As described above, the ADD action may only be valid for scalar attributes of type number, or for set type attributes, and may be invalid for scalar string types.

As shown in the tables above, when an item targeted by an UpdateItem request does not exist and the update operation is carried out with at least one PUT or ADD Action parameter value, an item may be created, in some embodiments. However, if an UpdateItem operation targets a non-existent item and specifies only DELETE actions, no new item will be created.

As with other APIs provided by the data storage service, an UpdateItem request and/or response may be presented in a JSON request/response format or another suitable format, in different embodiments. Examples of a request to a data storage service and a response received from a data storage service corresponding to an UpdateItem API are found below, according to one embodiment.

Example Request Format:

```
{
  UpdateItem {
    "TableName" : "Pictures",
    "Key":[1, 2009-12-12T10:30:30Z],
    "AttributeUpdates" : {
        "Title" : {"AttributeValue" : {"S" :"Sun Flower"),
"Action" : "PUT"}
        "Tags" : {"AttributeValue" : {"S" : ["Flower", "Sun"]},
"Action" : "ADD"}
    },
    "Expected" : {
"Title" : {"AttributeValue" : {"S":"flower"}},
"Rating": {"Exists" : false}
    },
    "ReturnValues" : "UPDATED_NEW"
  }
}
```

Example Response Format:

```
{
    "Attributes" : {
       "Title" : {"S":"Sun Flower"}
       "Tags" : {"S" : "Flower", "Sun"},
    }
}
```

In this example, the specified updates were conditional on the non-existence of a Ratings attribute, and on the value of the Title attribute being "flower". In response to determining that both of these conditions evaluated true, the specified updates were made to the Title and Tags attributes. Note that in this example, the UpdateItem request included a Return-Values parameter set to Updated New. Therefore, the response included only the new values defined for the attributes targeted by the specified update operations (i.e. the new values for the "Title" attribute, and the "Tags" attribute).

Figure 11:
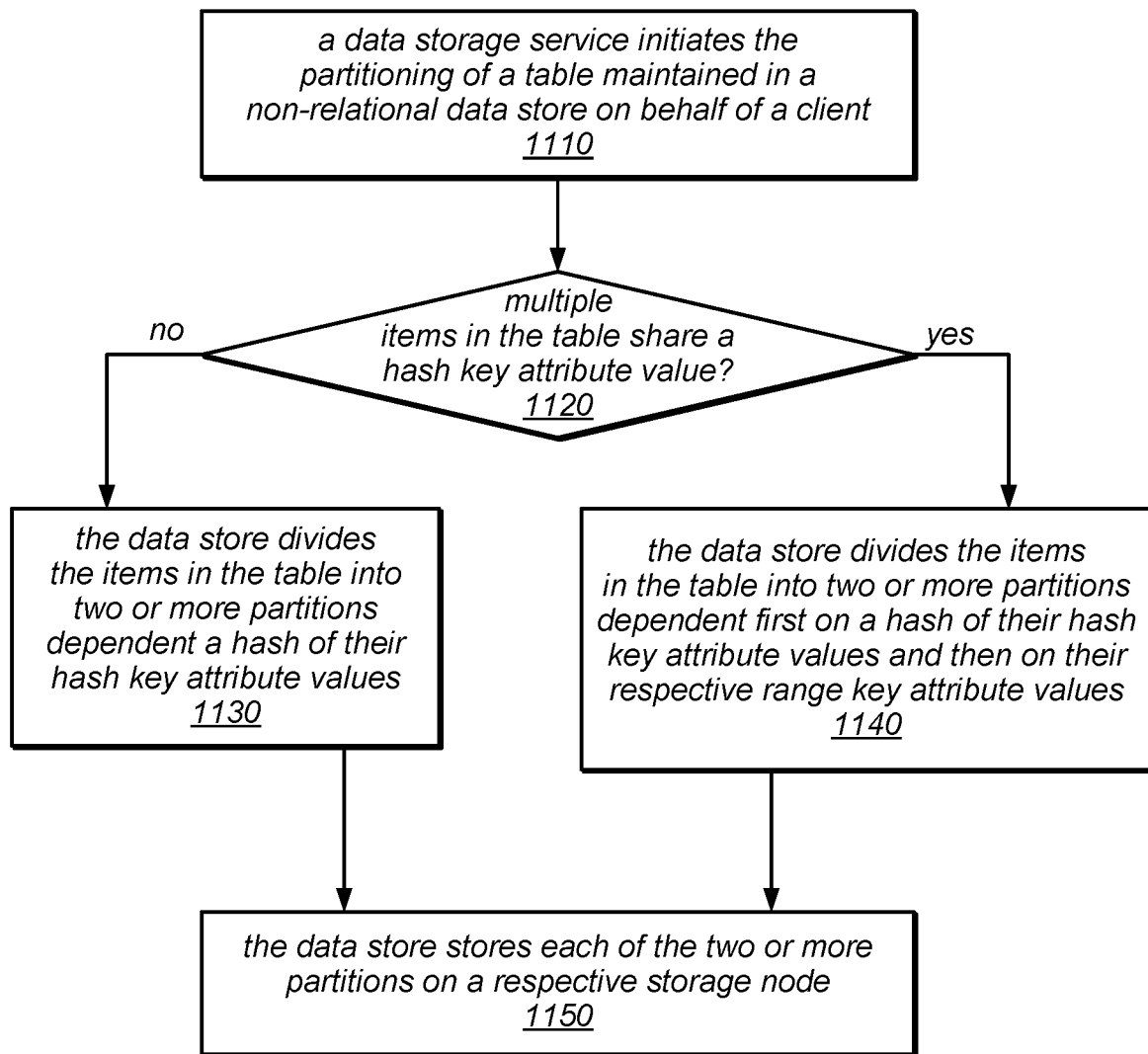
FIG. 11 is a flow diagram illustrating one embodiment of a method for partitioning a table maintained in a non-relational data store.

As previously noted, in embodiments in which the primary key is a simple key, the item in a table being maintained on behalf of a storage service client may partitioned using a hash of the primary key value of each of the items, while in embodiments in which the primary key is a composite key, the data may be partitioned first by a hash of the hash key component, and then by the range key component. FIG. 11 illustrates one embodiment of a method for partitioning table data using simple and/or composite keys, according to one embodiment. As illustrated at 1110, in this example, the method may include a data storage service (or a component of the underlying system that implements a data store, such as a storage node instance or administrative component) initiating the partitioning of a table maintained in a non-relational data store on behalf of a storage service client.

If multiple items in the table share a hash key attribute value, shown as the positive exit from 1120, the method may include the data store dividing the items in the table that have a given hash key attribute value into two or more partitions (e.g., database partitions) dependent first on a hash of their range key attribute values, and then on their range key attribute values, as in 1140. In other words, if the primary key for the table is a composite key that includes hash key component whose values may be used to identify a group of items and a range key component whose values may be used to order items having the same hash key attribute values and uniquely identify each of those items, both the hash key attribute value and the range key attribute value may be used to partition the items in the table. For example, for a group of items that have the same hash key attribute value, the first n items in the group (when ordered by their respective range key attribute values) may be assigned to one partition, the next m items in the group may be assigned to a second partition, and so on. Note that in some embodiments, each partition may include a portion of the items sharing one hash key attribute value and may also include other items having other hash key attribute values.

If none of the items in the table share a hash key attribute value, shown as the negative exit from 1120, the method may include the data store dividing the items in the table into two or more partitions dependent on a hash of their respective hash key attribute values, as in 1130. For example, if the primary key for the table is a simple key that includes hash key component whose values may be used to uniquely identify each of the items in the table, the items in the table may be partitioned (i.e. assigned to one of a plurality of partitions) dependent a hash of the hash key attribute value, but not dependent on any other item attribute values. In some embodiments, if the primary key is a composite key, but none of the items in the table share a hash key attribute value (i.e. if each item has a unique hash key attribute value), the data store may partition the items as if the primary key were a simple key (i.e. it may partition the items in the table using the hash key attribute value alone).

Once the data store has assigned all of the items to a partition, the data store may store each of the partitions on a respective storage node (e.g., a respective computing node or storage device), as in 1150. In some embodiments, each partition of a single table may be stored on a different storage node, while in other embodiments, two or more of the partitions may be maintained on the same storage node. Note that in some embodiments, the number of partitions into which the items of a given table are partitioned may be pre-determined (e.g., it may be based on user input/preferences, or historical data for a client, account, or table type), while in other embodiments, the number of partitions into which the items of a given table are partitioned may be determined as the partitioning operation progresses, e.g., based on the number of items in each range of hash results and/or the number of items in each range of range key attribute values. Note also that because the partitioning is based on a hash result, the order in which groups of items may be assigned and distributed among the available partitions may be somewhat randomized. In some cases, e.g., if some items are accessed much more frequently than others or some groups of items include a higher number of items than others, an initial partitioning may result in hot spots. In such cases, a repartitioning operation may be performed in order to more evenly distribute the items among the available partitions (e.g., with respect to data volume and/or service request traffic). Note also that in some embodiments, the items in a table may be partitioned using a single hash key component and two or more range key components.

Table 6 below illustrates an example of the partitioning of items in table using a method similar to that illustrated in FIG. 11. In this example, the hash key attribute is a "User name" attribute, and the range key attribute is a "Message ID" attribute. The table stores multiple messages associated with each of three user names (Bob, Sue, and Phil). As illustrated in Table 6, some partitions of a given table may include only items having the same hash key attribute value. In this example, a partition identified by a Partition ID value of A stores only messages having the hash key attribute value "Bob". Note that this partition does not store all of Bob's messages, only messages having Message ID values (i.e. range key attribute values) 1-199. Another group of Bob's messages (those with range key attribute values 200-299) are stored in a partition identified by a Partition ID value of B. This partition also stores messages having a hash key attribute value of "Sue", specifically, those messages having range key values of 1-50. Yet another group of Bob's messages (those with range key attribute values 300-399) are stored in a partition identified by a Partition ID value of C. This partition also stores messages having a hash key attribute value of "Phil", specifically, those messages having range key values of 1-100.

TABLE 6

| User name | Message ID | Partition ID |
|---|---|---|
| Bob | 1 | A |
| Bob | 2 | A |
| . | . | |
| . | . | |
| . | . | |
| Bob | 199 | A |
| Bob | 200 | B |
| . | . | |
| . | . | |
| . | . | |
| Bob | 299 | B |
| Bob | 300 | C |
| . | . | |
| . | . | |
| . | . | |
| Bob | 399 | C |
| Sue | 1 | B |
| Sue | 2 | B |

TABLE 6-continued

| User name | Message ID | Partition ID |
|---|---|---|
| . | . | |
| . | . | |
| . | . | |
| Sue | 50 | B |
| Phil | 1 | C |
| Phil | 2 | C |
| . | . | |
| . | . | |
| . | . | |
| Phil | 100 | C |

In the example above, a request to retrieve all of Bob's messages may retrieve messages 1-199 from partition A (which may be maintained on a particular storage node), messages 200-299 from partition B (which may be maintained on a different storage node), and messages 300-399 from partition C (which may be maintained on yet another storage node). As described in more detail below, in some embodiments, a request to retrieve all of these messages may be terminated early (e.g., if response limit is reached), and the remaining messages may be retrieved in response to a subsequent request.

In some embodiments, the data storage service (and/or underlying system) described herein may provide two different APIs for searching the data maintain in tables on behalf of storage service clients: a Scan API and a Query API. In some embodiments, the Scan API may be used to request an operation that scans an entire table. A Scan request may specify one or more filters to be applied to the results of the scan operation, e.g., to refine the values returned to the requestor following the complete scan. In some embodiments, the service (and/or underlying system) may impose a limit on the scan results, and the limit may be applied before the results are filtered. For example, in some embodiments, the system may use pagination (e.g., dividing a scan or query process into distinct pieces having a pre-determined maximum size in terms of the number of items evaluated or returned, or in terms of the amount of data scanned or returned) in order to respond to scans and/or queries quickly. For example, in order to scan a table that is larger than the pre-determined maximum size (e.g., 1 MB) or for which the resulting data set is larger than a pre-determined maximum size (e.g., 1 MB), multiple scan or query operations may need to be performed to scan the entire table, in 1 MB increments. It may be possible for a scan operation to return no results, if no table data meets the specified filter criteria. In some embodiments, the Query API may support comparison operations to limit the search process to the data that matches the supplied query conditions (e.g., conditions on the attributes of the items). For example, a Query request may be used to find all the data in a table that matches the parameters specified in the request, up to a pre-defined limit (if such a limit is imposed by the system). In some embodiments, a Query request may always returns results, but the system may return empty values if the query conditions (i.e. the attribute filter criteria) does not match any of the results.

In various embodiments, a Query API may be used to query a table that is maintained on behalf of a storage service client (e.g., a user, customer, subscriber, or client application) for information stored in that table. In some embodiments, the query may be performed based on a primary index (according to a specified hash key and, in some cases, a single range key value that satisfies a specified range key predicate). In other embodiments a primary key may include a single hash key component and two or more range key components. In some embodiments, the input parameters for a Query API may include a TableName (which may be a string comprising the name of the table in which the item to be updated is stored or in which an item is to be conditionally inserted), an AttributesToGet parameter (which may be an array of attributes whose values are to be returned), a Limit parameter (which may be an integer specifying a maximum number of results to be returned in response to a single query request), a ConsistentRead parameter (which may be a Boolean value indicating whether a consistent read will be issued), a Count parameter (which may be a Boolean value indicating whether a count of items matching the query, rather than the attribute values of those items, should be returned), a HashKeyValue (which may specify an AttributeValue for the hash component of the primary key, and may be a mandatory constraint on the query), a RangeKeyCondition (which may specify a constraint on a RangeKey component of the primary key and may, in combination with the HashKeyValue, identify the target or targets of the query request), a ScanIndexForward parameter (which may be a Boolean value indicating whether to traverse the index forward or backward), and/or a LastEvaluatedKey parameter (which may specify a primary key value to be used as a starting point of a query, if the query is a continuation of a query for which a pre-determined limit on the number of items for which attributes can be returned in response to a single query request has been exceeded).

In some embodiments, the RangeKeyCondition parameter may specify a mathematical or logical expression to be evaluated dependent on values of the range key component of the items in the able. The RangeKeyCondition parameter may include a ComparisonOperator parameter, and one or more AttributeValues. For example, in one embodiment the ComparitionOperator may be one of the following operators: "EQ" (i.e. equal to), "GT" (i.e. greater than), "GE" (i.e. greater than or equal to), "LT" (i.e. less than), "LE" (i.e. less than or equal to), "BEGINS WITH" or "BETWEEN". In such embodiments, if the ComparisonOperator is one of "EQ", "GT", "GE", "LT", "LE", or "BEGINS WITH", only one value may be included in the AttributeValues parameter, while if the ComparisonOperator is "BETWEEN", two values may be included in the AttributeValues parameter. Note that in some embodiments, the specified comparison may be made lexicographically for attributes having the type "string" (e.g., with UTF8 strings represented as binary strings), and numerically for attributes having the type "number". In some embodiments, the two values specified for the "BETWEEN" operator may be inclusive, with the first value being smaller than the second value. The "BEGINS WITH" operator may be a prefix operator that is valid only for scalar strings.

The AttributesToGet parameter may include attribute types, along with their names, in some embodiments. In some embodiments, if attribute names are not specified for a query request (and if the Count parameter is "false"), all attributes of the items matching the query conditions may be returned. In some embodiments, if the Count parameter is "true", any pre-defined limits on the number of matching items returned by the data storage system in response to the query request may not apply. Setting the Count parameter to "true" and providing a list of AttributesToGet (in a single query request) may be invalid, and may result in the data storage system returning an error indication (e.g., an indication of a validation error). In some embodiments, if the ConsistentRead parameter is set to true, a consistent read operation will be issued. Otherwise, an eventually consistent read operation will be performed. As noted above, if the number of items matching single query request exceeds the value of the Limit parameter, the query may be terminated when the limit is reached. In this case, the data storage system may return attribute values for a number of matching items up to the value of the Limit parameter, and may include a continuation token (i.e. a LastEvaluatedKey parameter) that may be used to continue the query (e.g., by including this LastEvaluatedKey as an input of a subsequent query request). Note that in some embodiments, the data storage system may support a system-wide limit on the number of matching items returned in response to a query request using the Query API and/or a request-specific limit on the number of matching items (i.e. using the Limit parameter described above). In some such embodiments, a query may be terminated and a continuation token returned to the requester when either of these limits is met (e.g., if a system-wide limit is met prior to meeting a request-specific limit, or vice versa).

In some embodiments, the return parameters for a Query request may include an Items parameter (which may include a list of items, and/or their associated attribute values, that match the specified query conditions), a Count parameter (which may indicate the number of items in the response), and/or a LastEvaluatedKey parameter (which, as described above, may specify a primary key value of the last item evaluated during the query prior to reaching a pre-determined limit on the number of items about which information can be returned in response to a single query request). As noted above, the LastEvaluatedKey may be used as a starting point in a continuation of the query if a pre-determined limit on the number of items about which information can be returned in response to a single query request has been exceeded. Note that in some embodiments, the Count parameter may always be returned in the response for the Query API, regardless of whether the matching items (and/or their attributes) are also returned. As with other APIs provided by the data storage service, a Query request and/or response may be presented in a JSON request/response format or another suitable format, in different embodiments. Examples of a request to a data storage service and a response received from a data storage service corresponding to a Query API are found below, according to one embodiment. The example below illustrates a query that may be used to retrieve all items from a table called "Pictures" for a single customer (i.e. a customer whose CustomerId is "12345678") that have ratings between "*" and "**", and the response to that query requests, according to one embodiment.

Example Request Format:

```
{
   Query{
      "TableName" : "Pictures",
      "QueryFilter" : {
         "CustomerId" : {"AttributeValues" : [{"S" : "12345678"}],
            "ComparisonOperator" : "EQ"},
         "Ratings" : {"AttributeValues" : [{"S" : "*"},{"S" : "**"}]
            "ComparisonOperator" : "BETWEEN"}}
      }
   }
}
```

Example Response Format:

```
{
```

```
    "Items":[{ "CustomerId" : {"S" :"12345678"},
            "Title": {"S": "sun flower"},
            "DateCreated" : {"S" : "20100205T00:00:00Z"},
            "Ratings" : {"S" : "***"}},
        { "CustomerId" : {"S" :"12345678"},
            "Title": {"S": "jasmine"},
            "DateCreated" : {"D" : "20100206T00:00:00Z"},
            "Ratings" : {"S" : "****"}},
        { "CustomerId" : {"S" :"12345678"},
            "Title": {"S": "lupine"},
            "DateCreated" : {"D" : "20100301T00:00:00Z"},
            "Ratings" : {"S" : "***"}}
    ],
    "Count": 3,
    "LastEvaluatedKey" : [{"S" :"12345678"},{"S" : "***"}]
}
```

Figure 12:
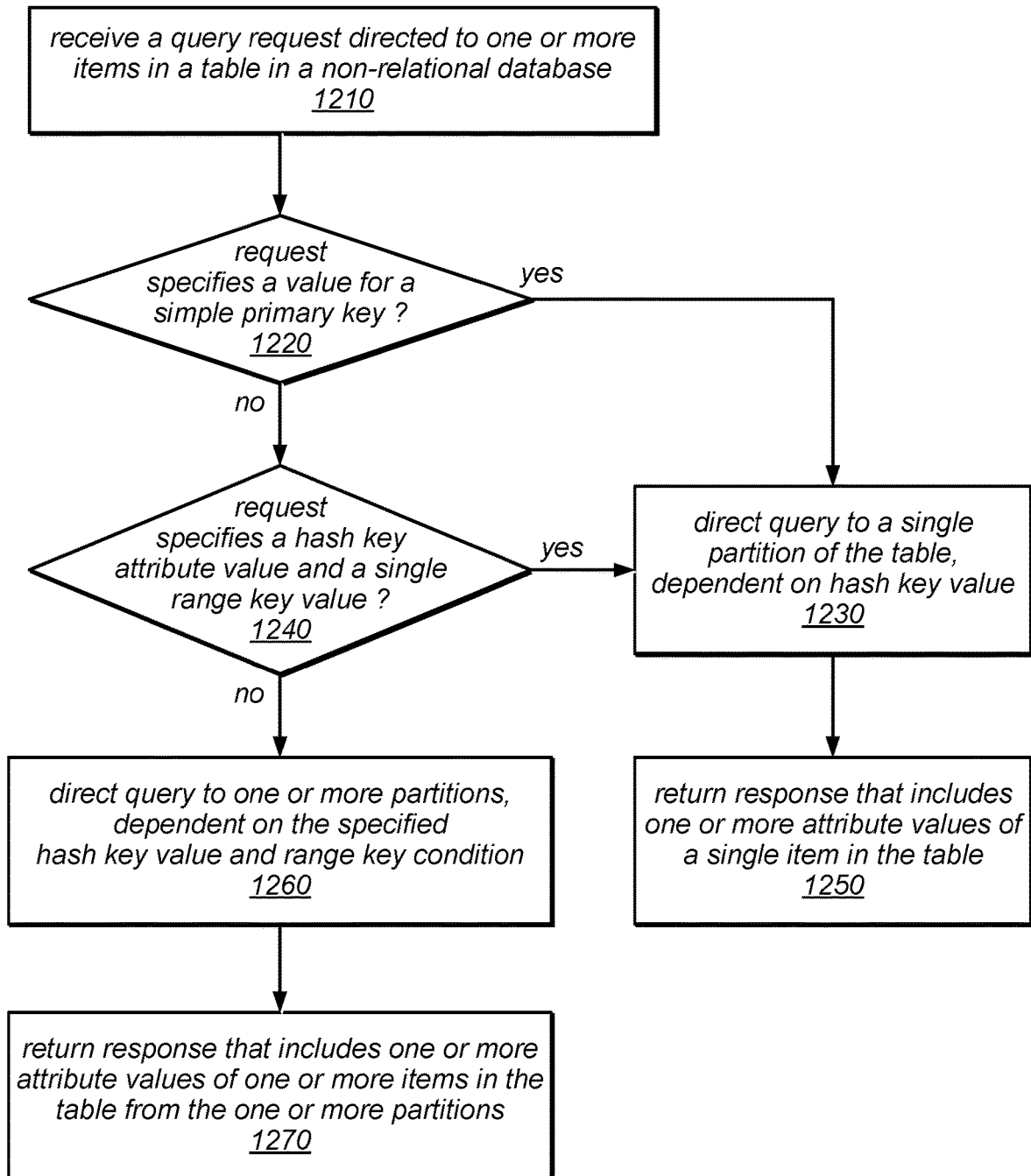
FIG. 12 is a flow diagram illustrating one embodiment of a method for performing a query.

One embodiment of a method for performing a query, as specified by the API described herein, is illustrated by the flow diagram in FIG. 12. As illustrated at 1210, in this example, the method may include receiving a service request to perform a query that is directed to one or more items in a table in a non-relational database (e.g., a table maintained on behalf of a data storage service client). As in previous examples, the request may include a table name (which may identify the table that is the target of the query request), and a primary key value. If the specified primary key value is a single attribute hash key value (i.e. if the primary key for the identified table is a simple primary key dependent on the value of a single attribute), the query may target a single item that is uniquely identified by the combination of the table name and the primary key value. In this case, shown as the positive exit from 1220, the method may include directing the query to a single partition of the table that includes that item, dependent on the specified hash key value. In this case, the method may also include returning a response that includes one or more attribute values of the identified single item, as in 1250.

If the specified primary key value is a composite key value (i.e. if the primary key for the identified table is a composite primary key dependent on a hash key value and a range key value), the query may target one or multiple items that match a specified hash key value and a specified range key condition, as described herein. In this example, if the request specifies a hash key attribute value and a single range key attribute value (e.g., if the request includes a range key condition specifying that the range key value is equal to a particular value), shown as the positive exit from 1240, the method may again include directing the query to a single partition of the table that includes that item, dependent on the specified hash key value, and returning a response that includes one or more attribute values of the identified single item, as in 1250.

In this example, if the request specifies a hash key attribute value and a range key condition that may match multiple range key attribute values, shown as the negative exit from 1240, the method may include directing the query to one or more partitions of the table, dependent on the specified hash key value and range key condition, as in 1260. For example, if some of the items matching the specified hash key value (e.g., items whose range key values fall within a given range) are stored on one partition of the table, but other items matching the specified hash key value (e.g., items whose range key values fall within a different range) are stored on another partition of the table, the query may be directed to multiple partitions (and in some cases, multiple machines on which those partitions are hosted) in order to identify all of the items that match both the specified hash key value and the specified range key condition. In this case, the method may include returning a response that includes one or more attribute values of one or more items matching both the hash key value and the range key condition, as in 1270, where some of the one or more items matching both the hash key value and the range key condition may be retrieved from different partitions (and, in some cases, different machines).

Note that a query directed to a single item (e.g., one that specifies a hash key value for a simple primary key or that specifies a hash key value and a single range key value, as in the positive exit from 1240), may implement functionally similar to that of a corresponding GetItem request, with some variation on the number and type of parameters supported. In some embodiments, the functionality of a GetItem API (as described above) may be provided by a Query API, while in other embodiments, the GetItem functionality describe herein and the Query functionally described herein may be provided by different APIs (e.g., a GetItem API and a Query API).

Figure 13:
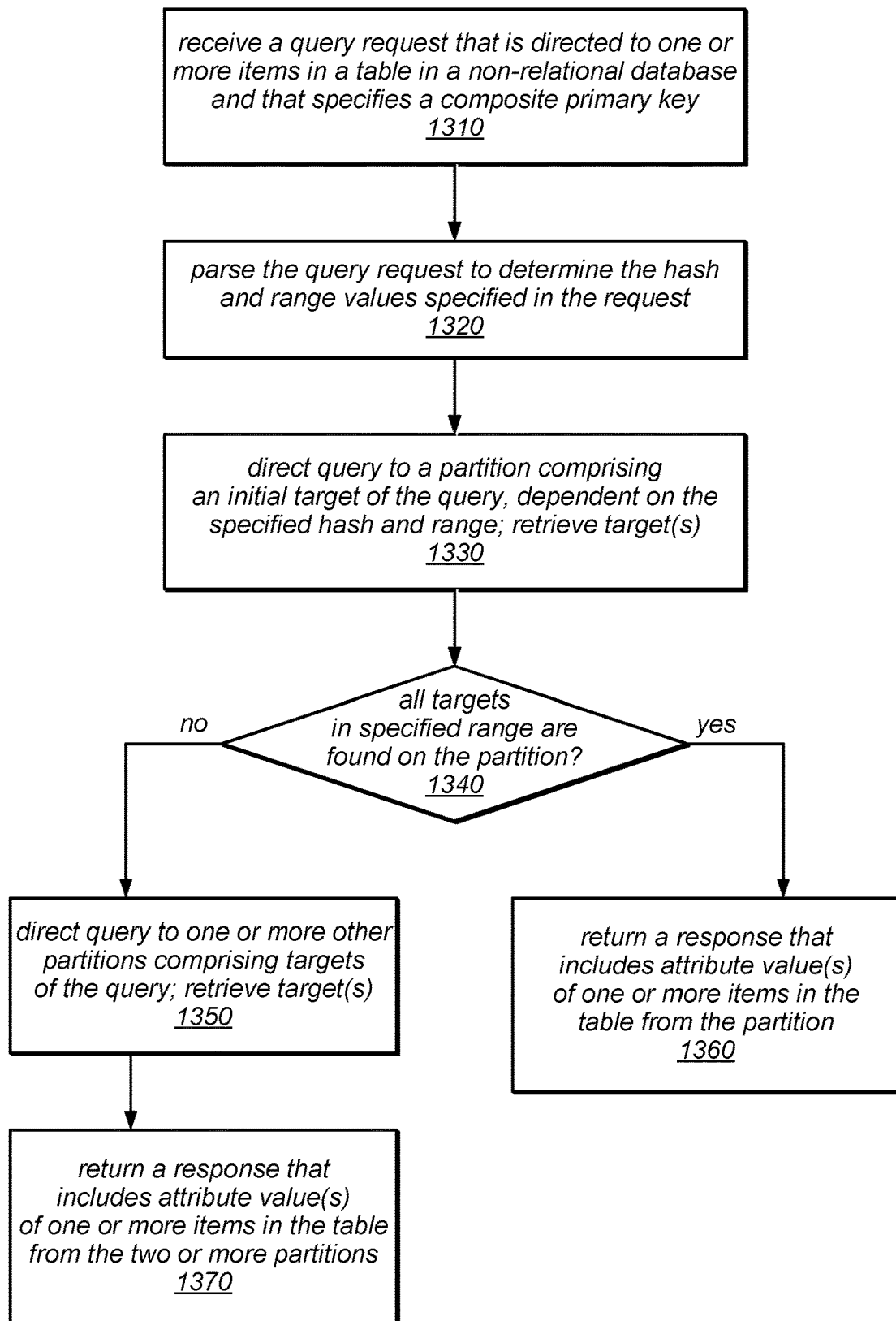
FIG. 13 is a flow diagram illustrating another embodiment of a method for performing a query.

A more detailed example of a method for performing a query, as specified by the API described herein, is illustrated by the flow diagram in FIG. 13, according to one embodiment. As illustrated at 1310, in this example, the method may include receiving a service request to perform a query that is directed to one or more items in a table in a non-relational database (e.g., a table maintained on behalf of a data storage service client). As in previous examples, the request may include a table name (which may identify the table that is the target of the query), and a primary key value. In this example, the specified primary key value is a composite key value (i.e. the primary key for the identified table is a composite primary key dependent on a hash key value and a range key value), and the query may target multiple items that match the hash key value and range key condition specified in the request, as described herein. As illustrated at 1320, the method may include parsing the request to determine the hash and range values specified in the request.

The method may include directing the query to a partition that comprises an initial target of the query, dependent on the specified hash and range values, and retrieving information about one or more targets of the query (e.g., attribute values of the items targeted by the query) from that partition, as in 1330. For example, in some embodiments, the items matching a particular hash key value may be ordered in the table by their range key values. In such embodiments, the combination of the specified hash key value and the first range key value that matches the specified range key condition may uniquely identify the first item in the table that matches the query conditions. In such embodiments, a query may first be directed to the partition that contains the item identified by this combination. In some cases, one or more additional items matching the specified hash key value and the specified range key condition may be present on the first partition to which the query is directed, and all of these targets (i.e. the items themselves and/or a specified subset of their attribute values) may be returned in response to the query.

In some cases, some of the items matching both the specified hash key value and the specified range key condition may be stored on one or more partitions of the table other than the first partition to which the query was directed. If so, shown as the negative exit from 1340, the query may be directed to the one or more other partitions, and these additional query targets may be retrieved, as in 1350. For example, the number of items matching both the specified hash key value and the specified range key condition may be larger than the number of items stored in each partition of the table. In another example, because of the order in which items are sorted and stored in the table and/or assigned to various partitions (e.g., in embodiments in which items are sorted in a particular order and assigned to a particular partition according their range key values), the targeted items may cross a partition boundary. In these and other cases, the method may include returning a response that includes one or more attribute values of one or more items matching both the hash key value and the range key condition, as in 1370, where some of the one or more items matching both the hash key value and the range key condition may be retrieved from different partitions (and, in some cases, different physical computing nodes or storage devices).

As illustrated in FIG. 13, however, if all of the items matching both the specified hash key value and the specified range key condition are stored on the first partition to which the query was directed, shown as the positive exit from 1340, the method may include returning a response that includes one or more attribute values of one or more items matching both the hash key value and the range key condition, as in 1360, where all of the one or more items matching both the hash key value and the range key condition are retrieved from the initially targeted partition (and, thus, a single physical computing node or storage device).

The use of the Query API may be further illustrated by way of the following examples (i.e. by the pseudo code below). In the first example, a request is made to perform a query operation on a table in order to retrieve all of the movie titles stored in the table that begin with the word "The" and that are associated with a single customer ID number. This example assumes a table with composite primary key based on the attributes "ID" and "movie titles". This Query request may be used to retrieve all the items for primary hash value 2 (e.g., customer ID=2) that have range values starting with "The" (i.e. movie titles that begin with "The"):

```
results = Query ('hashrange-table', array (NUMBER => 2), array(
    'RangeKeyCondition' => array(
        'ComparisonOperator' => BEGINS_WITH,
        'AttributeValueList' => array (array (STRING => "The"))
    )
));
```

As noted above, in some embodiments, the number of items returned by a single query (prior to filtering) may be limited (e.g., to 1 MB of data). In such embodiments, if the query needs to return more than 1 MB of data, a second query may be set up based the primary key of the item with the last returned value. The Query API may use the value returned in the LastEvaluatedKey parameter as the starting point for the second query. For example, the LastEvaluatedKey parameter value returned by a truncated query may be stored in a variable and provided to the next query as an ExclusiveStartKey input parameter value. The example pseudo code below illustrates this series of operations.

```
// first query
results = query ('hashrange-table', array(NUMBER => 1), array
('Limit' => 2));
// retrieve the LastEvaluatedKey
lastEvaluatedKey = results->body->LastEvaluatedKey;
// create ExclusiveStartKey
exclusiveStartKey = array ('HashKeyElement' => array (NUMBER =>
(int)lastEvaluatedKey->HashKeyElement->N),
        'RangeKeyElement' => array (STRING =>
(string)lastEvaluatedKey->RangeKeyElement->S)
    );
// perform another query providing the LastEvaluatedKey as the
// ExclusiveStartKey for the second query
    results = query('hashrange-table',
        array(NUMBER => 1),
        array('Limit' => 2,
            'Exclusive StartKey' => ExclusiveStartKey)
    );
```

As described herein, a composite primary key may be indexed as a hash and range index. This multi-part key may maintain a hierarchy between the first and second index values. For example, the address table illustrated below as Table 7 uses the customers' UserIDs as the hash value, and the year that an address was entered in the table as the range to identify each item in the address table. All entries in the table must have a UserID and year, while each UserID/year composite key can have any set of other attributes.

TABLE 7

| Composite Primary Key | | |
|---|---|---|
| Hash component | Range component | Other Attributes |
| UserID = Jennifer | Year = 2011 | street = 100 Pine<br>city = Seattle<br>state = WA |
| UserID = Jennifer | Year = 2010 | street = 2020 North 1$^{st}$ St.<br>city = Seattle |
| UserID = Jennifer | Year = 2004 | zip = 97086 |
| UserID = Bob | Year = 2011 | street = 24 Freemont Ave<br>zip = 95112 |
| UserID = Bob | Year = 2009 | street = 400 Main St.<br>zip = 98020 |
| UserID = Bob | Year = 2004 | street = 30 South Halsted St<br>city = Chicago<br>state = IL |
| UserID = Harold | Year = 2011 | street = 20104 N. 4$^{th}$ St.<br>suite = 35<br>city = Columbus<br>state = OH |
| UserID = Harold | Year = 2006 | city = Cleveland<br>state = OH |
| UserID = Harold | Year = 2002 | zip = 97086 |

In this example, the UserID is a hash index, and only supports comparisons for equality (i.e. for exact matches of the value). In this example, the year is a range index. Therefore, a variety of comparison operators may be applied to the year to constrain a search when performing a query on the table. For example, a Query request may be used to retrieve all of Bob's address information for the years prior to 2010 (i.e. a query specifying the condition that the Year attribute value is less than 2010). Such a query would return Bob's address information for the years 2009 and 2004, as shown in the fifth and sixth entries of Table 7. Note that for other tables, such as Table 8 illustrated below, a range key may be a string type attribute, such as a movie title. In this example, the table may sort items having the same UserID in alphabetical order by the value of their Title attribute values (i.e. their range key values), and each UserID/Title pair may uniquely identify a single item in the table.

TABLE 8

Composite Primary Key

| Hash component | Range component | Other Attributes |
| --- | --- | --- |
| UserID = Jennifer | Title = Black Swan | stars = 4<br>views = 2<br>instant = no |
| UserID = Jennifer | Title = Gladiator | stars = 5<br>views = 1<br>instant = yes<br>recommends = yes |
| UserID = Jennifer | Title = Tangled | views = 1<br>instant = yes |
| UserID = Bob | Title = Hangover | stars = 5<br>views = 1<br>instant = yes<br>comment = "loved it" |
| UserID = Bob | Title = Rocky | views = 1<br>instant = no |
| UserID = Bob | Title = Sherlock Holmes | stars = 3<br>views = 1<br>instant = no<br>recommends = yes |
| UserID = Harold | Title = Fair Game | stars = 2<br>views = 1<br>instant = yes<br>recommends = no |
| UserID = Harold | Title = Narnia | stars = 5<br>views = 2<br>instant = no<br>recommends = yes |
| UserID = Harold | Title = Zoolander | stars = 4<br>views = 2<br>instant = no |

In various embodiments, a Scan API may be used to retrieve one or more items and attributes stored in a table on behalf of a storage service client by performing a full scan across the table. The items returned may be limited by specifying a filter. In some embodiments, the Scan API may support richer semantics than the Query API described above. For example, it may support comparison operators such as "CONTAINS", "IS NULL", "IN", etc.

In some embodiments, the input parameters for a Scan API may include some of the same input parameters supported for the Query API described above. For example, the input parameters may include a TableName (which may be a string comprising the name of the table in which the item to be updated is stored or in which an item is to be conditionally inserted), an AttributesToGet parameter (which may be an array of attributes whose values are to be returned), a Limit parameter (which may be an integer specifying a maximum number of results to be returned in response to a single query request), a Count parameter (which may be a Boolean value indicating whether a count of items matching the query, rather than the attribute values of those items, should be returned), and/or a LastEvaluatedKey parameter (which may specify a primary key value to be used as a starting point of a scan operation, if the scan operation is a continuation of a scan operation for which a pre-determined limit on the number of items for which information can be returned in response to a single Scan request has been exceeded). The Scan API input parameters may also include a ScanFilter parameter, which may specify a filter to be applied to the result set. The ScanFilter may map one or more AttributeName values to corresponding ScanCondition structures, as described below. In some embodiments, all of the specified scan conditions may need to be satisfied for an item to match the filter and be included in the result set.

In some embodiments, each ScanCondition structure may specify the condition to match and the corresponding AttributesValues parameter may include a list of attribute values against which a comparison to the scan condition will be made. In some embodiments, the scan conditions may be specified using a ComparisonOperator parameter having one of the following values: "EQ" (i.e. equal to), "NE" (i.e. not equal to), "GT" (i.e. greater than), "GE" (i.e. greater than or equal to), "LT" (i.e. less than), "LE" (i.e. less than or equal to), "NOT NULL" (i.e. the attribute exists), "NULL" (i.e. the attribute does not exist), "CONTAINS" (i.e. a multi-valued attribute contains the specified value), "NOT CONTAINS" (i.e. a multi-valued attribute does not contain the specified value), "BEGINS WITH", "IN" (i.e. an attribute matches one of the specified values), or "BETWEEN". In some embodiments, if the ComparisonOperator is one of "EQ", "GT", "GE", "LT", "LE", or "BEGINS WITH", a single, scalar value may be included in the AttributeValues parameter. If the ComparisonOperator is "IN", all of the specified attribute values may be scalar and of the same type. If the ComparisonOperator is "BETWEEN", two values may be included in the AttributeValues parameter. If the ComparisonOperator is "CONTAINS" or "NOT CONTAINS", the AttributeValues parameter may be a multi-valued or scalar string (e.g., for scalar string attributes, the comparison may translate to a search for substring match). If the ComparisonOperator is "NULL" or "NOT NULL", the AttributeValues parameter may be empty (or null), and providing any values for the AttributeValues parameter may result in the return of an error indication. Note that in some embodiments, the specified comparison may be made lexicographically for attributes having the type "string" (e.g., with UTF8 strings represented as binary strings), and numerically for attributes having the type "number". In some embodiments, the two values specified for the "BETWEEN" operator may be inclusive, with the first value being smaller than the second value. The "BEGINS WITH" operator may be a prefix operator that is valid only for scalar strings.

The AttributesToGet parameter may include attribute types, along with their names, in some embodiments. In some embodiments, if attribute names are not specified for a scan request (and if the Count parameter is "false"), all attributes of the items matching the scan conditions may be returned. In some embodiments, if the Count parameter is "true", any pre-defined limits on the number of matching items returned by the data storage system in response to the scan request may not apply. Setting the Count parameter to "true" and providing a list of AttributesToGet (in a single scan request) may be invalid, and may result in the data storage system returning an error indication (e.g., an indication of a validation error). As noted above, if the number of items matching single scan request exceeds the value of the Limit parameter, the scan operation may be terminated when the limit is reached. In this case, the data storage system may return attribute values for a number of matching items up to the value of the Limit parameter, and may include a continuation token (i.e. a LastEvaluatedKey parameter) that may be used to continue the scan operation (e.g., by including this LastEvaluatedKey as an input of a subsequent scan request). Note that in some embodiments, the data storage system may support a system-wide limit on the number of matching items returned in response to a scan request using the Scan API and/or a request-specific limit on the number of matching items (i.e. using the Limit parameter described above). In some such embodiments, a scan operation may be terminated and a continuation token returned to the requester when either of these limits is met (e.g., if a system-wide limit is met prior to meeting a request-specific limit, or vice versa).

Note that in some embodiments, a scan process performed in response to a Scan request, as described above, may not be a consistent read operation. In other words, changes to data already "scanned" while the scan takes place may not be included in the scan results. On the other hand, a query operation performed in response to a Query request, as described above, may be an eventually consistent read operation by default, and may support an option to designate that the query should be performed as a consistent read operation. Note that an eventually consistent read might not reflect the results of a recently completed PutItem or UpdateItem operation, in some cases.

In some embodiments, the return parameters for a Scan request may include an Items parameter (which may include an array of items, each of which includes a map of attribute values that match the specified scan conditions), a Count parameter (which may indicate the number of items represented in the response), a ScannedCount parameter (which may indicate the number of items scanned in response to the Scan request), and/or a LastEvaluatedKey parameter (which, as described above, may specify a primary key value of the last item evaluated during the scan operation prior to reaching a pre-determined limit on the number of items whose attributes are returned in response to a single scan request). As noted above, the value of the LastEvaluatedKey parameter may be used as a starting point in a continuation of the scan operation if a pre-determined limit on the number of items about which information can be returned in response to a single scan request has been exceeded. Note that in some embodiments, the Count parameter may always be returned in the response for the Scan API, regardless of whether the matching items (and/or their attributes) are also returned.

As with other APIs provided by the data storage service, a Scan request and/or response may be presented in a JSON request/response format or another suitable format, in different embodiments. Examples of a request to a data storage service and a response received from a data storage service corresponding to a Scan API are found below, according to one embodiment. The example below illustrates a scan request that may be used to retrieve the titles and creation dates of all items stored a table called "Pictures" that were created after "2009-12-12T10:30:30Z" and that have ratings "*" or "*****" (e.g., the best and the worst available ratings values), and the corresponding response, according to one embodiment.

Example Request Format:

```
{
    "TableName" : "Pictures",
    "AttributesToGet" : [ "Title", "DateCreated"],
    "MaxItemsToScan" : 1000,
    "Filter" : {
        "DateCreated" : {"AttributeValues" : [{"S" : "2009-12-12T10:30:30Z"}],
            "ComparisonOperator" : "GT"},
        "Rating" : {"AttributeValues" : [{"S" : "*"},{"S":"*****"}],
            "ComparisonOperator" : "IN"}
    }
}
```

Example Response Format:

```
{
    "Items" : [
        {"Title": {"S": "sunflower"}, "DateCreated" : {"S" : "20100205T00:00:00Z"}},
        {"Title": {"S": "jasmine"}, "DateCreated" : {"S" : "20100206T00:00:00Z"}},
        {"Title": {"S": "lupine"},"DateCreated" : {"D" : "20100301T00:00:00Z"}},
    ],
    "Count" : 3,
    "ScannedCount" : 200,
    "LastEvaluatedKey" : [{"S" : "some-customer"}, {"S" : "Daffodils"}]
}
```

Figure 14:
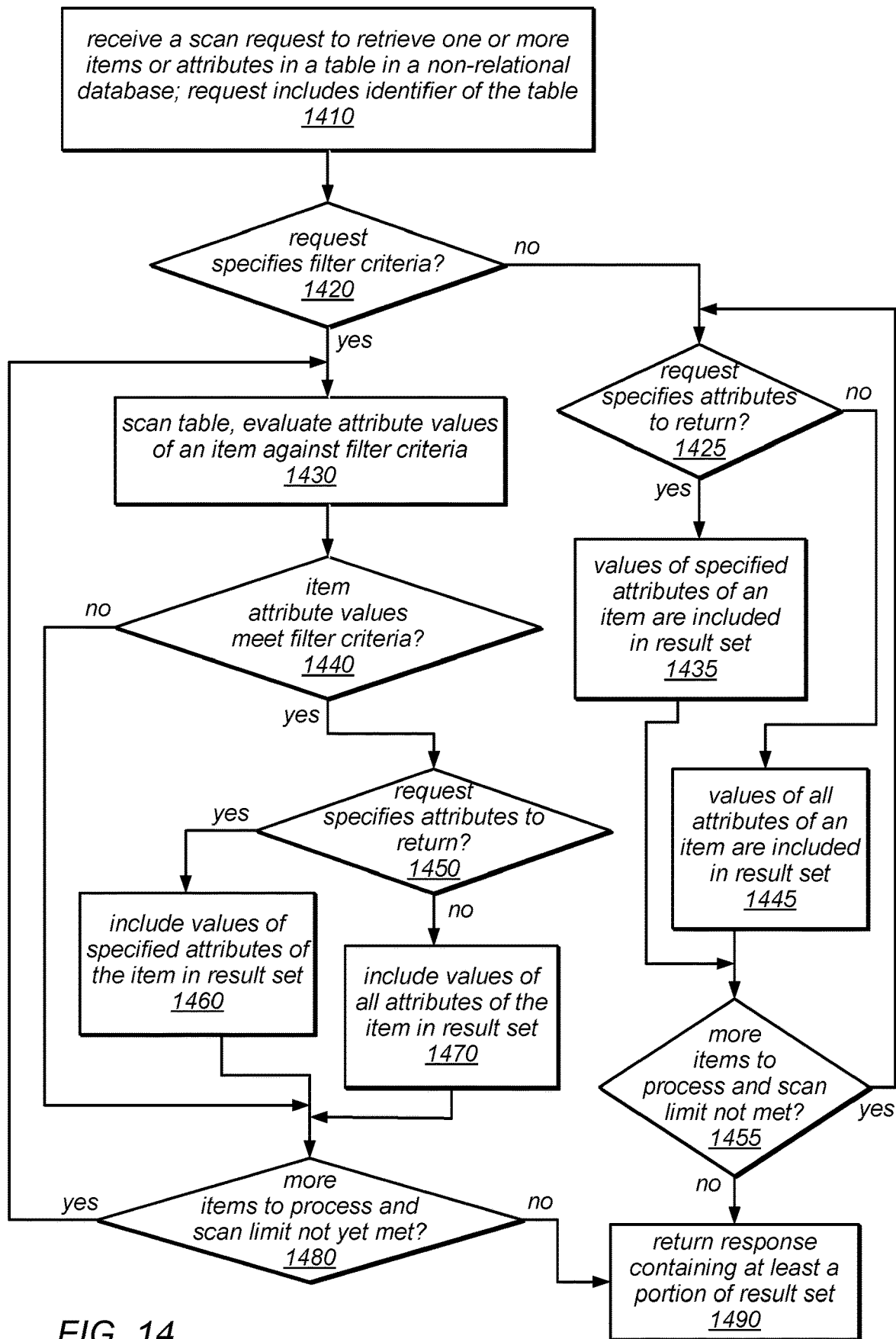
FIG. 14 is a flow diagram illustrating one embodiment of a method for performing a table scanning operation.

One embodiment of a method for performing a table scanning operation, such as the one defined by the Scan API described herein, is illustrated by the flow diagram in FIG. 14. Note that in some embodiments, scanning an entire table may involve scanning two or more partitions, which may be hosted on two or more physical computing nodes or storage devices. As illustrated at 1410, in this example, the method may include receiving a service request to scan a table in a non-relational database (e.g., a table maintained on behalf of a data storage service client) and return one or more items and/or their attributes. As in previous examples, the scan request may include a table name (which may identify the table that is the target of the scan request). The request may also specify one or more attributes whose values are to be returned and/or one or more conditions by which the results of the scanning operation are to be filtered or sorted. If the request specifies filter criteria, shown as the positive exit from 1420, the method may include scanning the table, and evaluating an item against the filter criteria, as in 1430. As described above, the filter criteria may specify values, conditions or ranges of values for various attributes of the items in the table. If the attribute values of the item meet the specified filter criteria (shown as the positive exit from 1440), and the request specifies one or more attributes whose values are to be returned in the response (shown as the positive exit from 1450), the values of the specified attributes in the item may be included in the result set for the scan request, as in 1460.

If the attribute values of the item meet the specified filter criteria (shown as the positive exit from 1440), but the request does not specify any attributes whose values are to be returned in the response (shown as the negative exit from 1450), the values of all of the attributes in the item may be included in the result set for the scan request, as in 1470. If the attribute values of the item do not meet the specified filter criteria, shown as the negative exit from 1440, the item (i.e. its attribute values) may not be included in the result set for the scan request. If there are more items to be processed (i.e. more items to be scanned and/or evaluated against the specified filter criteria), and a scan limit (e.g., a pre-determined limit on the number of items that can be scanned or for which results can be returned in response to a single scan request) has not yet been met, shown as the positive exit from 1480, the operations illustrated as 1440, 1450, 1460, 1470, and/or 1480 may be repeated for additional items in the table until there are no more items to be examined or until such a scan limit has been reached. This is illustrated in FIG. 14 by the feedback from 1480 to 1440. As illustrated in FIG. 14, once all of the items in the table have been processed, or a pre-determined limit on the number of items scanned and/or returned in response to a single scan request has been met, shown as the negative exit from 1480, the method may include returning a response to the requester, as in 1490. As shown in 1490, and described in more detail below, the results returned to the requester in response to a single Scan request may in some cases include only a portion of the items and/or attribute values that meet the specified criteria.

If the request does not specify any filter criteria (shown as the negative exit from 1420), but the request specifies one or more attributes whose values are to be returned (shown as the positive exit from 1425), the result set may include the values of the specified attributes for all of the items in the table. In other words, in this case, a complete set of results for this scan operation would include the values of the specified attributes for all of the items in the table. Note, however, that in some embodiments, not all of these results can be returned (or even necessarily discovered) in response to a single scan request (e.g., if a pre-determined limit on the number of items scanned and/or returned in response to a single scan request has been specified for the request or by a system-wide or client-specific parameter). For example, the values of the specified attributes for a first item in the table may be included in the result set (as in 1435) and if there are other items to process, and a scan limit has not yet been reached (shown as the positive exit from 1455), the specified attributes for one or more other items may be included in the result set. This is illustrated in FIG. 14 by the feedback from 1455 to 1425. Once the specified attributes for all of the items have been added to the result set, or a scan limit has been reached (shown as the negative exit from 1455), a response may be returned to the requester that includes at least a portion of the result set, as in 1490. Similarly, if the request does not specify any filter criteria (shown as the negative exit from 1420), and the request does not specify any attributes whose values are to be returned (shown as the negative exit from 1425), the result set may include the values of all of the attributes for all of the items in the table. In other words, in this case, a complete set of results for this scan operation would include the values of all of the attributes for all of the items in the table. For example, the values of all of the attributes for a first item in the table may be included in the result set (as in 1445) and if there are other items to process, and a scan limit has not yet been reached (shown as the positive exit from 1455), all of the attributes for one or more other items may be included in the result set. Again, this is illustrated in FIG. 14 by the feedback from 1455 to 1425. In this case, once all of the attributes for all of the items have been added to the result set, or a scan limit has been reached (shown as the negative exit from 1455, a response may be returned to the requester that includes at least a portion of the result set, as in 1490. As illustrated in this example, in some embodiments not all of the results of a scan operation can be returned (or even necessarily discovered) in response to a single scan request.

The use of the Scan and Query APIs described above may be further illustrated by way of the following examples (i.e.

by the pseudo code below). In the first example, a request is made to scan a table, and the request specifies that the ID values of the scanned items are to be returned. In the second example, a request is made to scan a table and to filter the results to return all items having a primary key ID value less than 10.

```
Scan ('my-table', array (
    'AttributesToGet' => 'ID'
    )
);
Scan ('my-table', array (
    'AttributesToGet' => 'ID',
    'ScanFilter' => array ( // WHERE
        'ID' => array (
            'ComparisonOperator' => LESS_THAN,
            'AttributeValueList' => array (
                array (NUMBER => 10 )
            )
        )
    )
);
```

A noted above, if a pre-determined limit on the number of items scanned and/or returned in response to a single Scan or Query request has been met prior to discovering, collecting and returning the complete results for the request, the operation may be terminated early, and the response may include only the items and/or attribute values retrieved prior to the pre-determined limit being reached. In some embodiments, the response may include information usable as an input to a subsequent Scan or Query request that may be issued to continue scanning or querying the table and returning additional items and/or attributes according to the parameters of the original Scan or Query request. For example, the response may include a LastEvaluatedKey parameter value, or another continuation token, which may then be included as a corresponding input parameter value for the subsequent Scan or Query request. In some cases, two or more subsequent Scan or Query requests may need to be performed in order to discover and/or collect and return a complete set of results for a scan or query operation.

Figure 15:
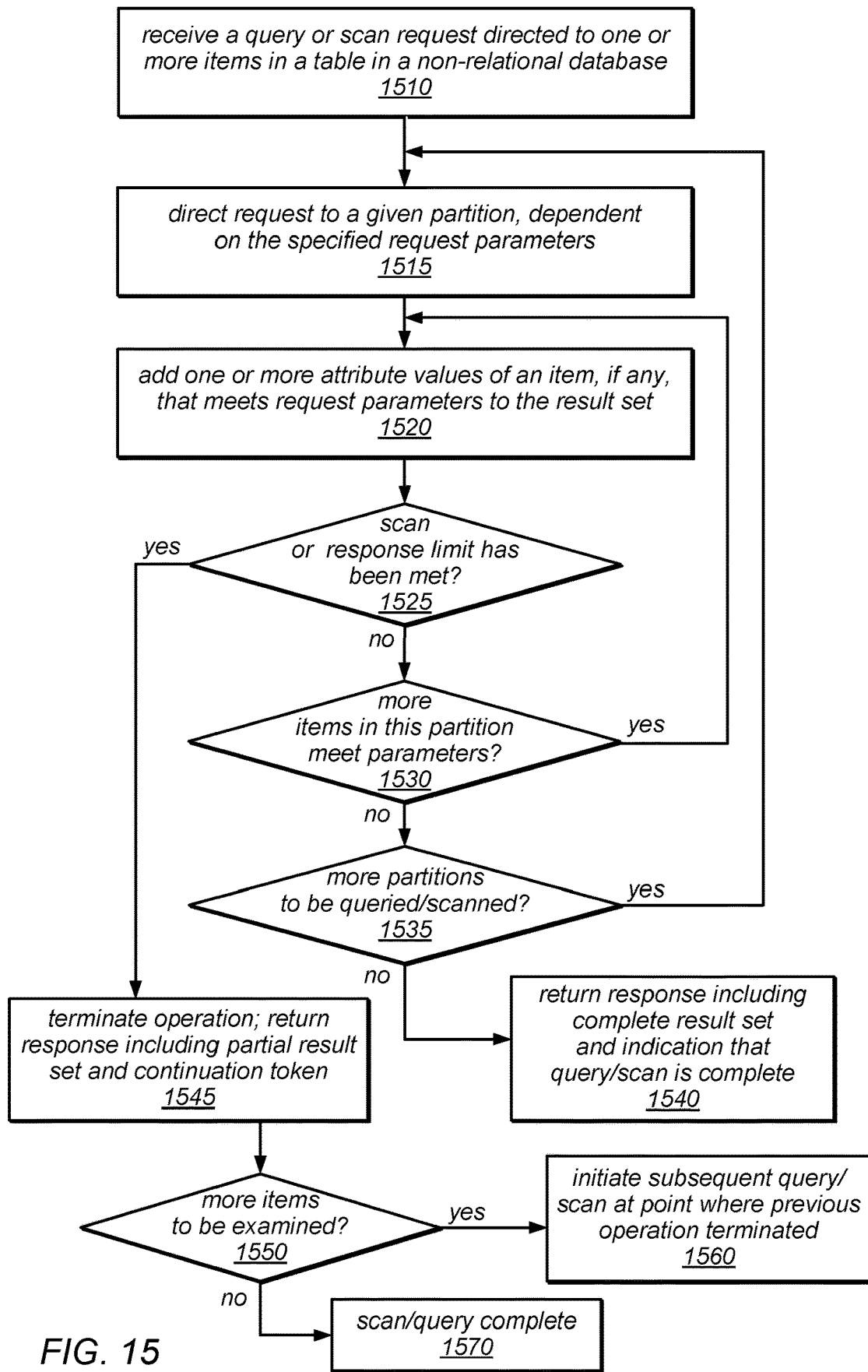
FIG. 15 is a flow diagram illustrating a method for performing a query or scan operation for which a scan or response limit has been specified, according to one embodiment.

FIG. 15 illustrates a method for performing a query or scan operation for which a scan or response limit has been specified, according to one embodiment. As illustrated at 1510, in this example, the method includes receiving a query or scan request directed to one or more items in a table in a non-relational database (e.g., a table being maintained by a data storage service on behalf of one or more storage service clients). As illustrated in this example, the request may be directed to a given partition of the table, dependent on the specified request parameters (e.g., a query condition, a hash key attribute value, a range key condition, a scan condition, etc.), as in 1515. If an item evaluated by the request meets the conditions or parameters of the request, one or more attributes of that item (e.g., the values of all attributes, or the values of any attributes specified in the request) may be included in the result set for the request, as in 1520. If a scan or response limit for the request has not been met, shown as the negative exit from 1525, and if there are more items in the partition that meet the conditions or parameters of the request, shown as the positive exit from 1530, one or more attribute values of another item, if any, that meets the request conditions or parameters may be added to the result set. This is illustrated in FIG. 15 by the feedback from 1530 to 1520.

If a scan or response limit for the request has not been met (shown as the negative exit from 1525), but there are no more items in the partition currently being examined that meet the conditions or parameters of the request (shown as the negative exit from 1530), and there are more partitions to be queried or scanned (shown as the positive exit from 1535), the method may include directing the request to another partition to continue the scanning or querying operation. This is illustrated in FIG. 15 by the feedback from 1535 to 1515. In this example, the method may include repeating the operations illustrated in 1515-1535 one or more times, adding one or more attribute values of other items, if any, that meet the request conditions or parameters to the result set. This is illustrated in FIG. 15 by the feedback from 1530 to 1520. If the scan or query operation completes prior to the scan or response limit being reached for the request, shown as the negative exit from 1535, the method may include returning a response to the requester that includes a complete set of results and an indication that the scan or query operation was successfully completed, as in 1540.

If, at some point, the scan or response limit is reached for the request, shown as the positive exit from 1525, the method may include terminating the scan or query operation early (i.e. before discovering and/or collecting a complete set of results), and returning a response to the requester that contains partial results (those collected in the result set before reaching the scan or response limit) and a continuation token (such as a LastEvaluatedKey parameter value). This is illustrated in FIG. 15 at 1545. If there are still more items to be examined, shown as the positive exit from 1550, a subsequent query or scan operation may be initiated that includes the continuation token as one of its input parameters. This subsequent query or scan operation would begin scanning or querying the table at the point at which the previous operation was terminated, as shown in 1560. If there are no more items to be examined after reaching the limit and terminating the operation, shown as the negative exit from 1550, the scan or query operation may be complete, as in 1570.

Some of the error indications that may be returned by various ones of the APIs supported in the data storage system herein have been described above. Others are listed in Table 9 below.

TABLE 9

List of Errors

| Http Status Code | Error Code | Error Message | Conditions under which the error is raised |
| --- | --- | --- | --- |
| 400 | InvalidParameterValue | One or more parameter values were invalid | One or more parameter values were invalid, or a string parameter exceeded a length restriction. |
| 400 | MissingParameterValue | One or more required parameter values were missing | One or more required parameter values were missing. |
| 400 | ResourceInUse | The resource which is being attempted to be changed is in use | Examples: An attempt to re-create an existing table, or an attempt to delete a table that is in the Creating state. |
| 400 | ResourceNotFound | The resource which is being requested does not exist | Example: A table that is being requested does not exist. |
| 400 | ConditionCheckFailed | The conditional request failed | Example: An expected value did not match what was stored in the system. |
| 500 | InternalFailure | The server encountered an internal error trying to fulfill the request. | Example: internal error |
| 500 | ServiceUnavailable | The service is currently unavailable or busy | Example: the system is throttling requests |

Note that in some embodiments, the following error indications may be returned by any of the APIs supported by the service, while others may be returned by specific ones of these APIs.

InvalidParameterValue
MissingParameterValue
InternalFailure
ServiceUnavailable

Figure 16:
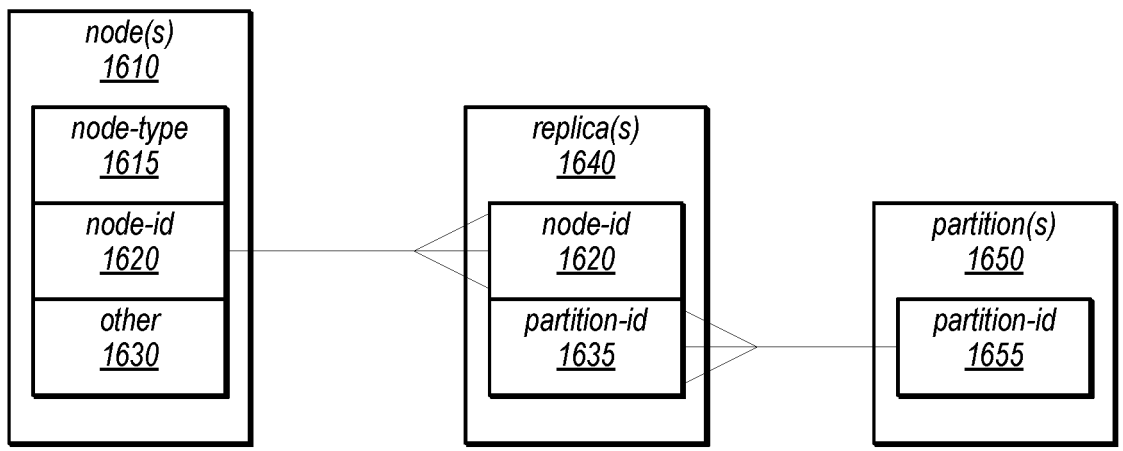
FIG. 16 is a block diagram illustrating a portion of a data model for a system that provides data storage services, according to one embodiment.

In some embodiments, any or all of the metadata described herein as being used in maintaining and managing tables on behalf of a data storage service client (including any of the metadata tables described herein) may be stored in the same scalable data store (e.g., the same non-relational database) as that in which the client/user tables are stored. In such embodiments, the system may include or employ one or more bootstrapping mechanisms to assist with initialization of the data storage service (and/or the underlying system that implements a data storage service), some of which are described herein. FIG. 16 illustrates a portion of a data model for such a system, according to one embodiment. In this example, various computing nodes (represented in the data model simply as "nodes 1610") may store user data (e.g., in tables maintained on behalf of a user) and/or system data, including metadata used by the data storage service, such as that described above. Therefore, each node 1610 of the data model may include an indicator of the type of the node, shown as node-type 1615. For example, in one embodiment, each node may be designated as a "storage node", a "request router", an "auto-admin" node, or a "staging" node. In some embodiments, a "storage node" may store user data in one or more tables maintained by the data storage service, but metadata (e.g., data stored in one or more of a Tables Table, a Subscribers Table, a Partitions Table, or a Nodes Table) may be hosted on other types of nodes (e.g., "auto admin" nodes and/or "staging" nodes). In other embodiments, such metadata may be stored on one or more "storage nodes", some of which may also store user data. As illustrated in FIG. 16, each node 1610 may also include an identifier of the node (shown as node-id 1620), and one or more other elements (shown as 1630).

As illustrated in FIG. 16, information about each replica may be represented in the data model as a replica 1640. Each replica 1640 in the data model may include an identifier of the node on which the replica is hosted (shown again as node-id 1620), and one or more partition identifiers (shown as partition-id 1635) indicating the partitions included in the those replicas. In this example, each partition may be represented in the data model as a partition 1650 and may include its partition-id 1655. As illustrated in FIG. 16 by various one-to-many mappings, each node may host multiple replicas, and each partition may be included in multiple replicas.

In some embodiments, the systems described herein may support seamless scaling of user tables in a "fully shared nothing" type architecture. For example, in some embodiments, each partition may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and other repartitioning operations) may be performed while service requests directed to the affected partitions continue to be received and processed (i.e. without taking the source partition off-line).

In different embodiments, the data storage service (and/or underlying system) may support a variety of service offerings and/or throughput models. For example, in some embodiments, the service may support a committed throughput offering and/or a best effort offering. In some embodiments, a storage service client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table through a parameter of a request to create the table, in some embodiments. In other embodiments, a client/user may specify a default throughput model for all tables created and maintained on their behalf by the data storage service. By supporting both a committed throughput model and a best effort throughput model (for which no throughput guarantees are made), the system may allow clients/users to make a trade-off between performance and cost, according to their needs and/or budgets.

A data storage service (and underlying system) that provides a committed throughput offering may be configured to pre-allocate capacity and/or resources for the creation, growth, and management of a table maintained on behalf of a client/user in response to traffic directed to the table, and not to overbook the resources and/or capacity of the storage node(s) on which that table is maintained. In some embodiments, tables maintained by the service (and underlying system) under a committed throughput model may be maintained in faster (and often more expensive) storage resources, such as high performance media (e.g., flash memory or Solid State Drive, or SSD, media), in order to provide extremely low latencies when servicing requests from the client/user. For example, the system may provide (and dedicate) a high ratio of fast/local memory to main (e.g., disk) memory for the maintenance of those tables (and various partitions thereof). While the storage resources allocated to a given table under a committed throughput model may in some cases be underutilized (at least some of the time), the client/user may value the predictable performance afforded by the committed throughput model more than the additional (and in some cases wasted) costs of dedicating more resources than may always be necessary for that table.

Note that in various embodiments, the committed throughput level for a given table (or client/user) may be specified in terms of the work done during a given time period when a service request targets the table. For example, the committed throughput level may be expressed in terms of logical or physical I/O throughput (e.g., logical or physical I/O accesses per second) or logical CPU throughput (e.g., CPU cycles or instruction cycles per second), in some embodiments. Note that in some embodiments, a read access to the table may require only one I/O access (e.g., to read the data file of the table), while a write access to the table (e.g., an access that adds, deletes, or modifies an item or item attribute in the table) may require at least two I/O accesses (e.g., to log the write access, and then to perform the access). In addition, as described herein, some individual service requests may read and/or write multiple items and/or item attributes in the table. Therefore, in some embodiments, rather than specifying the committed throughput in terms of a number of I/O operations per second (IOPS) or a number of service requests (i.e. API calls) per second, the committed throughput level may be specified in terms of a measure of normalized, logical work units (or logical service request units) over time. In one example, the committed throughput level may be specified (in terms of normalized logical service request units) such that a service request that results in a read access targeting a single item in a table may be considered to require (or consume) one logical service request unit, while a service request that results in a write access targeting a single item in a table may be considered to require (or consume) two or three logical service request units. Note that in some embodiments, throughput levels may be specified differently for read requests and write requests (e.g., as a specified number of read accesses per second and a separately specified number of write accesses per second), and/or logical service request units consumed by read requests and write requests may be normalized based on the sizes of the items accessed by those requests. In yet another example, a different committed throughput level may be specified for read accesses performed under an eventual consistency model than for read accesses performed under a strong or strict consistency model. In some embodiments, the work done by service requests that include multiple read and/or write accesses (e.g., a query or scan request that may return anywhere from 0 to 1 MB of data) may be modeled in terms of logical service request units, which may be dependent on the number of logical work units that are required to service those requests and/or on the size of the item or items accessed by each of those requests. In various embodiments, the number of physical I/O operations (e.g., memory accesses) actually performed when servicing the request may be a fixed or varying multiple of the number of logical service request units required (or consumed) when servicing the request. For example, in some embodiments the number of physical I/O operations performed when servicing a given request may on the order of twice the number of logical service request units required (or consumed) in servicing the request. As used herein, the terms "logical service request units" and "logical service request units per second" may be used to describe these and any other suitable methods for measuring and/or specifying the throughput level under a committed throughput model.

In some embodiments, clients/users receiving services under a committed throughput model may proactively request and/or purchase additional capacity or resources in anticipation of an increase in table size and/or service request traffic. For example, a client/user may specify (e.g., in a service request to create a table) a committed throughput level of 10,000 logical service request units per second for traffic directed to the table. In response, the data storage service (and underlying system) may automatically create 20 partitions for the table, and may reserve enough resources and/or capacity to support 500 logical service request units per second directed to each of the 20 partitions. In some embodiments, this may translate to something on the order of 1000 I/O operations to physical memory (e.g., disk). After the system has been configured to provide the initially requested committed throughput level, the client/user may request a temporary or permanent increase or decrease in the committed throughput level, and in response, the system may be configured to automatically add resources/capacity to those reserved for the table or remove resources/capacity from those reserved for the table to modify the amount of reserved resources/capacity such that it is commensurate with the requested modification. In some embodiments, a system that provides a committed throughput model may allow optional bursting to support short-term increases or spikes in traffic beyond that of the committed throughput level. For example, the system may configured to automatically accept and service additional logical service request units up to a pre-determined burst allowance level (after which it may or may not accept and service additional logical service request units), and may reserve enough resources for the table to be able handle traffic equal to the committed throughput level plus the burst allowance level. In other embodiments, the system may only accept and service additional logical service request units opportunistically (e.g., if resources and capacity are available) but without any guarantee to service those additional logical service request units. In still other embodiments, the system may strictly cap the logical service request units accepted and serviced at the amount corresponding to the committed throughput level, after which additional service requests may be throttled.

In one example, a client/user may request an increase in the committed throughput level for a table ahead of a planned or expected temporary burst or spike in demand (e.g., due to a sale, promotion, announcement, new release, or other event that may trigger increased activity directed to the table or a partition thereof) or in response to observing that demand is approaching the current committed throughput level. In another example, after preparing for and observing a temporary increase in demand for a given table, a client/user may submit a request to return the committed throughput level to its initial level, or to a new level commensurate with the expected demand going forward (e.g., a "new normal" for the table). In some embodiments, the data storage service (and underlying system) may allow the client/user to "re-negotiate" the committed throughput level for a table following a drop in demand (whether planned or not), which may allow the client/user to reduce costs associated with reversing a larger amount of resources/capacity than will be subsequently needed. In some embodiments, the data storage service (and underlying system) may allow the client/user to request that a given table be managed under a best effort throughput model, rather than a committed throughput model, following an initial period of high demand for which higher performance (i.e. lower latencies) are desired. In such embodiments, a portion of the resources/capacity allocated to or reserved for the table may be deallocated/unreserved (e.g., based on client/user-estimated demand, historical data, or system-wide, account-specific, or client-specific defaults), and subsequently received service requests that target the table may be handled opportunistically (as resources/capacity are available).

A data storage service (and underlying system) that provides a best effort throughput offering may be configured to run on more traditional spinning media (e.g., disk media), which may result in lower storage costs, but higher latencies. When managing a table under a best effort throughput model, the system may be configured to respond automatically to increases in traffic or data storage volume (i.e. without placing an administrative burden on clients/users or requiring their intervention), and may throttle at least some service requests until efforts to attempt to handle the increases are carried out. For example, in some embodiments, the system may be configured to throttle at least a portion of incoming service requests while adding partitions in response to workload changes and/or repartitioning data being managed by the service on behalf of storage service clients (e.g., users, subscribers, or client applications) in response to increased in traffic and/or data volume. While a best effort throughput model may cost less for the client/user, it may not be able to keep up with rapidly changing workloads. In other words, in situations in which the workload directed to a given table that is managed under a best effort throughput model can change rapidly, the overall performance of applications that target the given table may suffer (as compared to the performance of those that target tables managed under a committed throughput model in which the workload does not exceed the committed throughput level or in which changes in the workload are predictable and are handled pro-actively by modifying the committed throughput level ahead of increased demand).

Figure 17:
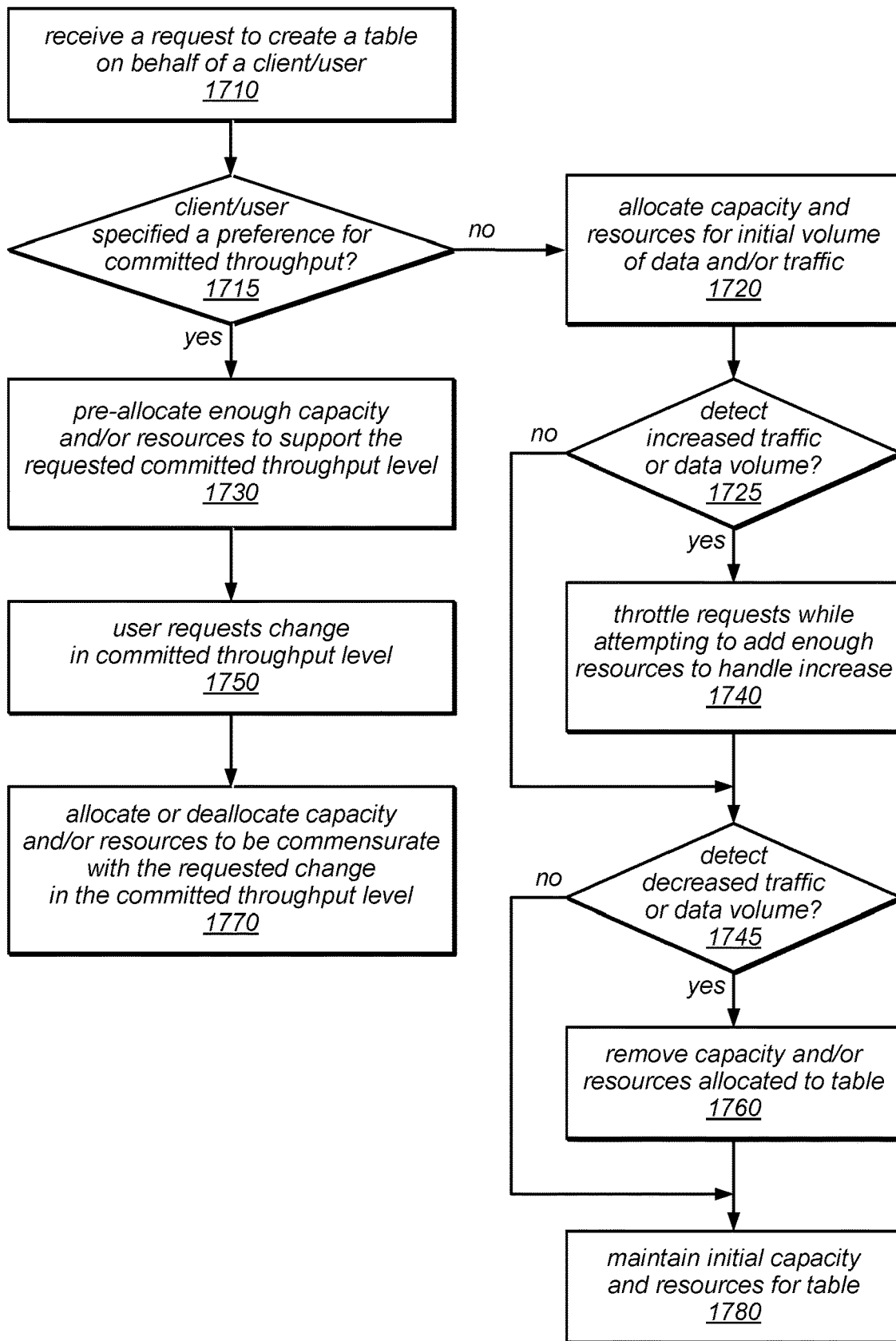
FIG. 17 is a flow diagram illustrating one embodiment of a method for creating and managing a table on behalf of a data storage service client using a preferred throughput model.

One embodiment of a method for creating and managing a table on behalf of a data storage service client (e.g., a user, subscriber, or client application) according to a specified throughput model is illustrated by the flow diagram in FIG. 17. As illustrated at 1710, in this example, the method may include a component of the system that implements the data storage service receiving a service request to create a table in a non-relational database (e.g., a table to be maintained on behalf of a client/user of a data storage service). In some embodiments, a client/user may submit a service request to the service (or the underlying data store) to create a table that conforms to an API that includes a parameter for specifying a throughput model to be used when servicing requests directed to the table (e.g., a best effort throughput model or a committed throughput model). In such embodiments, the request may also include an indication of the requested throughput level for which a commitment is sought. In some embodiments, the data storage service (and underlying system) may support the use of a system-wide, account-specific, or client-specific default for the throughput model to be used when creating a new table on behalf of the client/user. In some such embodiments, the request to create the table may not include an indication of a throughput model preference, but may include an indication of the requested throughput level for which a commitment is sought.

If the client/user has specified a preference for a committed throughput model, shown as the positive exit from 1715, the method may include the system pre-allocating enough capacity and/or resources to support the requested committed throughput level for traffic directed to this and/or any other tables being maintained on behalf of that user, as in 1730. For example, if the client/user is a subscriber who has paid for the privilege of receiving a particular throughput commitment, the system may pre-allocate sufficient resources and/or capacity (including, for example, storage resources allocated in an appropriate number of partitions, I/O throughput, CPU resources, and/or other resources of the data storage system) to meet that commitment. Note that in some embodiments, storage resources allocated for tables managed under a committed throughput model may include faster (and more expensive) storage resources than memory allocated to tables managed under a best effort throughput model. If the client/user subsequently requests a commitment for increased throughput or requests a reduction in the committed throughput level, as in 1750, the system may be configured to allocate or deallocate capacity and/or resources for that table to be commensurate with the requested modification to the committed throughput level, as in 1770. For example, in some embodiments, the client/user may be able to pay for a temporary or permanent increase in throughput (thus modifying the requested level of committed throughput), and the system may be configured to re-allocate resources and/or capacity accordingly (e.g., in response to the change in the client/user's account information). In some embodiments, such a request may be made by the client/user that created the table or by another privileged user (i.e. one authorized to make changes in the configuration of the table) in accordance with an API that includes one or more parameters for configuring and/or re-configuring tables maintained by the data storage service on behalf of clients/users. In some embodiments, following a request for a temporary increase in capacity and/or resources, the client/user may request (and receive) a decreased level of support in terms of capacity and/or resources.

If the user has not specified a preference for a committed throughput (e.g., if a best effort model is specified in the table creation request or a system-wide, account-specific, or client-specific default for the throughput model to be used when creating a new table on behalf of the client/user indicates that a best effort throughput model should be applied when managing requests directed to the table), shown as the negative exit from 1715, the method may include the system allocating capacity and/or resources to support an initial volume and/or distribution of traffic directed to the table, as in 1720. For example, if the user is a subscriber who has paid not for the privilege of receiving a particular throughput commitment, but who has indicated that a best effort throughput model is sufficient for their needs, the system may allocate an initial amount of resources and/or capacity based on a best effort throughput model. In various embodiments, the initial amount of resources and/or capacity allocated to the new table may be dependent on historical volumes and/or patterns of service requests for this and/or other clients/users, a volume or distribution of service requests predicted by the client/user (which in some embodiments may be specified in the table creation request), system-wide, account-specific, or client-specific defaults or configurable parameter values for the resources and/or capacity initially allocated to newly created tables, and/or other factors. Note that in some embodiments, memory in which tables managed under a best effort throughput model are maintained may be cheaper (and slower) than memory in which tables managed under a best effort throughput model are maintained.

If the system detects an increase in traffic and/or volume of data (e.g., if the increased traffic results in the system not being able to service all of the requests or the volume of data to be stored approaches the allocated capacity), shown as in the positive exit from 1725, the system may be configured to throttle requests until or unless additional capacity and/or resources can be put in place to support the traffic or data volume increase, as in 1740. For example, in response to detecting increased traffic directed to one or more tables (or partitions thereof), or a volume of data in the table that is approaching the currently allocated capacity for the table (or a partition thereof), the system may be configured to automatically add partitions, move partitions, or otherwise repartition the data in the table and/or in one or more other tables in an attempt to service the client/user at the increased traffic or data volume level.

Similarly, if the system detects a decrease in traffic and/or volume of data (e.g., over a sustained period of time), shown as in the negative exit from 1725, the system may be configured to remove or deallocate capacity and/or resources for the table so that the amount of capacity and/or resources dedicated to the table are more in line with the observed demand, as in 1760. For example, in response to detecting decreased traffic (or traffic that remains well below the level that can be supported by currently allocated resources and capacity) directed to the table (or one or more partitions thereof), or a volume of data in the table (or one or more partitions thereof) that is (and has been for at least a pre-determined period of time) well below the currently allocated capacity for the table or its partition(s), the system may be configured to automatically remove one or more partitions, collapse multiple partitions into a single partition, deallocate memory or throughput capacity for one or more partitions, or otherwise repartition the data in the table in an attempt to better match the resources and capacity that are allocated to the table to the observed demand. As illustrated in FIG. 17, while the traffic and/or data volume remain within a range that can be serviced with reasonable performance using the initially allocated capacity and/or resources, shown as the negative exits from 1725 and 1745, the data storage service (and underlying system) may maintain the initial capacity and resources for the table, as in 1780.

Note that in various embodiments, any or all of operations illustrated in FIG. 17 may be repeated in order to create, and subsequently maintain, tables managed by the data storage service while the tables remain active. Note that in some embodiments, any or all of detecting changes in the workload or data volume, throttling incoming service requests and/or modifying the number of partitions and/or amount of resources/capacity allocated, reserved, or available for a given table may be performed by an auto admin instance that initially allocates resources and subsequently modifies those allocations in response to changing conditions and/or requests made by a client/user.

Figure 18:
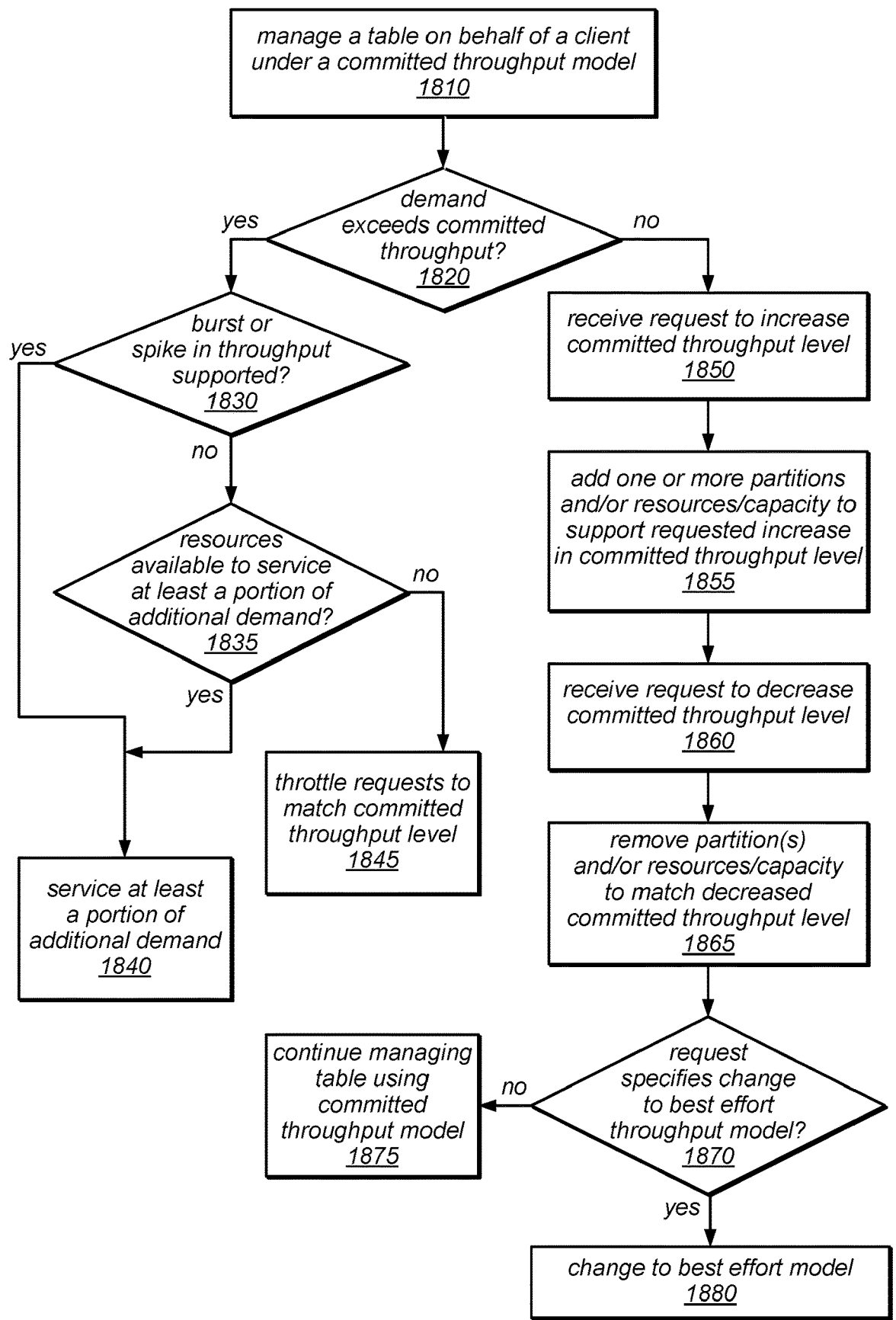
FIG. 18 is a flow diagram illustrating one embodiment of a method for servicing requests directed to a particular table while maintaining or modifying a committed throughput level.

As noted above, in various embodiments in which tables are managed using a committed throughput model, the system may allow modifications to the committed throughput level for those tables, e.g., it may allow temporary and/or permanent changes in the committed throughput level. FIG. 18 is a flow diagram illustrating one embodiment of a method for servicing requests directed to a particular table while maintaining or modifying a committed throughput level. As illustrated at 1810, in this example, a data storage service (or underlying data store) may manage a table on behalf of a client/user under a committed throughput model. Note that in some embodiments, memory allocated for tables managed under a committed throughput model may include faster (and more expensive) memory than memory allocated to tables managed under a best effort throughput model. In this example, if, at some point, the observed demand (in terms of throughput when servicing requests that target the table or various partitions thereof) exceeds the committed throughput level (shown as the positive exit from 1820) and if some amount of bursting and/or spikes in throughput (e.g., up to a pre-determined burst allowance level) are supported by the system (shown as the positive exit from 1830), the method may include the system servicing at least a portion of the additional demand (servicing additional throughput up to the pre-determined burst allowance), as in 1840. In this example, it is assumed that additional resources are reserved for the table to meet the committed throughput level and the pre-determined burst allowance level. In other embodiments, bursting or spikes in throughput may only be supported opportunistically (e.g., if resources and/or capacity that are not reserved for the table happen to be available).

As illustrated in FIG. 18, if the observed demand exceeds the committed throughput level (shown as the positive exit from 1820), but bursting and/or spikes in throughput are not supported by the system (shown as the negative exit from 1830), and there are not sufficient resources available to service at least a portion of the additional demand (shown as the negative exit from 1835, the method may include the system throttling service requests that are directed to the table to match the committed throughput level, as in 1845. In some embodiments, if demand exceeds the committed throughput level (shown as the positive exit from 1820), and bursting and/or spikes in throughput are not supported by the system (shown as the negative exit from 1830), but there are sufficient resources available to service at least a portion of the additional demand (shown as the positive exit from 1835, the method may include the system servicing at least a portion of the additional demand, as in 1840. In other words, in some embodiments, any additional demand (demand that exceeds the committed throughput level) may be serviced opportunistically, but may not be guaranteed. As noted above, servicing requests that exceed a committed throughput level (whether through a policy for allowing bursts/spikes or opportunistically) may in some embodiments result in additional charges to a client/user account beyond those for providing the committed throughput level.

As illustrated in this example, if the observed demand does not exceed the committed throughput level (shown as the negative exit from 1820), but a service request is received indicating a request for an increased committed throughput level (as in 1850), the method may include the system adding one or more partitions and/or additional resources/capacity to support the requested increase in the committed throughput level, as in 1855. For example, if the client/user expects a temporary or permanent increase in demand (in terms of throughput when servicing requests that target the table), the client/user may in some embodiments pro-actively request an increase in the committed throughput level so that the system will be handle the increased demand without waiting for it to react to the increase demand. In response, the system may add one or more partitions (along with the associated I/O throughput) and/or may change the configuration of the system to accommodate the request (e.g., by adjusting the portion of the I/O throughput that is allocated to the table from the total throughput supported in the system or on particular computing nodes thereof. For example, in response to a request to increase the committed throughput level for a given table from 1000 logical request units per second to 2000 logical request units per second, the system may double the number of partitions for the table, or may double the I/O throughput that is allocated to each of the partitions for the table.

In some embodiments, if the increased demand is expected (or observed) to be temporary, or in response to decaying demand following a period of increased demand, the client/user may request that the committed throughput level be decreased (e.g., to the previous committed throughput level, or to a different "new normal" committed throughput level). In this case, shown at 1860, the system may be configured to remove one or more partitions, collapse multiple partitions into a single partition, deallocate memory or throughput capacity for one or more partitions, and/or repartition the data in the table in an attempt to better match the resources and capacity that are allocated to the table to the decreased committed throughput level, as in 1865.

Note that in some embodiments, if the client/user expects the demand directed to the table (and/or various partitions thereof) to remain at a relatively low level for the remainder of the time that the table is active, the client/user may indicate in the request for a decreased committed throughput level that it no longer needs or desires any commitment (or corresponding guarantee) on the throughput level for the table. In other words, the request may indicate a committed throughput level of zero, which may effectively indicate a request to manage the table using a best effort throughput model rather than a committed throughput model when subsequently servicing requests directed to the table. This is illustrated in FIG. 18 by the positive exit from 1870 and element 1880. Note that in some embodiments, memory in which tables managed under a best effort throughput model are maintained may be cheaper (and slower) than memory in which tables managed under a best effort throughput model are maintained. If the request for a decreased committed throughput level does not indicate that the client/user no longer needs or desires a commitment (and corresponding guarantee) on the throughput level for the table, shown as the negative exit from 1870, the system may continue to manage the table using a committed throughput model (e.g., according to the current committed throughput level), as in 1875.

Note that in various embodiments, any or all of operations illustrated in FIG. 18 may be repeated in order to create, and subsequently maintain tables managed by the data storage service while the tables remain active.

In various embodiments, there may be situations in which a partition (or a replica thereof) may need to be copied, e.g., from one machine to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance. In some embodiments, the data storage service (and/or underlying system) described herein may perform partition moves using a physical copying mechanism (e.g., a physical file system mechanism) that copies an entire partition from one machine to another, rather than copying a snapshot of the partition data row by row (as in a traditional logical database partition copying operation). While the partition is being copied, write operations targeting the partition may be logged. During the copy operation, any logged write operations may be applied to the partition by a catch-up process at periodic intervals (e.g., at a series of checkpoints). Once the entire partition has been copied to the destination machine, any remaining logged write operations (i.e. any write operations performed since the last checkpoint) may be performed on the destination partition by a final catch-up process. Therefore, unlike with traditional partition moving mechanisms, the data in the destination partition may be consistent following the completion of the partition move.

Figure 19:
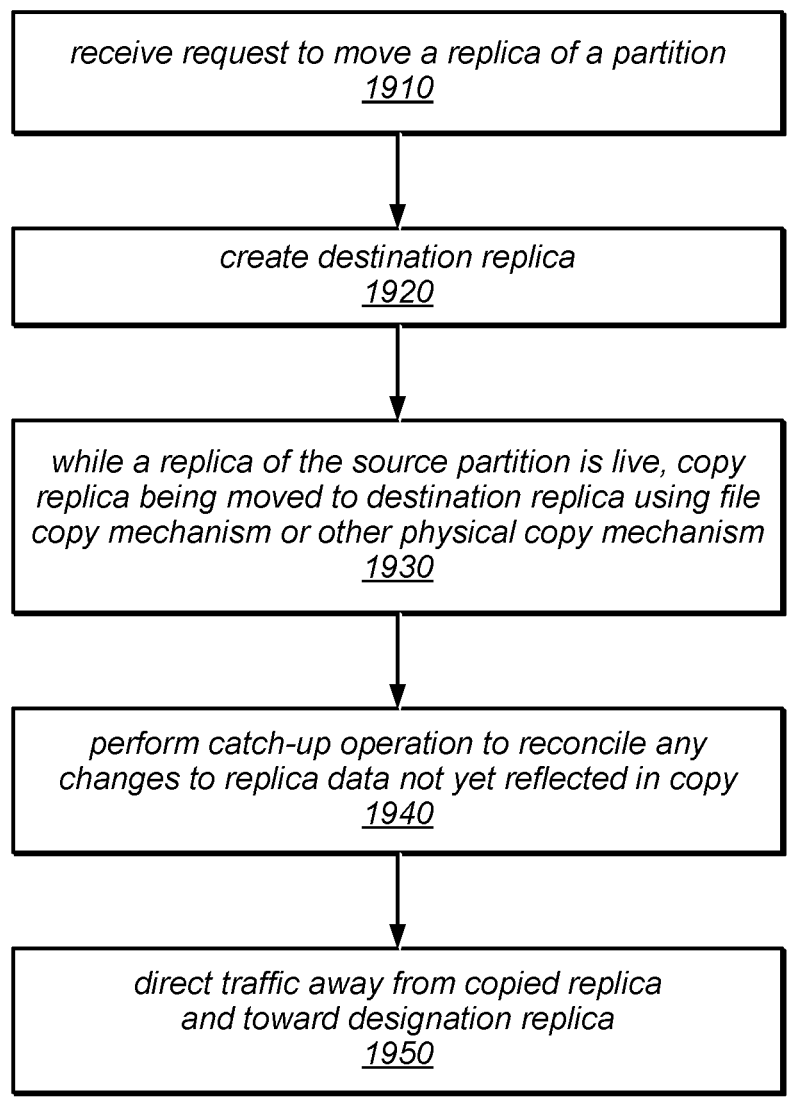
FIG. 19 is a flow diagram illustrating one embodiment of a method for moving a replica of a partition of a table being maintained by a data storage service on behalf of a storage service client while the partition is "live".

One embodiment of a method for moving (or copying) a replica of a partition of a table being maintained by a data storage service on behalf of a storage service client while the partition is "live" is illustrated by the flow diagram in FIG. 19. In this example, the method may include a component of the system that implements the data storage service receiving a request to move a replica of a partition, as in 1910. For example, the system may receive an explicit request to move a replica from a client/user or system administrator, or such a request may be automatically generated in the system in response to detecting an anomaly (as described in more detail below). As illustrated at 1920, in response to receiving the request to move the partition, the system may be configured to create a new replica (which may be referred to as a destination replica), while the partition is live (i.e. while one or more replicas of the partition continue to accept and service requests directed to the partition). In some embodiments, creating a destination replica may include selecting a computing node or storage device on which to create the destination replica, allocating memory on the computing node or storage device for the destination replica, creating or updating metadata associated with the partition and/or the destination replica, and/or performing other functions appropriate for creating the destination replica.

As illustrated in this example, the method may include the system copying the replica being moved to the destination replica using a file copy mechanism or another physical copy mechanism while a replica of the partition is live, as in 1930. In other words, the replica may be copied to the new destination replica using an operation that copies the physical locations of the replica data, rather than using a logical copying operation (e.g., one that reads and copies table data on a row-by-row basis). As illustrated at 1940, after performing the physical copying operation, the method may include the system performing a catch-up operation to reconcile any changes to the replica data that were made during the copy operation but that are not yet reflected in the new copy. This catch-up operation is described in more detail below. Once the destination replica has been created and populated, the method may include directing traffic away from copied replica and toward the new designation replica, as in 1950.

Figure 20:
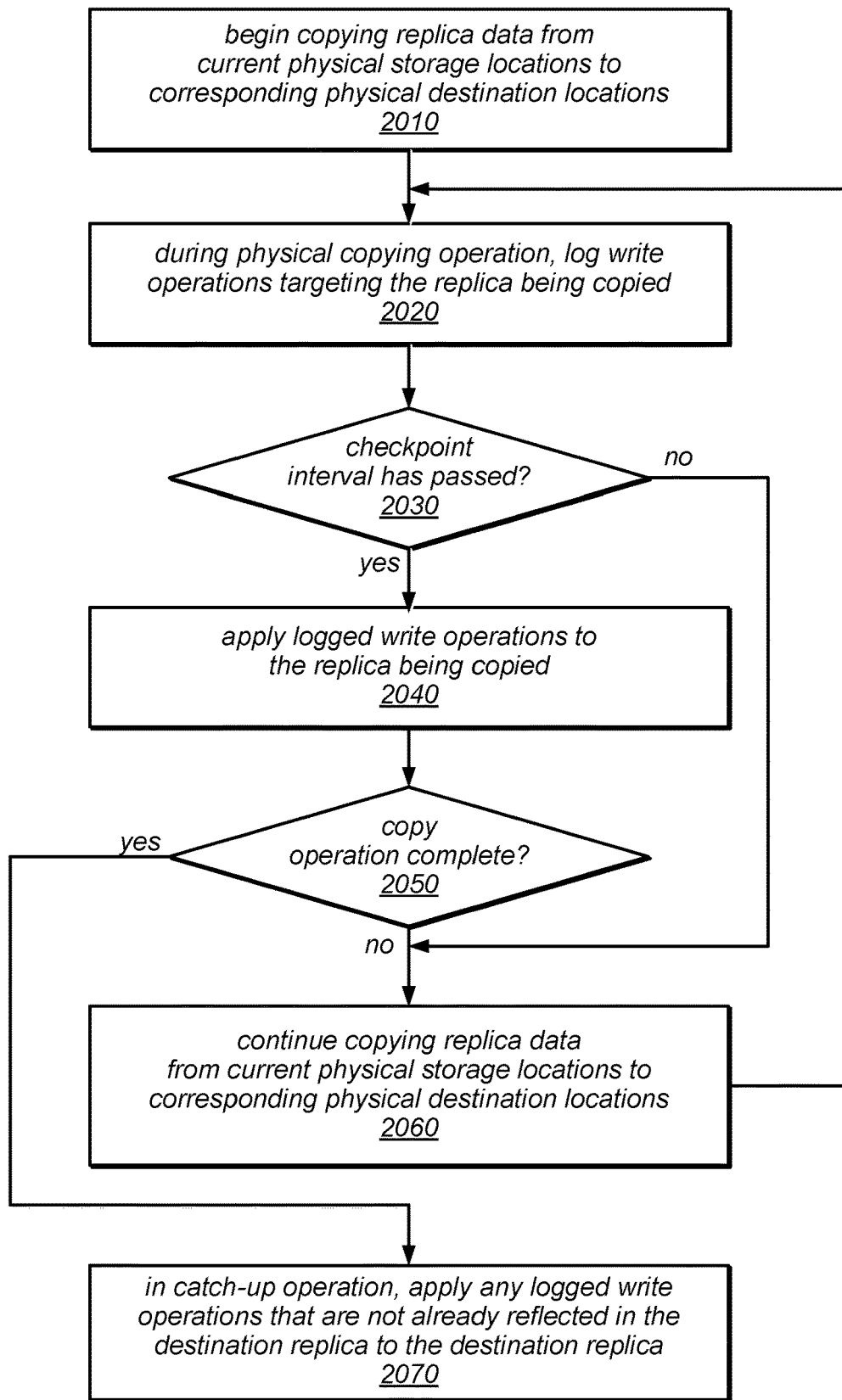
FIG. 20 is a flow diagram illustrating one embodiment of a method for moving a replica using a physical copy mechanism.

In some embodiments, the storage engine for the underlying data store of a data storage service (e.g. a non-relational database) may store replica data in database files, and each replica (and database file) may be associated with a recovery log. In such embodiments, when a service request to modify the replica data is received, it may be logged in the recovery log before being applied to the replica. In the case of a node failure or system crash, the changes logged in the recovery log may be reapplied to a previous snapshot or checkpoint of the replica data to recover the contents of the replica. As noted above, in some embodiments, the data storage service (and its underlying system) may support a replica move that employs a physical copy mechanism. In some such embodiments, the physical copy mechanism may employ such a log, which may ensure that the replica data that is moved to a new destination is consistent. FIG. 20 illustrates one embodiment of a method for moving a replica using a physical copy mechanism, as described above. In this example, the method begins copying replica data from its current physical storage locations to corresponding physical destination locations, as in 2010. In some embodiments, the physical copy operation may include copying pages from one physical storage device (e.g., disk storage) to a destination storage device over a network.

As illustrated at 2020, during the physical copying operation, write operations targeting the replica being moved may be logged before being applied to the replica being copied, as described above. In various embodiments, each logged write operation (or group of write operations) may be assigned a log sequence number. In some embodiments, the logged changes may be applied to the replica being copied at periodic checkpoint intervals. In the example illustrated in FIG. 20, when a pre-determined checkpoint interval passes, shown as the positive exit from 2030, all of the modifications (e.g., write operations) logged since the last checkpoint may be applied to the replica being copied. Because these updates are applied while the replica is being copied, some of these modifications will be reflected in the destination replica as a result of the copying operation (e.g., modifications that were applied to a given portion of the replica data before that portion of the data was copied to the destination). Other modifications may not be reflected in the destination replica following the copying operation (e.g., modifications that were applied to a given portion of the replica data after that portion of the data was copied to the destination).

As illustrated in FIG. 20, the method may include continuing to copy replica data from current physical storage locations to corresponding physical destination locations while it is not complete (shown as the negative exit from 2050, element 2060, and the feedback to 2020). The method may include continuing to log write operations (as in 2020) and to apply logged write operations to the replica being copied (as in 2040) each time the checkpoint interval passes (shown as the positive exit from 2030). Once the physical copy operation is complete (shown as the positive exit from 2050), the method may include performing a catch-up operation, in which any logged write operations that are not already reflected in the destination replica are applied to the destination replica, as in 2070. Thereafter, accesses to the replica may be directed away from the source replica and directed toward the new destination replica. For example, any write operations targeting the replica may be logged in a recovery log for the destination replica, and subsequently applied to the destination replica (e.g., at the next periodic checkpoint). In some embodiments, following the move of the replica to its new destination, the log in which modifications to the source replica were logged may be copied (or used directly) for the recovery log for the destination replica.

In some embodiments, the partition moving process described above may be employed in partition splitting operations. For example, a partition may be split because it is large, e.g., when it becomes too big to fit on one machine and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation).

Note that in some embodiments, moving a replica of a partition in a cluster may be quicker than splitting a partition, because the system may take advantage of file copying process described above for replica movement. Splitting a partition, on the other hand, may require logically dividing the partition data in one underlying data structure (e.g., one B-tree) into two such data structures (e.g., two B-trees), which is generally less efficient than moving an entire replica, described above. Therefore, in some embodiments, a partition splitting process may include creating additional replicas of the partition, and thereafter managing only half of the partition data on each replica. For example, if there are three replicas of a given partition that is to be split, the partition splitting process may include creating three additional copies of the entire partition (e.g., using the partition moving process described above). These resulting six replicas may be split into two groups of three partitions, each of which may be made responsible for handle service requests directed to half of the original partition data using an operation to split the responsibilities between the groups of replicas. For example, following the operation to split the responsibilities, service requests directed to data in a designated portion of the original partition may be accepted and serviced by a given replica, while service requests targeting the remaining data of the original partition may be rejected by that replica. In some embodiments, the partition data for which a given replica is not responsible may eventually be removed (e.g., so that the memory allocated to the replica for data it no longer supports may be subsequently used to store new items in the replica), or the memory in which it was stored may be reclaimed by the system (e.g., so that the memory allocated to the replica for data it no longer supports may be subsequently used by another partition). Removal of unsupported data or reclamation of memory may be performed by background tasks without affecting the performance of the data storage system, and may be transparent to clients/users.

In some embodiments, each partition may be identified by a partition ID, which may be a unique number (e.g., a GUID) assigned at the time the partition is created. A partition may also have a version number that is incremented each time the partition goes through a reconfiguration (e.g., in response to adding or removing replicas, but not necessarily in response to a master failover). When a partition is split, two new partitions may be created, each of which may have a respective new partition ID, and the original partition ID may no longer be used. In some embodiments, a partition may be split by the system using a split tool or process in response to changing conditions. For example, a scheduled task of an auto admin instance may monitor partition sizes and "heat" (e.g., traffic directed to each partition), and may apply policies that determine when to use the splitting tool/process to perform a split. In some embodiments, the splitting tool and auto admin instance may avoid attempting two splits at the same time by employing a lock manager.

In some embodiments, the monitoring component may provide a list of partitions that meet the split criteria to the splitting tool/process. The criteria may be based on partition size and heat, where heat may be tracked by internally measured metrics (such as IOPS), externally measured metrics (such as latency), and/or other factors. In some embodiments, the splitting tool/process may receive a request to split a partition from the monitoring component that includes a partition ID and a version number for the partition to split, and a list of machines (e.g., machines in the same cluster or storage silo that are known to be lightly loaded) for the location(s) of the new partitions/replicas. Including the version number as an input to the splitting tool/process may ensure that the splitting tool/process does not attempt to split a partition that has already gone through one or more reconfigurations since the last time it was evaluated against the split criteria, as the splitting tool/process may reject the request if version number does not match.

Figure 21:
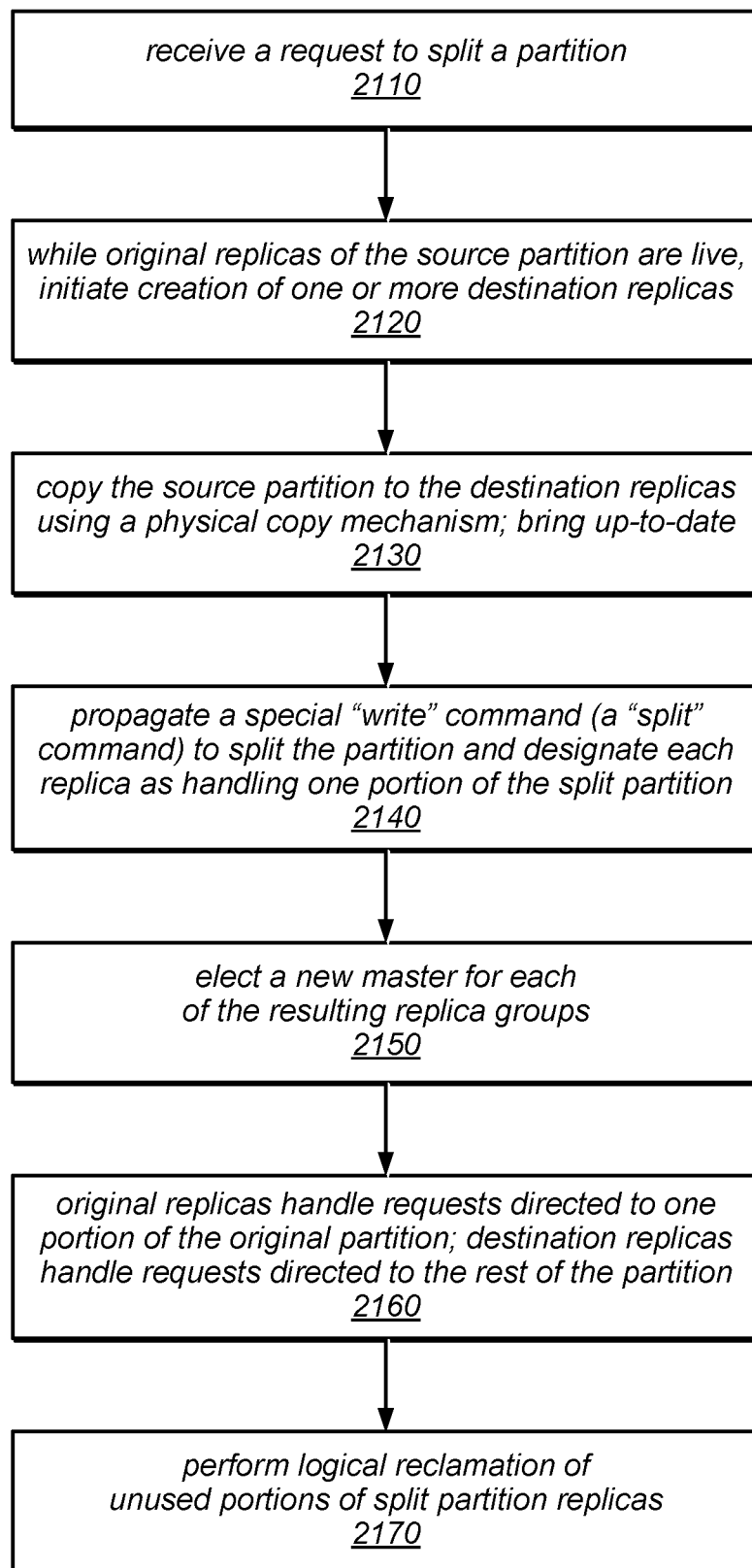
FIG. 21 is a flow diagram illustrating one embodiment of a method for splitting a partition of a table being maintained by a data storage service in response to a request to do so.

One embodiment of a method for splitting a partition of a table being maintained by a data storage service on behalf of a storage service client is illustrated by the flow diagram in FIG. 21. In this example, the method may include a component of the system that implements the data storage service receiving a request to split a partition, as in 2110. For example, the system may receive an explicit request to split the partition from a client/user or system administrator, or such a request may be automatically generated in the system in response to detecting an anomaly (as described in more detail below). As described above, in some embodiments, splitting a partition may involve creating additional replicas of the partition, and then designating half of the total number of replicas as managers of a respective portion of the original partition. Therefore, as illustrated at 2120, in response to receiving the request to split the partition, the system may be configured to initiate creation of the one or more new partitions (which may be referred to as destination partitions), while one or more of the original replicas of the source partition are live (i.e. while one or more of these replicas continue to accept and service requests directed to the partition). As illustrated at 2130, the method may include copying the source partition to the destination replicas using a physical copy mechanism (such as that described above). For example, the system may be configured to copy the table partition data from one of the original replicas of the partition to one or more of the destination replicas using a file copy mechanism, in some embodiments. The method may also include bringing the new replicas (once populated) up-to-date (e.g., by performing a catch-up operation, as described above).

As illustrated in this example, the method may include propagating a special "write" command (i.e. a "split" command) to split the partition and to designate each replica as handling one portion of the split partition, as in 2140. In some embodiments, the system may take the source replicas out of use briefly while the command to split the partition replicas is propagated to the storage nodes on which the six replicas are hosted. The split command may instruct the replicas resulting from the copy operation to split in half by designating each replica as belonging to the first half of the word or the second half of the word, thus forming two new replica groups. Note that in some embodiments, the special "split" command may not require any special durability.

As illustrated in this example, once the "split" command has been propagated and the two new replica groups have been established, the method may include each of the new replica groups electing a new master, as in 2150. Subsequently, half of the resulting replicas for the partition (e.g., the original replicas or another subset of the resulting replicas for the partition) may handle requests directed to one portion of the original partition, and the other replicas (e.g., the destination replicas or another subset of the resulting replicas for the partition) may handle requests directed to the rest of the original partition, as in 2160. For example, each of the replicas may reject requests for the data that is now out of its new smaller range (i.e. the half of the data that it is no longer responsible for), and may return an indication that the replica (or the node on which the replica is hosted) no longer hosts that data. As described above, in some embodiments, the system may be configured to perform a logical reclamation of the unused portions of the resulting split partition replicas, as in 2170. For example, as requests to store new items in the partition are received, these new items may be stored in locations in the table that (following the replica copying operation) held items stored in the original partition, but that are now being managed as part of a different partition (i.e. the other one of the two partitions created by the split). In some embodiments, the system may employ a background process to logically free up space within each of the resulting partition replicas, but that space may be consumed later if more items are added to the table that are assigned to the new partition replicas according to their hash key attribute values and/or range key attribute values. In some embodiments, a physical memory reclamation operation may be performed, which may return a portion of the memory that was previously allocated to a large partition replica prior to the split to the operating system. In such embodiments, a de-fragmentation operation may also be performed.

As noted above, the partition moving process illustrated in FIG. 19 and described above may be initiated automatically (e.g., programmatically) in response to detection of an anomaly in a system that implements a data storage service, in some embodiments. One embodiment of a method for moving a partition of a table being maintained by a data storage service on behalf of a storage service client in response to detecting an anomaly is illustrated by the flow diagram in FIG. 22. As illustrated at 2210, in this example, the method may include a component of the system detecting a failure or fault on a physical computing node or storage device that is hosting a replica of a partition of the table. In some embodiments, if the partition replica hosted on the node on which a fault or failure was detected was the master for its replica group, the method may include electing a new master for the replica group, as in 2220. In this example, the method may include the system initiating creation of a replacement partition replica while the source partition replica is live (i.e. while one or more of the replicas of the partition continue to accept and service requests directed to the partition), as in 2230.

As illustrated in this example, the method may include copying a source partition replica to the newly created replacement partition replica using a physical copy mechanism (as in 2240), and performing a catch-up operation to reconcile any changes to the partition data that are not yet reflected in the newly created replacement partition replica (as in 2250). For example, the source partition replica may be copied to the replacement partition replica using an operation that copies the physical locations of the partition data, rather than using a logical copying operation (e.g., one that reads and copies table data on a row-by-row basis). In various embodiments, the partition replica on the faulty machine may be used as the source partition replica, or another replica for same partition (on a working machine) may be used as the source partition replica, e.g., depending type and/or severity of the detected fault.

As noted above, the partition moving process described above and illustrated in FIGS. 19 and 20, and the partition splitting process illustrated in FIG. 21 and described above may be initiated automatically (e.g., programmatically) in response to detection of an anomaly in a system that implements a data storage service, in some embodiments. For example, if a hot spot develops on a particular computing node or storage device in the system underlying the data storage service, the system may be configured to split and/or move one or more partition replicas stored on that computing node or storage device. One embodiment of a method for splitting or moving a replica of a partition of a table being maintained by a data storage service on behalf of a storage service client in response to detecting a hot spot is illustrated by the flow diagram in FIG. 23. As illustrated at 2310, in this example, the method may include a component of the system detecting a hot spot on a physical computing node or storage device that is hosting a particular replica of a partition of the table. In other words, the system may detect that the computing node or storage device is experiencing a high level of traffic as compared to other computing nodes or storage devices in the system. In some cases, all or a portion of this heavy traffic may be directed to the particular partition replica itself itself, while in other cases the heavy traffic may be directed to other partition replicas, tables, or applications being hosted on the computing node or storage device.

As illustrated in this example, in response to detecting the hot spot, the system may be configured to move and/or split the particular partition in an attempt to reduce the effects of the hot spot, such as by reducing latency, increasing overall throughput in the system, or otherwise improving the performance of the data storage service. If the hot spot is due to traffic targeting a single partition, shown as the positive exit from 2315, the method may include initiating a split of that partition. In some embodiments, the system may be configured to create the one or more new partitions (which may be referred to as destination partitions), while one or more of the original replicas of the source partition are live (i.e. while one or more of these replicas continue to accept and service requests directed to the partition), as in 2320. For example, the system may be configured to create one or destination replicas on computing nodes or storage devices that are not as heavily loaded as the one on which the hot spot was detected. As illustrated at 2330, the method may include copying the source partition replica to the destination replicas using a physical copy mechanism (such as that described above). For example, the system may be configured to copy the table partition data from one of the original replicas of the partition (e.g., the partition replica hosted on the heavily loaded computing node or storage device, or another one of the replicas of the particular partition that is hosted on a different computing node or storage device) to one or more of the destination replicas using a file copy mechanism, in some embodiments. The method may also include bringing the new replicas (once populated) up-to-date (e.g., by performing a catch-up operation, as described above), as in 2340.

In this example, the method may include propagating a special "split" command to split the partition and to designate each replica as handling one portion of the split partition, as in 2360. Subsequent to the propagation of the "split" command, half of the resulting replicas for the partition (i.e. one new replica group) may handle requests directed to one portion of the original partition, and the other replicas (i.e. a second new replica group) may handle requests directed to the rest of the original partition. As illustrated at 2380, the method may include electing a new master for each of the new replica groups, as in 2380. As described above, in some embodiments, the system may be configured to perform a logical reclamation of the unused portions of the resulting split partition replicas(not shown). In such embodiments, as requests to store new items in the partition are received, these new items may be stored in locations in the table that held items that were stored in the original partition replica, but that are now being managed as part of a different partition (by the other one of the two new replica groups created by the split).

Figure 23:
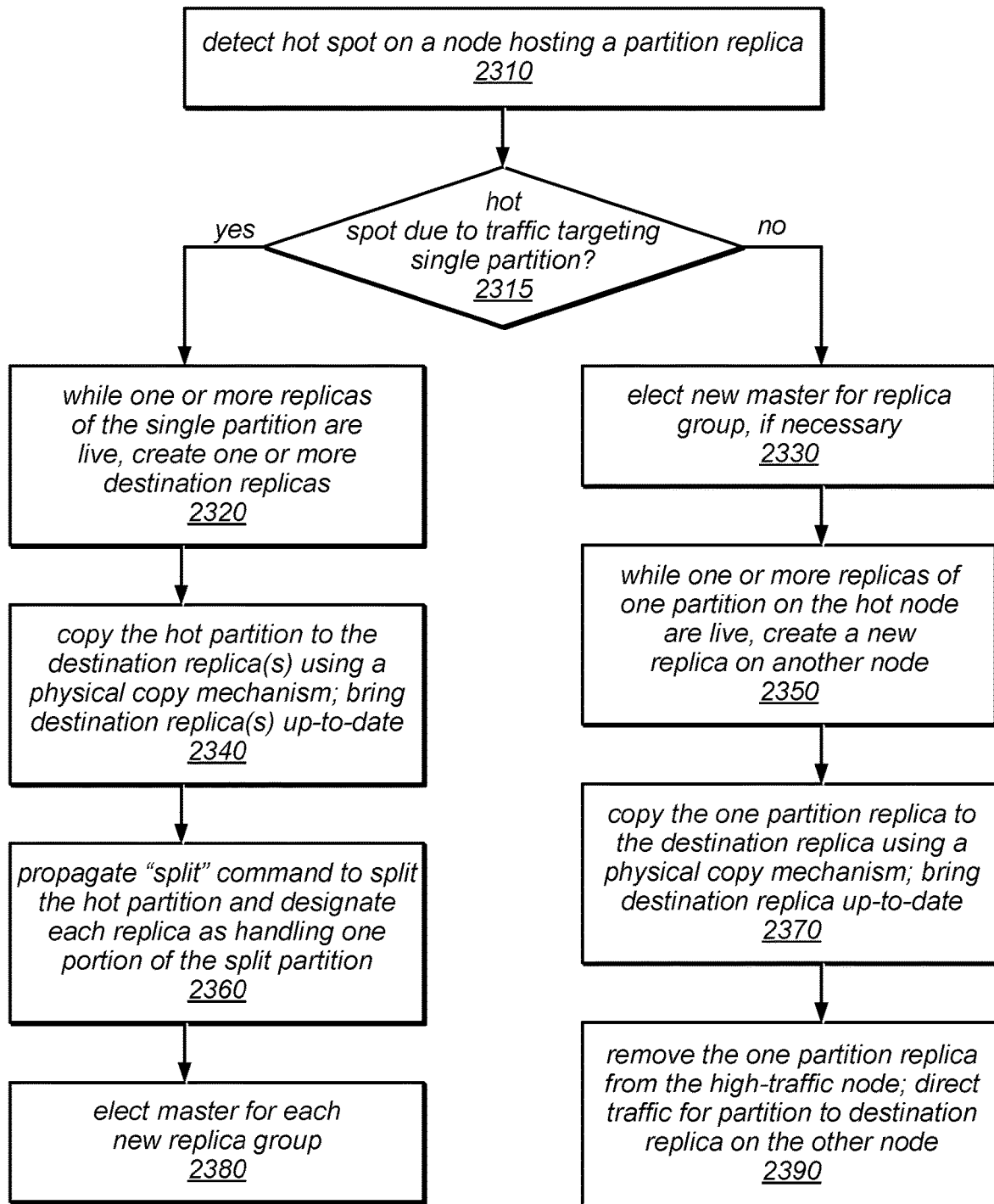
FIG. 23 is a flow diagram illustrating one embodiment of a method for moving or splitting a partition of a table being maintained by a data storage service in response to detecting a hot spot on a storage node.

As illustrated in FIG. 23, if the hot spot is not due to traffic targeting a single partition (e.g., if it is due to traffic directed to multiple partition replicas, tables, or applications being hosted on the computing node or storage device), the method may include initiating a move of one of the partition replicas to remove it from the high-traffic node. This is illustrated in FIG. 23 by the negative exit form 2315. In this case, the method may include electing a new master for the replica group, if the replica being moved was the master for its replica group (as in 2330). As illustrated in this example, the method may include creating a new replica on another computing node or storage device while one or more replicas of the partition whose replica is being moved are live, as in 2350. In some embodiments, the partition replica being moved may be copied to this new destination replica using a physical copy mechanism (such as that described herein) and the destination replica may be brought up-to-date using a catch-up mechanism once the copy is complete, as in 2370. Once the destination replica has been populated an brought up to date, the partition replica that was copied to a new destination may be removed from the high-traffic node, as in 2390. Subsequently, traffic directed to that partition may be directed to the destination replica on the other node (the less heavily loaded node).

Note that in some embodiments, in response to detecting a hot spot on a computing node or storage device in a system that implements a data storage service, the system may perform both a partition split and one or more replica move(s). For example, after splitting a partition that is experiencing heavy traffic, the replica for the split partition that was hosted on the hot node may also be moved from the hot node to a new host node using the physical copy mechanism described herein. In addition, if any of the other replicas in either of the new replica groups resulting from the partition split are hosted on hot nodes, they may also be moved to other nodes. Note that in some embodiments, a method similar to the method illustrated in FIG. 23 for moving and/or splitting a partition may be applied in response to detecting an increasing table size. For example, as more items are added to a given table, such a method may be used to add new partitions (and corresponding replicas thereof), and thus to provide automatic scaling of the table.

Figure 24:
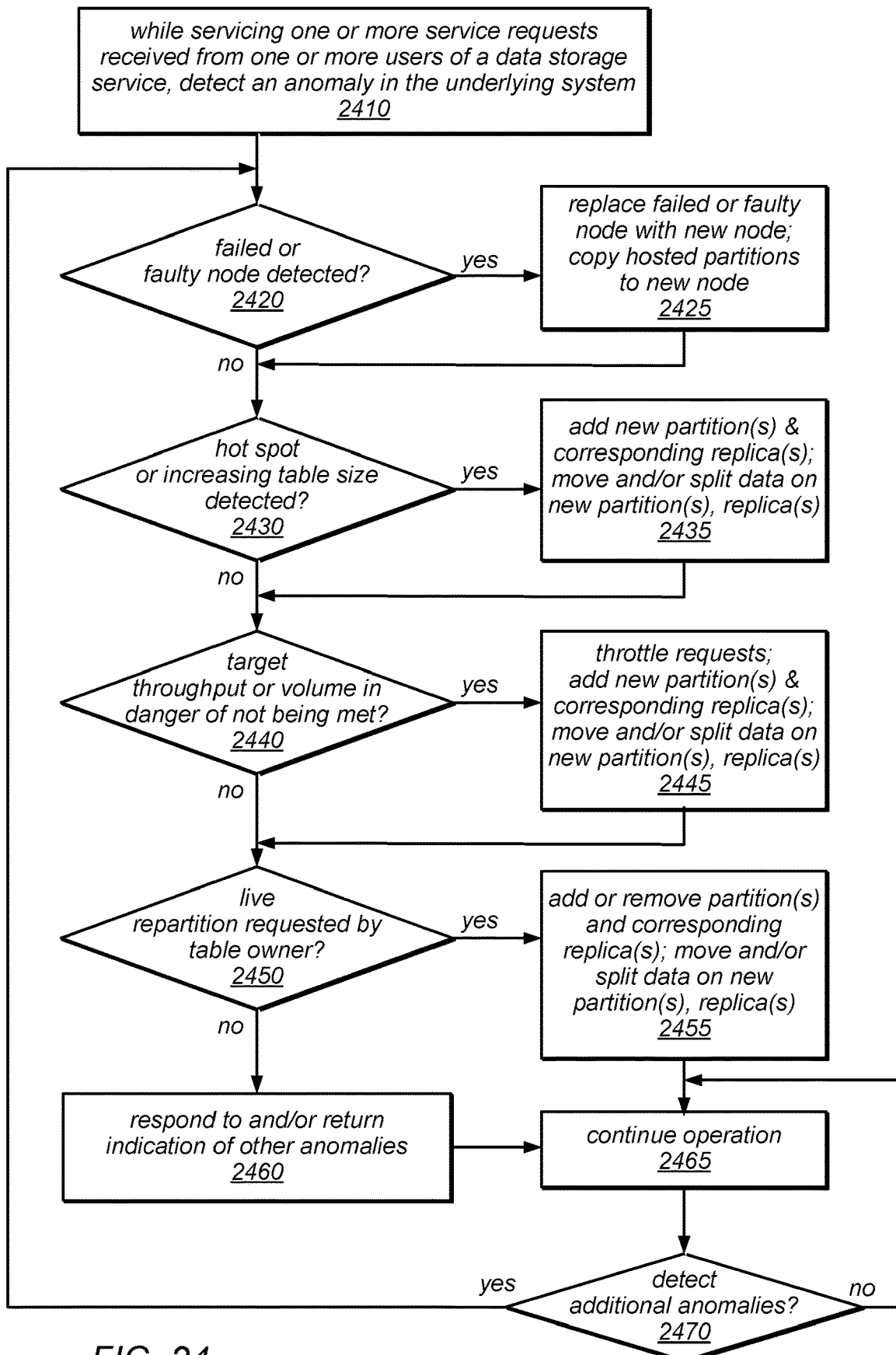
FIG. 24 is a flow diagram illustrating one embodiment of a method for maintaining and managing a plurality of tables on behalf of one or more storage service clients.

One embodiment of method for maintaining and managing a plurality of tables on behalf of one or more storage service clients is illustrated by the flow diagram in FIG. 24. As illustrated at 2410, in this example, the method may include detecting an anomaly in a system that implements a data storage service while servicing requests from one or more storage service clients. In some embodiments, the system may be configured to automatically (e.g., programmatically) respond to the detection of various types of anomalies, such as by scaling tables, moving partitions, splitting partitions, and/or taking other actions not described herein. For example, if a failed or faulty node (e.g., a computing node or storage device) has been detected (as in 2420), the system may be configured to replace the failed or faulty node with a new node and/or to copy any or all partitions that are hosted on the failed or faulty node to the new node (as in 2425). As previously noted, if a failed or faulty node hosted a partition replica that was a master for its replica group, the system may also be configured to elect a new master subsequent to copying the partition to the new node.

If a hot spot or increasing table size is detected (as in 2430), the system may be configured to add one or more new partitions and corresponding replicas (e.g., on computing nodes or storage devices other than the one on which the hot spot was detected), and to move and/or split data that was hosted on the heavily loaded computing node or storage device in one or more of the new partitions or replicas (as in 2435). Similarly, if the system has detected that a best effort throughput target (or another user preference) is not being met or is in danger of not being met due to increasing traffic or if the data volume is increasing beyond a targeted capacity for the table (as in 2440), the system may be configured to throttle incoming service requests while attempting to correct the situation. Again, the system may be configured to add one or more new partitions and corresponding replicas (e.g., on computing nodes or storage devices other than the one on which the hot spot was detected), and to move and/or split data that was hosted on the heavily loaded computing node or storage device in one or more of the new partitions or replicas (as in 2445). Similarly, if a live repartition is explicitly requested (e.g., by a table owner), as in 2450, the system may be configured to add or remove one or more new partitions and corresponding replicas accordingly, or to move and/or split data that was hosted on a heavily loaded computing node or storage device in one or more of new partitions or replicas (as in 2455).

If another type of anomaly has been detected (shown as the negative outputs of 2420, 2430, 2440, and 2450) and the system has responded to and/or returned an indicator of that anomaly (as in 2460), or once the system has initiated as response to one of the anomalies described above (as in 2425, 2435, 2445, or 2455), the system may continue servicing incoming requests, as in 2465. In some embodiments, the system may be configured to continue operation (e.g., to continue servicing incoming service requests), as in 2465, until or unless additional anomalies are detected. This is illustrated in FIG. 24 by the feedback from 2470 to 2465. If any additional anomalies are detected, shown as the positive exit from 2470, any or all of the operations shown as 2420-2460 may be repeated by the system in order to maintain and manage tables on behalf of data storage service clients. This is illustrated in FIG. 24 by the feedback from 2470 to 2420. Note that in some embodiments, any or all of the operations illustrated in FIG. 24 may be performed pro-actively (and automatically) by background tasks while the data storage service is in operation, and may not necessarily be performed in response to receiving any particular service requests.

Figure 25:
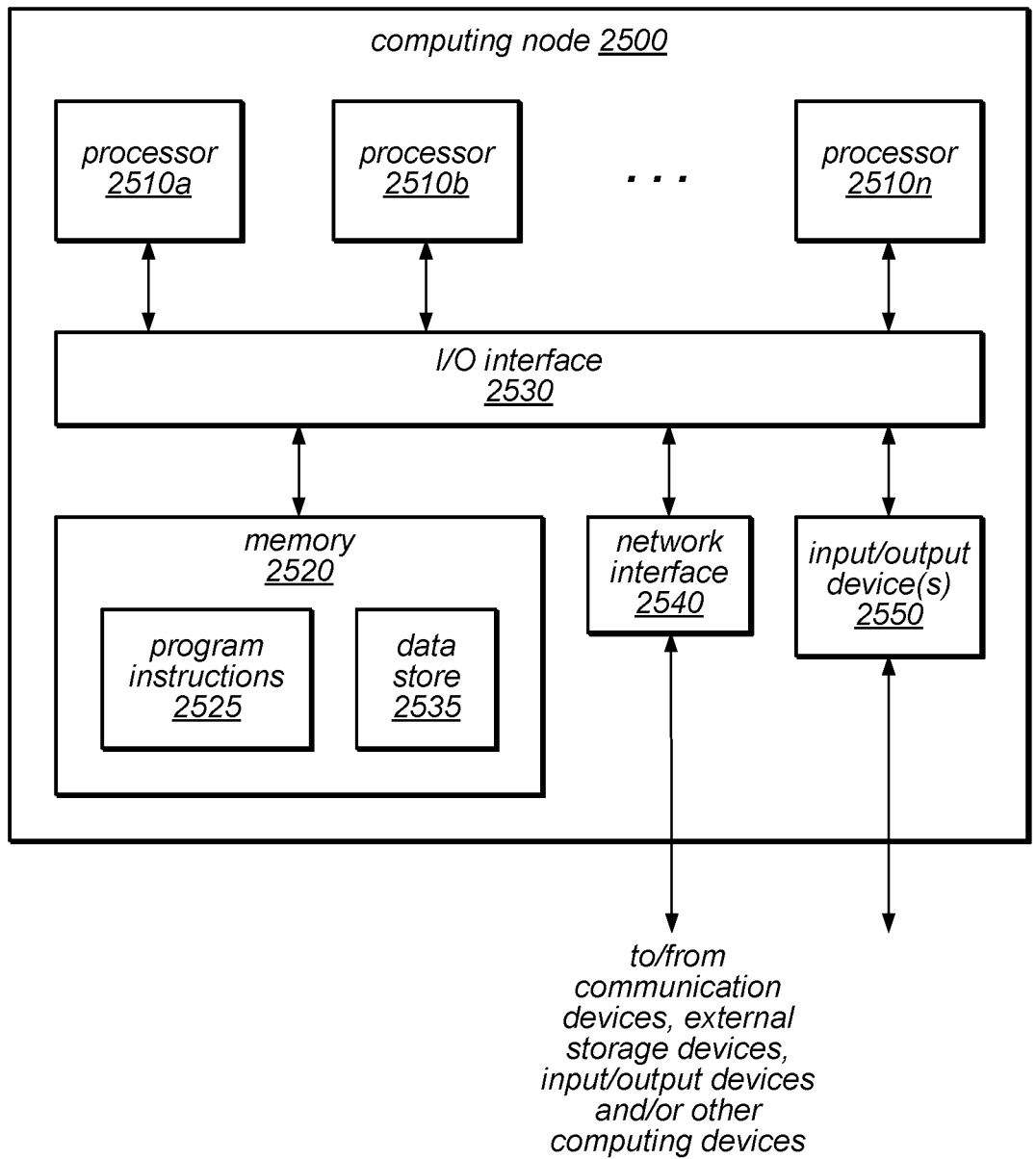
FIG. 25 is a block diagram illustrating a computing node that may be suitable for implementation of a data storage service, according to one embodiment.

One computing node that may be suitable for implementation of a data storage service that employs the techniques described herein is illustrated in FIG. 25. Computing node 2500 may include functionality to provide any or all of the components of a system that implements such a data storage service, or multiple computing nodes similar to or different from computing node 2500 may collectively provide this functionality, in different embodiments. For example, in various embodiments, one or more computing nodes 2500 may implement any number of storage service clients 110, a front end module 140, any number of auto admin instances 150, any number of storage devices (such as storage node instances 160), and/or any other components of a Web services platform 130, an auto admin cluster, or external resources that interact with Web services platform 130 (such as simple workflow component 170 or external storage service 180). In some embodiments that include multiple computing nodes 2500, all of the computing nodes 2500 may include the same or similar hardware components, software components, and functionality, while in other embodiments, the computing nodes 2500 comprising a computing system configured to implement the functionality described herein may include a wide variety of hardware components, software components, and functionality. In some embodiments, multiple computing nodes 2500 that collectively implement a data storage service may be components of a larger shared resource system or grid computing system.

In the illustrated embodiment, computing node 2500 includes one or more processors 2510 coupled to a system memory 2520 via an input/output (I/O) interface 2530. Computing node 2500 further includes a network interface 2540 coupled to I/O interface 2530, and one or more input/output devices 2550. As noted above, in some embodiments, a given node may implement the functionality of more than one component of a system that manages and maintains data in tables (e.g., in a non-relational database) on behalf of data storage service clients, such as that described herein. In various embodiments, a computing node 2500 may be a uniprocessor system including one processor 2510, or a multiprocessor system including several processors 2510 (e.g., two, four, eight, or another suitable number). Processors 2510 may be any suitable processor capable of executing instructions. For example, in various embodiments processors 2510 may be general-purpose or embedded processors implementing any of a variety of instruction set architectures (ISAs), such as the x86, PowerPC, SPARC, or MIPS ISAs, or any other suitable ISA. In multiprocessor systems, each of processors 2510 may commonly, but not necessarily, implement the same ISA. Similarly, in a distributed computing system such as one that collectively implements a data storage service, each of the computing nodes may implement the same ISA, or individual computing nodes and/or replica groups of nodes may implement different ISAs.

In some embodiments, system memory 2520 may include a non-transitory, computer-readable storage medium configured to store program instructions and/or data accessible by processor(s) 2510. In various embodiments, system memory 2520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 2520 as program instructions 2525 and data storage 2535, respectively. For example, program instruction 2525 may include program instructions that when executed on processor(s) 2510 implement any or all of a storage service client 110, a front end module 140 (which may include a user interface), an auto admin instance 150, a storage node instance 160, an admin console 265, a request router, a staging host, one or more metadata tables, a simple workflow component 170, an external storage service 180, and/or any other components, modules, or sub-modules of a system that provides the data storage service described herein. Program instructions 2525 may also include program instructions configured to implement additional functionality of a system that implements a data storage service not described herein.

Data storage 2535 may in various embodiments include collections of data maintained by a data storage service on behalf of its clients/users, and/or metadata used by a computing system that implements such a service, as described herein (including, but not limited to, tables managed and maintained on behalf of clients/users of the service, metadata tables, business rules, partition maps, routing tables, indexes, namespaces and/or partitions thereof, service level agreement parameter values, subscriber preferences and/or account information, performance data, and/or resource usage data). In other embodiments, program instructions and/or data as described herein for implementing a data storage service that employs the techniques described above may be received, sent or stored upon different types of computer-readable media or on similar media separate from system memory 2520 or computing node 2500. Generally speaking, a computer-readable medium may include storage media or memory media such as magnetic or optical media, e.g., disk or CD/DVD-ROM coupled to computing node 2500 via I/O interface 2530. Program instructions and data stored on a computer-readable storage medium may be transmitted to a computing node 2500 for execution by a processor 2510a by transmission media or signals such as electrical, electromagnetic, or digital signals, which may be conveyed via a communication medium such as a network and/or a wireless link, such as may be implemented via network interface 2540.

In one embodiment, I/O interface 2530 may be configured to coordinate I/O traffic between processor(s) 2510, system memory 2520, and any peripheral devices in the computing node, including network interface 2540 or other peripheral interfaces, such as input/output devices 2550. In some embodiments, I/O interface 2530 may perform any necessary protocol, timing or other data transformations to convert data signals from one component (e.g., system memory 2520) into a format suitable for use by another component (e.g., processor 2510). In some embodiments, I/O interface 2530 may include support for devices attached through various types of peripheral buses, such as a variant of the Peripheral Component Interconnect (PCI) bus standard or the Universal Serial Bus (USB) standard, for example. In some embodiments, the function of I/O interface 2530 may be split into two or more separate components, such as a north bridge and a south bridge, for example. Also, in some embodiments some or all of the functionality of I/O interface 2530, such as an interface to system memory 2520, may be incorporated directly into processor 2510.

Network interface 2540 may be configured to allow data to be exchanged between computing node 2500 and other devices attached to a network (such as other computer systems, communication devices, input/output devices, or external storage devices), or between other nodes in a system providing shared computing services. In various embodiments, network interface 2540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2550 may, in some embodiments, include one or more display terminals, keyboards, keypads, touchpads, scanning devices, voice or optical recognition devices, or any other devices suitable for entering or retrieving data by one or more computing nodes 2500. Multiple input/output devices 2550 may be present in computing node 2500 or may be distributed on various computing nodes of a system that is configured to implement a data storage service. In some embodiments, similar input/output devices may be separate from computing node 2500 and may interact with one or more computing nodes of a system through a wired or wireless connection, such as over network interface 2540.

Storage service clients (e.g., users, subscribers and/or client applications) may interact with a data storage service such as that described herein in various ways in different embodiments, such as to submit requests for service (including, but not limited to, requests to store, retrieve and/or update items in tables, or requests to repartition a table), and to receive results. For example, some subscribers to the service may have physical access to computing node 2500, and if so, may interact with various input/output devices 2550 to provide and/or receive information. Alternatively, other clients/users may use client computing systems to access the system, such as remotely via network interface 2540 (e.g., via the Internet and/or the World Wide Web). In addition, some or all of the computing nodes of a system providing the service may provide various feedback or other general types of information to clients/users (e.g., in response to user requests) via one or more input/output devices 2550.

Those skilled in the art will appreciate that computing node 2500 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. Computing node 2500 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-readable storage medium or a portable article to be read by an appropriate drive, various examples of which are described above. In some embodiments, instructions stored on a computer-readable storage medium separate from computing node 2500 may be transmitted to computing node 2500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-readable storage medium. Accordingly, different embodiments may be practiced with other computer system configurations.

Note that while several examples described herein are directed to the application of various techniques in systems that include a non-relational database, in other embodiments these techniques may be applied in systems in which the non-relational data store is implemented using a different storage paradigm.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of computing nodes, each comprising at least one processor and memory, wherein the plurality of computing nodes is configured to implement a data storage service;
wherein the data storage service provides a service interface through which service requests are received from storage service clients;
wherein the data storage service is configured to:
maintain a plurality of tables in a data store on behalf of one or more storage service clients, the plurality of tables maintained according to respective throughput models of a plurality of throughput models including at least a committed throughput model and a best effort throughput model, wherein the committed throughput model guarantees throughput for a table of the plurality of tables at a committed number of request units per second, and wherein the best effort throughput model does not guarantee throughput for another table of the plurality of tables;

create a first table in the data store responsive to receiving, from a client of the data storage service according to a first application programming interface (API), a first request specifying the committed throughput model for servicing requests directed to the first table and a committed number of request units per second for the committed throughput model, wherein to create the first table the data storage service is configured to reserve sufficient resources for the first table to meet the specified committed number of request units per second of the committed throughput model, without guarantee that requests directed to the first table in excess of the specified committed number of request units per second will be serviced at the specified committed number of request units per second;

create a second table in the data store responsive to receiving, from another client of the data storage service according to via a second API, a second request to create a second table in the data store, the second request specifying the best effort throughput model for servicing requests directed to the second table;

automatically scale resources of the second table according to monitored usage of the second table without further initiation from the other client or a different client; and change the resources reserved for the first table to meet a change to the committed number of request units per second for the first table specified by a third request received, from the client or a different client according to a third API different from the first API, the change performed while continuing to accept and service additional requests directed to the first table.

2. The system of claim 1, wherein the committed number of request units per second and the change to the committed number of request units per second are expressed in terms of normalized logical service request units per second.

3. The system of claim 1, wherein to change the resources reserved for the first table to meet a change to the committed number of request units per second for the first table, the data storage service is configured to:
add or subtract one or more partitions for the table; or
increase or decrease an amount of input/output throughput capacity allocated to the table.

4. The system of claim 1, wherein in response to service request traffic directed to the first table exceeding the committed number of request units per second, the data storage service is configured to throttle at least a portion of the service requests that are received in excess of the committed number of request units per second.

5. The system of claim 1, wherein in response to service request traffic directed to the first table exceeding the committed number of request units per second, the data storage service is configured to service at least a portion of the service requests that are received in excess of the committed number of request units per second.

6. The system of claim 1,
wherein the data storage service is configured to receive a service request to decrease the number of request units per second for the first table, wherein the request specifies a decreased committed number of request units for the first table; and
wherein, in response to receiving the request to decrease the committed number of request units per second for the first table, the data storage service is configured to decrease the resources reserved for the first table.

7. A method, comprising:
maintaining a plurality of tables in a data store on behalf of one or more clients, the plurality of tables maintained according to respective throughput models of a plurality of throughput models including at least a committed throughput model and a best effort throughput model, wherein the committed throughput model guarantees throughput for a table of the plurality of tables at a committed number of request units per second, and wherein the best effort throughput model does not guarantee throughput for another table of the plurality of tables;

creating a first table in the data store responsive to receiving, from a client according to a first application programming interface (API), a first request specifying the committed throughput model for servicing requests directed to the first table and a committed number of request units per second for the committed throughput model, wherein to create the first table the data storage service is configured to reserve sufficient resources for the first table to meet the specified committed number of request units per second of the committed throughput model, without guarantee that requests directed to the first table in excess of the specified committed number of request units per second will be serviced at the specified committed number of request units per second;

creating a second table in the data store responsive to receiving, from another client according to via a second API, a second request to create a second table in the data store, the second request specifying the best effort throughput model for servicing requests directed to the second table;

automatically scaling resources of the second table according to monitored usage of the second table without further initiation from the other client or a different client; and changing the resources reserved for the first table to meet a change to the committed number of request units per second for the first table specified by a third request received, from the client or a different client according to a third API different from the first API, the change performed while continuing to accept and service additional requests directed to the first table.

8. The method of claim 7, wherein the committed number of request units per second and the change to the committed number of request units per second are expressed in terms of normalized logical service request units per second.

9. The method of claim 7, wherein maintaining the plurality of tables comprises storing table data in each of one or more partitions for the table on respective computing nodes in the data store; and wherein reserving resources for the table comprises:
creating one or more partitions for the table; or
allocating a particular amount of input/output throughput capacity to the table.

10. The method of claim 9, wherein changing the resources reserved for the first table to meet a change to the committed number of request units per second for the first table comprises:
adding or subtracting one or more partitions for the first table; or increasing or decreasing the amount of input/output throughput capacity allocated to the first table.

11. The method of claim 7, further comprising:
receiving a request to decrease the committed number of request units per second for the first table, wherein the request specifies a decreased committed number of request units per second for the table; and
decreasing, responsive to receiving the request to decrease the committed number of request units per second for the first table, the resources reserved for the first table.

12. The method of claim 7, further comprising:
throttling, responsive to request traffic directed to the first table exceeding the committed number of request units per second, at least a portion of the requests that are received in excess of the committed number of request units per second.

13. The method of claim 7, further comprising:
servicing, responsive to request traffic directed to the first table exceeding the committed number of request units per second, at least a portion of the service requests that are received in excess of the committed number of request units per second.

14. One or more non-transitory, computer-readable storage media storing program instructions that when executed on or across one or more computers cause the one or more computers to perform:
maintaining a plurality of tables in a data store on behalf of one or more clients, the plurality of tables maintained according to respective throughput models of a plurality of throughput models including at least a committed throughput model and a best effort throughput model, wherein the committed throughput model guarantees throughput for a table of the plurality of tables at a committed number of request units per second, and wherein the best effort throughput model does not guarantee throughput for another table of the plurality of tables;
creating a first table in the data store responsive to receiving, from a client according to a first application programming interface (API), a first request specifying the committed throughput model for servicing requests directed to the first table and a committed number of request units per second for the committed throughput model, wherein to create the first table the data storage service is configured to reserve sufficient resources for the first table to meet the specified committed number of request units per second of the committed throughput model, without guarantee that requests directed to the first table in excess of the specified committed number of request units per second will be serviced at the specified committed number of request units per second;
creating a second table in the data store responsive to receiving, from another client according to via a second API, a second request to create a second table in the data store, the second request specifying the best effort throughput model for servicing requests directed to the second table;
automatically scaling resources of the second table according to monitored usage of the second table without further initiation from the other client or a different client; and changing the resources reserved for the first table to meet a change to the committed number of request units per second for the first table specified by a third request received, from the client or a different client according to a third API different from the first API, the change performed while continuing to accept and service additional requests directed to the first table.

15. The one or more non-transitory, computer-readable storage media of claim 14, wherein the committed number of request units per second and the change to the committed number of request units per second are expressed in terms of normalized logical service request units per second.

16. The one or more non-transitory, computer-readable storage media of claim 14, storing additional instructions that when executed on or across the one or more computing devices cause the one or more computing devices to further implement throttling, responsive to request traffic directed to the first table exceeding the committed number of request units per second, at least a portion of the requests that are received in excess of the committed number of request units per second.

17. The one or more non-transitory, computer-readable storage media of claim 14, storing additional instructions that when executed on or across the one or more computing devices cause the one or more computing devices to further implement servicing, responsive to request traffic directed to the first table exceeding the committed number of request units per second, at least a portion of the requests that are received in excess of the committed number of request units per second.

18. The one or more non-transitory, computer-readable storage media of claim 14, storing additional instructions that when executed on or across the one or more computing devices cause the one or more computing devices to further implement:
receiving a request to decrease the committed number of request units per second for the first table, wherein the request specifies a decreased committed number of request units per second for the table; and
decreasing, responsive to receiving the request to decrease the committed number of request units per second for the first table, the resources reserved for the first table.

19. The one or more non-transitory, computer-readable storage media of claim 14, wherein changing the resources reserved for the first table to meet a change to the committed number of request units per second for the first table comprises:
adding or subtracting one or more partitions for the first table; or
increasing or decreasing the amount of input/output throughput capacity allocated to the first table.

20. The one or more non-transitory, computer-readable storage media of claim 14, wherein maintaining the plurality of tables comprises storing table data in each of one or more partitions for the table on respective computing nodes in the data store; and wherein reserving resources for the table comprises:
creating one or more partitions for the table; or
allocating a particular amount of input/output throughput capacity to the table.

* * * * *